US012623218B2

(12) United States Patent
Chen et al.

(10) Patent No.: US 12,623,218 B2
(45) Date of Patent: May 12, 2026

(54) WELL ARRAY DEVICE, SYSTEM AND METHODS OF USE THEREOF

(71) Applicant: Hidaca Ltd., Toronto (CA)

(72) Inventors: Jie Chen, Edmonton (CA); Lukas Menze, Edmonton (CA); Pedro A. Duarte, Edmonton (CA)

(73) Assignee: Hidaca LTD, Toronto (CA)

( * ) Notice: Subject to any disclaimer, the term of this patent is extended or adjusted under 35 U.S.C. 154(b) by 142 days.

(21) Appl. No.: 17/555,193

(22) Filed: Dec. 17, 2021

(65) Prior Publication Data

US 2023/0191400 A1 Jun. 22, 2023

(51) Int. Cl.
| | |
|---|---|
| *B01L 3/00* | (2006.01) |
| *B03C 5/00* | (2006.01) |
| *B03C 5/02* | (2006.01) |
| *G01N 27/447* | (2006.01) |

(52) U.S. Cl.
CPC ........ *B01L 3/502715* (2013.01); *B03C 5/005* (2013.01); *B03C 5/022* (2013.01); *G01N 27/4473* (2013.01); *G01N 27/44791* (2013.01); *B01L 2200/027* (2013.01); *B01L 2200/12* (2013.01); *B01L 2300/0645* (2013.01); *B01L 2300/0819* (2013.01)

(58) Field of Classification Search
CPC ......... B01L 3/502715; B01L 2200/027; B01L 2200/12; B01L 2300/0645; B01L 2300/0819; B03C 5/005; B03C 5/022; G01N 27/4473; G01N 27/44791
See application file for complete search history.

(56) References Cited

U.S. PATENT DOCUMENTS

| | | | |
|---|---|---|---|
| 6,683,446 B1 | 1/2004 | Pope | |
| 2004/0014106 A1 | 1/2004 | Patno | |
| 2005/0059105 A1 | 3/2005 | Alocilja | |
| 2005/0227373 A1 | 10/2005 | Flandre | |
| 2006/0148104 A1 | 7/2006 | Marini | |
| 2007/0076214 A1 | 4/2007 | Rothberg | |
| 2010/0209300 A1* | 8/2010 | Dirac ................. | A61B 5/1459 |
| | | | 422/68.1 |
| 2011/0189705 A1 | 8/2011 | Gao | |

(Continued)

FOREIGN PATENT DOCUMENTS

| | | | | |
|---|---|---|---|---|
| JP | 2012034641 A | * | 2/2012 | ........ B01L 3/502761 |
| WO | WO-2018234560 A1 | * | 12/2018 | |

OTHER PUBLICATIONS

Fujii et al., English translation of JP2012034641A, 2012 (Year: 2012).*

(Continued)

*Primary Examiner* — Luan V. Van
*Assistant Examiner* — Shizhi Qian
(74) *Attorney, Agent, or Firm* — EVAN LAW GROUP LLC

(57) ABSTRACT

The microfluidic chip and the microfluidic system of the present invention provides a unique integration of a microfluidic chip and a label-free quantification process. The microfluidic chip uses well arrays and dielectrophoresis (DEP) to capture a polarizable agent in a well. Once the polarizable agents have been captured, non-faradaic electrochemical impedance spectroscopy (nF-EIS) measurements can be performed to quantify the polarizable agent.

18 Claims, 26 Drawing Sheets

DEP Signal A

DEP Signal B

(56) References Cited

U.S. PATENT DOCUMENTS

| | | | | | |
|---|---|---|---|---|---|
| 2013/0118905 | A1* | 5/2013 | Morimoto | | B03C 5/026 |
| | | | | | 204/643 |
| 2013/0264221 | A1 | 10/2013 | Kim | | |
| 2014/0332407 | A1 | 11/2014 | Mai | | |
| 2015/0082920 | A1 | 3/2015 | Haick | | |
| 2017/0299571 | A1* | 10/2017 | Slepian | | B01L 3/502761 |
| 2018/0093271 | A1* | 4/2018 | Fujii | | B03C 5/005 |
| 2021/0162122 | A1* | 6/2021 | Pic | | A61B 17/00491 |
| 2022/0040696 | A1* | 2/2022 | Murton | | B01L 3/502761 |
| 2023/0138703 | A1* | 5/2023 | Zhou | | G01N 33/58 |
| | | | | | 422/502 |

OTHER PUBLICATIONS

Ameri et al., All electronic approach for high-throughput cell trapping and lysis with electrical impedance monitoring, Biosensors and Bioelectronics, 2014, 54, 462-467 (Year: 2014).*
Deng et al., Recent development of microfluidic technology for cell trapping in single cell analysis: a review, Process, 2020, 8, 1253 (Year: 2020).*
Kim et al., Compact 256-channel multi-well microelectrode array system for in vitro neuropharmacology test, Lab on a chip, 2020, 20, 3410 (Year: 2020).*
Li et al., Liquid biopsy-based single-cell metabolic phenotyping of lung cancer patients for informative diagnostics, nature communications, 2019, 10, 3856 (Year: 2019).*
Abdelrasoul, G.N. et al., "Nanocomposite scaffold fabrication by incorporating gold nanoparticles into biodegradable polymer matrix: Synthesis, Characterization, and Photothermal Effect", Materials Science and Engineering: C, vol. 56, pp. 305-310, (2015).
Arlett, J.L. et al., "Comparative Advantages of Mechanical Biosensors", Nature Nanotechnology, vol. 6, No. 4, pp., 203-215, (2011).
Bain, C.D. et al., "Formation of Monolayers by the Coadsorption of Thiols on Gold: Variation in the Head Group, Tail Group, and Solvent", Journal of the American Chemical Society, vol. 111, No. 18, pp. 7155-7164, (1989).
Baptista, P. et al., "Gold Nanoparticles for the Development of Clinical Diagnosis Methods", Analytical and Bioanalytical Chemistry, vol. 391, No. 3, pp. 943-950, (2008).
Cary, K.C. et al., "Biomarkers in Prostate Cancer Surveillance and Screening: Past, Present, and Future", Therapeutic Advances in Urology, vol. 5, No. 6, pp. 318-329, (2013).
Cecchet, F. et al., "Redox Mediation at 11-Mercaptoundecanoic Acid Self-Assembled Monolayers on Gold", The Journal of Physical Chemistry B, vol. 110, No. 5, pp. 2241-2248, (2005).
Chen, X. et al., "Electrical Nanogap Devices for Biosensing", Materials Today, vol. 13, No. 11, pp. 28-41, (2010).
Chen, S. et al., "Quantized Capacitance Charging of Monolayer-Protected Au Clusters", Journal of Physical Chemistry B, vol. 102, No. 49, pp. 9898-9907, (1998).
Crumbliss, A.L. et al., "Colloidal Gold as a Biocompatible Immobilization Matrix Suitable for the Fabrication of Enzyme Electrodes by Electrodeposition", Biotechnology and Bioengineering, vol. 40, No. 4, pp. 483-490, (1992).
Delong, R.K. et al., "Functionalized Gold Nanoparticles for the Binding, Stabilization, and Delivery of Therapeutic DNA, RNA, and Other Biological Macromolecules", Nanotechnology, Science and Applications, vol. 3, pp. 53-63, (2010).
Dwyer, M.A. et al., "Periplasmic Binding Proteins: A Versatile Superfamily for Protein Engineering", Current Opinion in Structural Biology, vol. 14, No. 4, pp. 495-504, (2004).
Elghanian, R. et al., "Selective Colorimetric Detection of Polynucleotides Based on the Distance-Dependent Optical Properties of Gold Nanoparticles," Science, vol. 277, No. 5329, pp. 1078-1081. (1997).
Etzioni, R. et al., "The Case for Early Detection", Nature Reviews Cancer, vol. 3, No. 4, pp. 243-252, (2003).
Ghosh, S.K. et al., "Interparticle Coupling Effect on the Surface Plasmon Resonance of Gold Nanoparticles: From Theory to Applications", Chemical Reviews, vol. 107, No. 11, pp. 4797-4854, (2007).

Golub, A.A. et al., "γ-APTES Modified Silica Gels: The Structure of the Surface Layer", Journal of Colloid and Interface Science, vol. 179, No. 2, pp. 482-487, (1996).
Grieshaber, D. et al., "Electrochemical Biosensors—Sensor Principles and Architectures", Sensors, vol. 8. No. 3, pp. 1400-1458, (2008).
Hermansen, P. et al., "Simulations and design of microfabricated interdigitated electrodes for use in a gold nanoparticle enhanced biosensor". 38th Annual International Conference of the IEEE Engineering in Medicine and Biology Society (EMBC), pp. 299-302, (2016).
Huang, C-C. et al., "Aptamer-modified gold nanoparticles for colorimetric determination of platelet-derived growth-factors and their receptors," Analytical Chemistry, vol. 77, No. 17, pp. 5735-5741, (2005).
Jordan, C.E. et al., "Surface plasmon resonance imaging measurements of DNA hybridization adsorption and streptavidin/DNA multilayer formation at chemically modified gold surfaces" Analytical Chemistry, vol. 69, No. 24, pp. 4939-4947, (1997).
Kim, T. et al., "Kinetics of gold nanoparticle aggregation: Experiments and modeling", Journal of Colloid and Interface Science, vol. 318, No. 2, pp. 238-243, (2008).
Kim, T. et al., "Polymeric self-assembled monolayers. 5. synthesis and characterization of ω-functionalized, self-assembled diacetylenic and polydiacetylenic monolayers", Langmuir, vol. 12, No. 25, pp. 6065-6073, (1996).
Kimling, J. et al., "Turkevich method for gold nanoparticle synthesis revisited", Journal of Physical Chemistry B, vol. 110, No. 32, pp. 15700-15707, (2006).
Lauks, I.R., "Microfabricated blosensors and microanalytical systems for blood analysis", Accounts of Chemical Research, vol. 31, No. 5, pp. 317-324, (1998).
Lee, J-S. et al., "A DNA-gold nanoparticle-based colorimetric competition assay for the detection of cysteine", Nano Letters, vol. 8, No. 2, pp. 529-533, (2008).
Lee, J.S. et al., "Chip-based scanometric detection of mercuric ion using DNA-functionalized gold nanoparticles",Analytical Chemistry, vol. 80, No. 17, pp. 6805-6808, (2008).
Li H. at al. "Colorimetric detection of DNA sequences based on electrostatic interactions with unmodified gold nancpariicles", Proceedings of the National Academy of Sciences, vol. 101, No. 39, pp. 14036-14039, (2004).
Lin, D. et al., "A regenerating ultrasensitive electrochemical impedance immunosensor for the detection of adenovirus", Biosensors & Bioelectronics, vol. 68, pp. 129-134, (2015).
Love, J.C. et al., "Self-assembled monolayers of thiolates on metals as a form of nanotechnology", Chemical Reviews, vol. 105, No. 4, pp. 1103-1169, (2005).
MacKay, S. et al., "Using impedance measurements of characterize surface modified with gold nanoparticles", Sensors, vol. 17, No. 9, pp. 1-11, (2017).
MacKay, S. et al., "Developing trends in aptamer-based biosensor devices and their applications", IEEE Tranactions of Biomedical Circuits and Systems, vol. 8, No. 1, pp. 4-14, (2014).
MacKay S. et al., "Simulations of interdigitated eletrode interactions with gold nanoparticles for impedance-based biosensing applications", Sensors, vol. 15, No. 9, pp. 22192-22208, (2015).
McKay, S. et al., "Live Demonstraction: Portable impedance-based system for metabolomic sensing", IEEE Biomedical Circuits and Systems Conference (BioCAS), 1 page, (2016).
Mascini, M. et al., "Biosensors for biomarkers in medical diagnostics", Biomarkers, vol. 13, No. 7-8, pp. 637-657, (2008).
Mehta, B. et al., "Optical bio sensor using graphene nano ribbons", Semiconductor Device Research Sysmposium [ISDRS], pp. 1-3, (2011).
Lin, V.S-Y. et al., "A porous silicon-based optical interferometric biosensor", Science, vol. 278, pp. 840-843, (1997).
Moulin, A.M. et al., "Microcantilever-based biosensors", Ultramicroscopy, vol. 82, pp. 23-31, (2000).
Porter, M.D. et al., "Spontaneously organized molecular assemblies. 4. Structural characterization of n-alkyl thiol monolayers on gold by

(56) References Cited

OTHER PUBLICATIONS optical ellipsometry, infrared spectroscopy, and electrochemistry", Journal of the American Chemical Society, vol. 109, No. 12, pp. 3559-3568, (1987).

Radke et al, "A micofabricated biosensor for detecting foodborne bioterrorism agents", IEEE Sensors Journal, vol. 5, No. 4, pp. 744-750, (2005).

Raiteri, R. et al., "Micromechanical canilever-based biosensors", Sensors and Actuators B: vol. 79, pp. 115-126, (2001).

Rodriguez, M.C. et al., "Aptamer biosensor for label-free impedance spectrscopy detection of proteins based on recognition-induced switching of the surface charge", Chemical Communications, pp. 4267-4269, (2005).

Salata, O.V., "Applications of nanoparticles in biology and medicine", Journal of Nanobiotechnology, vol. 6, pp. 1-6, (2004).

Schmidt, R. et al., "Photoinitiated polymerization of styrene from self-assembled monolayers on gold", Langmuir, vol. 18, No. 4, pp. 1281-1287, (2002).

Shukla, R. et al., "Biocompatibility of gold nanoparticles and their endocytotic fate inside the cellular compartment: A microscopic overview", Langmuir, vol. 21, No. 23, pp. 10644-10654, (2005).

Song, Y. et al., "Immobilization of DNA on 11-mercaptoudecanoic acid-modified gold (111) surface for atomic force microscopy imaging", Microscopy Research and Technique, vol. 68, No. 2, pp. 59-64, (2005).

Su, M. et al., "Microcantilever resonance-based DNA detection with nanoparticle probes", Applied Physics Letters, vol. 82, No. 20, pp. 3562-3564, (2003).

Thewes, R. et al., "Sensor arrays for fully-electronic DNA detection on CMOS", IEEE International Solid-State Circuits Conference, 3 pages, (2002).

Turkevich, J. et al., "A study fo the nucleation and growth processes in the synthesis of colloidal gold", Discussions of the Faraday Society, vol. 11, pp. 55-75, (1951).

Van Gerwen P. et al., "Nanoscaled interdigitated electrode arrays for biochemical sensors", Sensors and Actuators B: Chemical, vol. 49, No. 1-2, pp. 73-80, (1998).

Yu, X. et al., "An impedance detection circuit for applications in a portable biosensor system", IEEE International Symposium on Circuits and Systems (ISCAS), 4 pages, (2016).

Zamborini, F.P. et al., "Corrosion passivation of gold by n-Alkanethiol self-assembled monolayers: Effect of chain length and end group", Langmuir, vol. 14, No. 12, pp. 3279-3286, (1998).

Zhao, W. et al., "Simple and rapid colorimetric biosensors based on DNA aptamer and noncrosslinking gold nanoparticle aggregation", ChemBioChem, vol. 8, pp. 727-731, (2007).

Tomlinson, M.J. et al., "Cell separation: Terminology and practical considerations", Journal of Tissue Engineering, vol. 4, pp. 1-14, (2013).

Chen, Y. et al., "Rare cell isolation and analysis in micofluidics", Lab Chip, vol. 14, pp. 626-645, (2014).

Wognum, A.W. et al., "Identification and isolation of hematopoietic stem cells", Archives of Medical Research, vol. 34, issue 6, pp. 461-475, (2003).

Shields, C.W. et al., "Microfluidic cell sorting: A review of the advances in the separation of cells from debulking to rare cell isolation", Lab Chip, vol. 15, pp. 1230-1249, (2016).

Hinshaw, D.C. et al., "The tumor microenvironment innately modulates cancer progression", Cancer Research, vol. 79, pp. 4557-4567, (2019).

Malone, E.R. et al., "Molecular profiling for precision cancer therapies", Genome Medicine, vol. 12, No. 8, pp. 1-19, (2020).

Goodwin, S. et al., "Coming of age: Ten years of next-generation sequencing technologies", Nature Reviews Genetics, vol. 17, pp. 333-351, (2016).

Slatko, B.E. et al., "Overview of next generation sequencing technologies", Current Protocols in Molecular Biology, vol. 122, No. 1, pp. 1-15, (2018).

Allard, W.J. et al., "Tumor cells circulate in the peripheral blood of all major carcinomas but not in healthy subjects or patients with nonmalignant diseases", Clinical Cancer Research, vol. 10, pp. 6897-6904, (2004).

Andree, K.C. et al., "Challenges in circulating tumor cell detection by the CellSearch system", Molecular Oncology, vol. 10, pp. 395-407, (2016).

Hazra, R.S. et al., "Cellulose mediated transferrin nanocages for enumeration of circulating tumor cells for head and neck cancer", Scientific Reports, vol. 10, pp. 1-14, (2020).

Gupta, P. et al., "Analytical valifation of the CellMax platform for early detection of cancer by enumeration of rare circulating tumor cells", Journal of Circulating Biomarkers, vol. 8, pp. 1-13, (2019).

Atkins, A. et al., "Detection of circulating tumor DNA with a single-molecule sequencing analysis validated for targeted and immunotherapy selection", Molecular Diagnosis & Therapy, vol. 23, pp. 521-535, (2019).

Montoro, D.T. et al., "A revised airway epithelial hierarchy includes CFTR-expressing ionocytes", Nature vol. 560, pp. 319-324, (2018).

Zheng, G.X.Y. et al., "Massively parrellel digital transciptional profiling of single cells", Nature Communications, vol. 8, No. 1, pp. 1-12, (2017).

Dura, B. et al., "ScFTD-seq: freeze-thaw lysis based, portable approach toward highly distributed single-cell 3' mRNA profiling", Nucleic Acids Research, vol. 47, No. 3, pp. 1-14, (2019).

Bai, Z. et al., "An integrated dielectrophoresis-trapping and nanowell transfer approach to enable double-sub-poisson single-cell RNA sequencing", ACS Nano, vol. 14, pp. 7412-7424, (2020).

Morimoto, A. et al., "High-density dielectrophoretic microwell array for detection, caption, and single-cell analysis of rare tumor cells in peripheral blood", PLoS One, vol. 10, pp. 1-19, (2015).

Pohl, H.A. et al., "Separation of living and dead cells by dielectrophoresis", Science, vol. 152, pp. 647-649, (1966).

Hu, X. et al., "Marker-specific sorting of rare cells using dielectophoresis", Proceeding of the National Academy of Science, vol. 102, pp. 15757-15761, (2005).

Thomas, R.S.W. et al., "Image-based sorting and negative dielectrophoresis for high purity cell and particle separation", Electrophoresis, vol. 40, No. 20, pp. 2718-2727, (2019).

Fiedler, S. et al., "Dielectrophoretic sorting of particles and cells in a microsystem", Analytical Chemistry, vol. 70, pp. 1909-1915, (1998).

Isozaki, A. et al., "Sequentially addressable dielectrophoretic array for high-throughput sorting of large-volume biological compartments", Science Advances, vol. 6, No. 22, pp. 1-11, (2020).

Song, H. et al., "Continuous-flow sorting of stem cells and differentiation products based on dielectrophoresis", Lab Chip, vol. 15, pp. 1320-1328, (2015).

Lee, D. et al., "The potential of a dielectrophoresis activated cell sorter (DACS) as a next generation cell sorter", Micro and Nano Systems Letters, vol. 4, No. 2, pp. 1-10, (2016).

Wang, X-B. et al., "Cell separation by dielectrophoretic field-flow-fractiontion", Analytical Chemistry, vol. 72, pp. 832-839, (2000).

Yang, J. et al., "Cell separation on microfabricated electrodes using dielectrophoretic/gravitational field-flow fractionation", Analytical Chemistry, vol. 71, pp. 911-918, (1999).

Duarte, P.A. et al., "Single ascospore detection for the forecasting of sclerotinia stem rot of canola", Lab Chip, vol. 20, pp. 3644-3652, (2020).

Bacheschi, D.T. et al., "Overcoming the sensitivity vs. throughput tradeoff in coulter counters: A novel side counter design", Biosensors and Bioelectronics, vol. 168, pp. 1-7, (2020).

Han, P. et al., "Continuous label-free electronic discrimination of T cells by activation state", ACS Nano, vol. 14, pp. 8646-8657, (2020).

Kobayashi, M. et al., "Cancer cell analyses at the single cell-level using electroactive microwell array device", PLoS One, vol. 10, No. 11, pp. 1-10, (2015).

Kim, S.H. et al., "Efficient analysis of a small number of cancer cells at the single-cell level using an electroactive double-well array", Lab Chip, vol. 16, pp. 2440-2449, (2016).

(56)                References Cited

OTHER PUBLICATIONS

Yang, Y. et al., "Microfluidic device for DNA amplification of single cancer cells isolated from whole blood by self-seeding microwells", Lab Chip, vol. 15, pp. 4331-4337, (2015).

Yoshimura, Y. et al., "Cell pairing using microwell array electrodes based on dielectrophoresis", Analytical Chemistry, vol. 86, pp. 6818-6822, (2014).

Wu, C. et al., "A planar dielectrophoresis-based chip for high-throughput cell pairing", Lab Chip, vol. 17, pp. 4008-4014, (2017).

Wittenberg, N.J. et al., "Facile assembly of micro- and nanoarrays for sensing with natural cell membranes", ACS Nano, vol. 5, pp. 7555-7564, (2011).

Man, T. et al., "Intracellular photothermal delivery for suspension cells using sharp nanoscale tips in microwells", ACS Nano, vol. 13, pp. 10835-10844, (2019).

Bose, S. et al., "Scalable microfluidics for single-cell RNA printing and sequencing", Genome Biology, vol. 16, No. 1, pp. 1-16, (2015).

Yuan, J. et al., "An automated microwell platform for large-scale single cell RNA-seq", Scientific Reports, vol. 6, pp. 1-10, (2016).

Moeller, H-C. et al., "A microwell array system for stem cell culture", Biomaterials, vol. 29, pp. 752-763, (2008).

Wood, D.K. et al., "Single cell trapping and DNA damage analysis using microwell arrays", Proceeding of the National Academy of Science, vol. 107, pp. 10008-10013, (2010).

Cordovez, B. et al., "Trapping and storage of particles in electroactive microwells", Applied Physics Letters, vol. 90, pp. 024102-1-024102-3, (2007).

Kim, S.H. et al., "Electroactive microwell arrays for highly efficient single-cell trapping and analysis", Small, vol. 7, pp. 3239-3247, (2011).

Mansoorifar, A. et al., "Dielectrophoresis assisted loading and unloading of microwells for impedance spectroscopy", Electrophoresis, vol. 38, pp. 1466-1474, (2017).

Soule, H.D. et al., "Isolation and characterization of a spontaneously immortalized human breast epithelial cell line, MCF-10", Cancer Research, vol. 50, pp. 6075-6086, (1990).

Poczobutt, J.M. et al., "Benign mammary epithelial cells enhance the transformed phenotype of human breast cancer cells", BMC Cancer, vol. 10, No. 373, pp. 1-17, (2010).

Truongvo, T.N. et al., "Microfluidic channel for characterizing normal and breast cancer cells", Journal of Micromechanics and Microengineering, vol. 27, No. 3, pp. 1-9, (2017).

Ren, V. et al., "Single-cell mechanical characteristics analyzed by multiconstriction microfluidic channels", ACS Sensors, vol. 2, pp. 290-299, (2017).

Fricke, H., "The electric capacity of suspensions with special reference to blood", The Journal of General Physology, vol. 9, No. 2, pp. 137-152, (1925).

Pethig, R. et al., "The passive electrical properties of biological systems: Their significance in physiology, Biophysics and biotechnology", Physics in Medicine and Biology, vol. 32, No. 8, pp. 933-970, (1987).

Holmes, D. et al., "Leukocyte analysis and differentiation using high speed microfluidic single cell impedance cytometry", Lab Chip, vol. 9, pp. 2881-2889, (2009).

Han, A. et al., "Quantification of the heterogeneity in breast cancer cell lines using whole-cell impedance spectroscoopy", Clinical Cancer Research, vol. 13, pp. 139-143, (2007).

Qiao, G. et al., "Bioimpedance analysis for the characterization of breast cancer cells in suspension", IEEE Transactions on Biomedical Engineering, vol. 59, No. 8, pp. 2321-2329, (2012).

Gascoyne, P.R.C. et al., "Correlations between the dielectric properties and exterior morphology of cells revealed by dielectrophoretic field-flow fractionation", Electrophoresis, vol. 34, pp. 1042-1050, (2013).

Huang, Y. et al., "Dielectrophoretic cell separation and gene expression profiling on microelectronic chip arrays", Analytical Chemistry, vol. 74, pp. 3362-3371, (2002).

Yang, L. et al., "Effects of Dielectrophoresis on growth, viability and immuno-reactivity of Listeria monocytogenes", Journal of Biological Engineering, vol. 2, No. 1, pp. 1-14, (2008).

Markx, G.H. et al., "Separation of viable and non-viable yeast using dielectrophoresis", Journal of Biotechnology, vol. 32, No. 1, pp. 29-37, (1994).

Raicu, V. et al., "Dielectric properties of yeast cells as simulated by the two-shell model", Biochimica et Biophysica Acta (BBA)-Bioenergetics, vol. 1274, No. 3, pp. 143-148, (1996).

Asami, K., "Characterization of heterogeneous systems by dielectric spectroscopy", Progress in Polymer Science, vol. 27, No. 8, pp. 1617-1659, (2002).

Turcan, I. et al., "Dielectrophoretic manipulation of cancer cells and their electrical characterization", ACS Combinatorial Science, vol. 22, No. 11, pp. 554-578, (2020).

Liang, W. et al., "Determination of dielectric properties of cells using AC electrokinetic-based microfluidic platform: A review of recent advances", Micromachines, vol. 11, No. 5, pp. 1-24, (2020).

Wu, L. et al., "Dielectrophoretic capture voltage spectrum for measurement of dielectric properties and seperation of cancer cells", Biomicofluidics, vol. 6, No. 1, pp. 014113-1-014113-10, (2012).

Sherba, J.J. et al., "The effects of electroporation buffer composition on cell viability and electro-transfection efficiency", Scientific Reports, vol. 10, No. 1, pp. 1-9, (2020).

Khater, M. et al., "Biosensors for plant pathogen detection", Biosensors and Bioelectronics, vol. 93, pp. 72-86, (2017).

Nezhad, A.A., "Future of portable devices for plant pathogen diagnosis", Lab Chip, vol. 14, No. 16, pp. 2887-2904, (2014).

Oerke, E.C., "Crop losses to pests", The Journal of Agricultural Science, vol. 144, issue 1, pp. 31-43, (2006).

Purdy, L.H., "Sclerotinia sclerotiorum: history, diseases and symptomatology, host range, geographic distribution, and impact", Phytopathology, vol. 69, No. 8, pp. 875-880, (1979).

Xia, S. et al., "The notorious soilborne pathogenic fungus sclerotinia sclerotiorum: an update on genes studied with mutant analysis", Pathogens, vol. 9, No. 1, pp. 1-22, (2020).

Boland, G.J. et al., "Index of plant hosts of sclerotinia scierotiorum", Canadian Journal of Plant Pathology, vol. 16, No. 2, pp. 93-108, (1994).

Maheshwari, P. et al., "Optimization of *Brassica napus* (canola) explant regeneration for genetic transformation", New Biotechnology, vol. 29, No. 1, pp. 144-155, (2011).

Del Rio, L.E. et al., "Impact of sclerotinia stem rot on yield of canola", Plant Disease, vol. 91, No. 2, pp. 191-194, (2007).

Adams, P.B. et al., "Ecology of sclerotinia species", Phytopathology, vol. 69, pp. 896-899, (1979).

Brooks, K.D. et al., "Narrow window burning canola (*Brassica napus* l.) residue for sclerotinia sclerotiorum (lib.) de bary sclerotia destruction", Pest Management Science, vol. 74, No. 11, pp. 2594-2600, (2018).

McLaren, D.L. et al., "Predicting diseases caused by sclerotinia sclerotiorum on canola and bean—a western Canadian perspective", Canadian Journal of Plant Pathology, vol. 26, No. 4, pp. 489-497, (2004).

Twengström, E. et al., "Forecasting sclerotinia stem rot in spring sown oilseed rape", Crop Protection, vol. 17, No. 5, pp. 405-411, (1998).

Clarkson, J.P. et al., "A model for sclerotinia sclerotiorum infection and disease development in lettuce, based on the effects of temperature, relative humidity and ascospore density", PLOS One, vol. 9, No. 4, pp. 15-25, (2014).

Sharma, P. et al., "Forewarning models for sclerotinia rot (sclerotinia sclerotiorum) in Indian mustard (*Brassica juncea* L.)", Phytoparasitica, vol. 43, No. 4, pp. 509-516, (2015).

Bečka, D. et al., "Use of petal test of early-flowering varieties of oilseed rape (*Brassica napus* L.) for predicting the infection pressure of sclerotinia sclerotiorum (Lib.) de Bary", Crop Protection, vol. 80, pp. 127-131, (2016).

Turkington, T.K. et al., "Use of petal infestation to forecast sclerotinia stem rot of canola: The impact of diurnal and weather-related inoculum fluctuations", Canadian Journal of Plant Pathology, vol. 13, No. 4, pp. 347-355, (1991).

(56)                References Cited

OTHER PUBLICATIONS

Almquist, C. et al., "Monitoring of plant and airborne inoculum of sclerotiorum in spring oilseed rape using real-time PCR", Plant Pathology, vol. 64, No. 1, pp. 109-118, (2015).

Ziesman, B.R. et al., "A quantitative PCR system for measuring sclerotinia sclerotiorum in canola (*Brassica napus*)", Plant Disease, vol. 100, No. 5, pp. 984-990, (2016).

Yanni, Y. et al., "Detection of sclerotinia sclerotiorum in planta by a real-time PCR assay", Journal of Phytopathology, vol. 157, No. 7-8, pp. 465-469, (2009).

Shoute, L.C.T. et al., "Immuno-impedimetric biosensor for onsite monitoring of ascospores and forecasting of sclerotinia stem rot of canola", Scientific Reports, vol. 8, No. 1, pp. 1-9, (2018).

Dura, B. et al., "scFTD-seq: freeze-thaw lysis based, portale approach toward highly distributed single-cell 3' mRNA profiling", Nucleic Acids Research, vol. 47, No. 3, pp. 1-14, (2019).

Kim, H. et al., "Automated digital microfluidic sample preparation for next-generation DNA sequencing", JALA: Journal of the Association for Laboratory Automation, vol. 16, No. 6, pp. 405-414, (2011).

Sun, M. et al., "Label-free on-chip selective extraction of cell-aggregate-laden microcapsules from oil into aqueous solution with optical sensor and dielectrophoresis", ACS Sensors, vol. 3, No. 2, pp. 410-417, (2018).

Menze, L. et al., "Selective single-cell sorting using a multisectorial electroactive nanowell platform", ACS Nano, vol. 16, No. 1, pp. 211-220, (2021).

Parker, M. L. et al., "Evaluation of air sampling and detection methods to quantify airborne ascospores of sclerotinia sclerotiorum", Plant Disease, vol. 98, No. 1, pp. 32-42, (2014).

Bolton, M.D. et al., "Sclerotinia sclerotiorum (Lib.) de Bary: biology and molecular traits of a cosmopolitan pathogen", Molecular Plant Pathology, vol. 7, No. 1, pp. 1-16, (2006).

Abdelrasoul, G.N. et al., "DNA aptamer-based non-faradaic impedance biosensor for detecting E. coli", Analytica Chimica Acta, vol. 1107, pp. 135-144, (2020).

Polonschii, C. et al., "Complementarity of EIS and SPR to reveal specific and nonspecific binding when interrogating a model bioaffinity sensor; Perspective offered by plasmonic based EIS", Analytical Chemistry, vol. 86, No. 17, pp. 8553-8562, (2014).

Abdelrasoul, G.N. et al., "Non-invasive point-of-care device to diagnose acute mesenteric ischemia", ACS Sensors, vol. 3, No. 11, pp. 2296-2302, (2018).

Bruus, H., "Acoustofluidics 1: Governing equations in microfluidics", Lab Chip, vol. 11, No. 22, pp. 3742-3751, (2011).

Couniot, N. et al., "Signal-to-noise ratio optimization for detecting bacteria with interdigitated microelectrodes", Sensors & Actuators: B Chemical, vol. 189, pp. 43-51, (2013).

Bagnaninchi, P.O. et al., "Real-time label-free monitoring of adipose-derived stem cell differentiation with electric cell-substrate impedance sensing", Proceedings of the National Academy of Science, vol. 108, No. 16, pp. 6462-6467, (2011).

Asami, K., "Characterization of biological cells by dielectric spectroscopy", Journal of Non-Crystalline Solids, vol. 305, No. 1-3, pp. 268-277, (2002).

Heileman, K. et al., "Dielectric spectroscopy as a viable biosensing tool for cell and tissue characterization and analysis", Biosensors and Bioelectronics, vol. 49, pp. 348-359, (2013).

Asami, K. et al., "Dielectric properties of mouse lymphocytes and erythrocytes", Biochimica et Biophysica Acta (BBA)-Molecular Cell Research. vol. 1010, No. 1, pp. 49-55, (1989).

Kakutani, T. et al., "Electrorotation of non-spherical cells: theory for ellipsoidal cells with an arbitrary number of shells", Bioelectrochemistry and bioenergetics, vol. 31, No. 2, pp. 131-145, (1993).

Asami, K. et al., "Dielectric analysis of *Escherichia coli* suspensions in the light of the theory of interfacial polarization", Biophysical journal, vol. 31, No. 2, pp. 215-228, (1980).

Asami, K. et al., "Dielectric behavior of wild-type yeast and vacuole-deficient mutant over a frequency range of 10 KHz to 10 GHz", Biophysical journal, vol. 71, No. 4, pp. 2192-2200, (1996).

Polevaya, Y. et al., "Time domain dielectric spectroscopy study of human cells II. Normal and malignant white blood cells", Biochimica et Biophysica Acta (BBA)-Biomembranes, vol. 1419, No. 2, pp. 257-271, (1999).

Mansoorifar, A. et al., "Quantification of cell death using an impedance-based microfluidic device", Analytical Chemistry, vol. 91, No. 6, pp. 4140-4148, (2019).

Bordi, F. et al., "Determination of cell membrane passive electrical properties using frequency domain dielectric spectroscopy technique. A new approach", Biochimica et Biophysica Acta (BBA)-Biomembranes, vol. 1028, No. 2, pp. 201-204, (1990).

Yang, J. et al., "Dielectric properties of human leukocyte subpopulations determined by electrorotation as a cell separation criterion", Biophysical Journal, vol. 76, No. 6, pp. 3307-3314, (1999).

Sano, M.B. et al., "Contactless dielectrophoretic spectroscopy: Examination of the dielectric properties of cells found in blood", Electrophoresis, vol. 32, No. 22, pp. 3164-3171, (2011).

Vaillier, C. et al., "Label-free electric monitoring of human cancer cells as a potential diagnostic tool", Analytical Chemistry, vol. 88, No. 18, pp. 9022-9028, (2016).

Kaler, K.V.I.S. et al., "Dielectrophoretic spectra of single cells determined by feedback-controlled levitation", Biophysical journal, vol. 57, No. 2, pp. 173-182, (1990).

Huang, Y. et al., "Differences in the AC electrodynamics of viable and non-viable yeast cells determined through combined dielectrophoresis and electrorotation studies", Physics in Medicine & Biology, vol. 37, No. 7, pp. 1499-1517, (1992).

Arnold, W.M. et al., "Rotating-field-induced rotation and measurement of the membrane capacitance of single mesophyll cells of avena sativa", Zeitschrift für Naturforschung C, vol. 37, No. 10, pp. 908-915, (1982).

Marszalek, P. et al., "Determination of electric parameters of cell membranes by a dielectrophoresis method", Biophysical journal, vol. 59, No. 5, pp. 982-987, (1991).

Rosenthal, A. et al., "Dielectrophoretic traps for single-particle patterning", Biophysical journal, vol. 88, No. 3, pp. 2193-2205, (2005).

Viefhues, M. et al., "DNA dielectrophoresis: Theory and applications a review", Electrophoresis, vol. 38, No. 11, pp. 1483-1506, (2017).

Koch, S. et al., "A crop loss-related forecasting model for sclerotinia stem rot in winter oilseed rape", Phytopathology, vol. 97, No. 9, pp. 1186-1194, (2007).

Clarkson, J.P. et al., "Forecasting sclerotinia disease on lettuce: A predictive model for carpogenic germination of sclerotinia sclerotiorum sclerotia", Phytopathology, vol. 97, No. 5, pp. 621-631, (2007).

Duarte, P.A. et al., "Highly efficient capture and quantification of the airborne fungal pathogen sclerotinia sclerotiorum employing a nanoelectode activated microwell array", ACS Omega, vol. 7, No. 1, pp. 459-468, (2021).

Lo, Y.J. et al., "Measurement of the clausius-mossotti factor of generalized dielectrophoresis", Applied Physics Letters, vol. 105, No. 8, 083701, pp. 1-5, (2014).

Pethig, R., "Dielectrophoresis: Status of the theory, technology, and applications", Biomicrofludics, vol. 4, No. 2, 022811, pp. 1-35, (2010).

Goldman, A.J. et al., "Slow viscous motion of a sphere parrallel to a plane wall-II couette flow", Chemical Engineering Science, vol. 22, No. 4, pp. 653-660, (1967).

El-Gaddar, A. et al., "Assessment of 0.5 T static field exposure effect on yeast and HEK cells using electrorotation", Biophysical journal, vol. 104, No. 8, pp. 1805-1811, (2013).

LeBrun, G. et al., "Electrical characterization of cellulose-based membranes towards pathogen detection in water", Biosensors, vol. 11, No. 2, pp. 1-20, (2021).

Adams, T.N.G. et al., "Characterizing the dielectric properties of human mesenchymal stem cells and the effects of charged elastin-like polypeptide copolymer treatment", Biomicrofluidics, vol. 8, No. 5, pp. 1-14, (2014).

Yang, C.Y. et al., "Quasistatic force and torque on ellipsoidal particles under generalized dielectrophoresis", Journal of Applied Physics, vol. 102, No. 9, 094702, pp. 1-11, (2007).

(56)     References Cited

OTHER PUBLICATIONS

Einolf, Jr. C.W. et al., "Passive electrical properties of microorganisms IV. Studies of the protoplasts of micrococcus lysodeikticus", Biophysical Journal, vol. 9, pp. 634-643, (1969).

Hyler, A.R. et al., "A novel ultralow conductivity electromanipulation buffer improves cell viability and enhances dielectrophoretic consistency", Electrophoresis, vol. 42, No. 12-13, pp. 1366-1377, (2021).

North Dakota State University, "Estimated risk of Sclerotinia stem not development for Dec. 16, 2022", 2 pages, (2022). Found at www.ag.ndsu.edu/sclerotinia/riskmap.html.

* cited by examiner

DEP signal amplitude: 15 V$_{pp}$

Flow rate: 0.8 µL/min

Flow rate: 0.8 µL/min

Flow rate: 0.8 µL/min

Same f$_{DEP}$ applied to sectors f$_{DEP, A, B}$ = 1 MHz

▓ MCF-10A
▓ MDA-MB-231

Microwell diameter: 20 μm

Microwell diameter: 15 μm

WELL ARRAY DEVICE, SYSTEM AND METHODS OF USE THEREOF

BACKGROUND

Single-cell sorting is of increasing importance in precision medicine applications such as advanced genomics or next generation sequencing.[6-8] State-of-the-art systems for cancer detection, such as CellSearch,[9,10] OncoDiscover,[11] or CellMax,[12,13] capture and isolate circulating tumor cells (CTCs) from patient samples. Subsequent quantification of the number of CTCs then may provide important information about the state of a patient. In single-cell RNA sequencing platforms, such as in the commercially available 10× Genomics solutions[14, 15] or other recent advances,[16-18] it is crucial to ensure that only the target cells are sequenced for accurate results. Hence, depending on the mechanism of the sequencing platform, reliable cell sorting prior to loading the sequencing platform may be required.

Traditionally used cell sorting approaches include density gradient-based methods as well as fluorescence-activated cell sorting (FACS) and magnetic-activated cell sorting (MACS). In both FACS and MACS, the sample has to be prepared and correctly labeled with either fluorescent stains or magnetic microbeads in order to be sorted successfully.[1,4] Dielectrophoresis activated cell sorting (DACS) offers an alternative approach based on the intrinsic characteristics of dielectrophoresis (DEP) to sort cells without the need for any prior labeling. DEP is an electrokinetic phenomenon that allows for the selective manipulation of dielectric agents, such as mammalian cells, via polarization when subjected to a spatially nonuniform electric field.[19] Reported microfluidic DACS structures mainly focus on sorting cells by positioning electrodes in a microfluidic channel and subsequently use DEP to change the flow trajectory of passing cells depending on their dielectric characteristics, hence directing them into different output channels.[20-25] These designs are innately limited by the number of output channels, as the number of individually sorted cell types directly corresponds to the number of outlets. Other less common DEP-based cell sorting approaches employ field-flow fractionation to sort different cell types.[26,27]

Another limitation these designs face is their inability to readily provide information about the number of sorted cells. Additional cell counting structures such as microfluidic Coulter counters, which have been shown to reliably detect single cells,[28-30] may be employed to count the number of cells flowing through an outlet channel at the cost of an increased overall system complexity.

Infectious plant diseases caused by microorganisms such as fungi and bacteria are one of the main factors affecting crop production, resulting in huge economic losses to farmers and growers.[64-66] Among the list of numerous diseases, *Sclerotinia* stem rot (SSR) is of particular importance due to its wide host range and harmful effects.[67-68] SSR is caused by the necrotrophic fungal pathogen *Sclerotinia sclerotiorum*, affecting more than 400 plant species worldwide, including several economically important crops such as canola, soybean, sunflower, and carrot.[67-69,70] SSR, also commonly known as white mold, is particularly devastating to the canola industry, the world's second-largest oilseed crop.[71] Yield losses due to SSR can be as high as 50%, causing severe financial losses[72] and making it the greatest threat to canola production. Microscopic spores produced by the fungus disseminate throughout the fields in wind currents, representing the primary source of inoculum initiating SSR epidemics.[69,73] Currently, chemical control employing fungicides is the main strategy for the management of SSR.[74] Although this approach can be highly effective, fungicides are economically inefficient when applied routinely and with no indication of disease risk. Ideally, farmers must apply fungicides during specific time frames and only when necessary, that is, when spores are present in the field but before symptoms are visible.[74,75] However, as SSR outbreaks are hard to predict, farmers typically apply fungicides routinely and without any objective information on the risk of SSR development, a decision that costs time, drastically reduces the profits, and affects the environment. Current methods for predicting SSR development are imprecise. Risk assessment checklists[76-77] and weather-based forecasting models[78-80] were the first systems developed for this purpose. Although simple and field-specific, the checklists are time-consuming, labor-intensive, and do not include any measurement of airborne inoculum. On the other hand, weather-based systems lack field specificity and are based exclusively on weather parameters.

SUMMARY

In a first aspect, the present invention is a microfluidic chip for selecting and detecting a polarizable agent in a sample containing a mixture of such agents, including: a substrate, at least three electrodes on the substrate with a gap between adjacent electrodes, forming a plurality of gaps, a well array on the substrate having a plurality of wells positioned in the plurality of gaps, a top layer on the well array, and a microfluidic channel, between the top layer and the well array.

In a second aspect, the present invention is a method of selecting and detecting a polarizable agent from a mixture of such agents in a liquid sample, with a microfluidic chip having a substrate, at least three electrodes on the substrate with a gap between adjacent electrodes, forming a plurality of gaps, a well array on the substrate having a plurality of wells positioned on the plurality of gaps, a top layer on the well array, and a microfluidic channel, between the top layer and the well array, the method including flowing the liquid sample through the microfluidic chip, providing a voltage between adjacent electrodes to generate a dielectrophoresis (DEP) force to capture the polarizable agents, and measuring the electrical impedance across adjacent electrodes.

In a third aspect, the present invention is a method of making a microfluidic system, including forming a microfluidic chip, forming a plurality of electrodes on a substrate, forming a well array on the substrate, connecting the electrodes to a controller. The controller comprises a function generator and an impedance analyzer.

Definitions

The term "polarizable agent" refers to a particle or discreet body, such as a cell or pollen grain, that is capable of having an induced dipole in response to an electric field.

The term "metabolic product" refers to proteins and organic molecules that are produced by eukaryotic cells, viruses or bacteria.

The terms "chip" or "microfluidic chip" refer to a structure having a substrate and one or more fluid channels.

DETAILED DESCRIPTION

Figure 1:
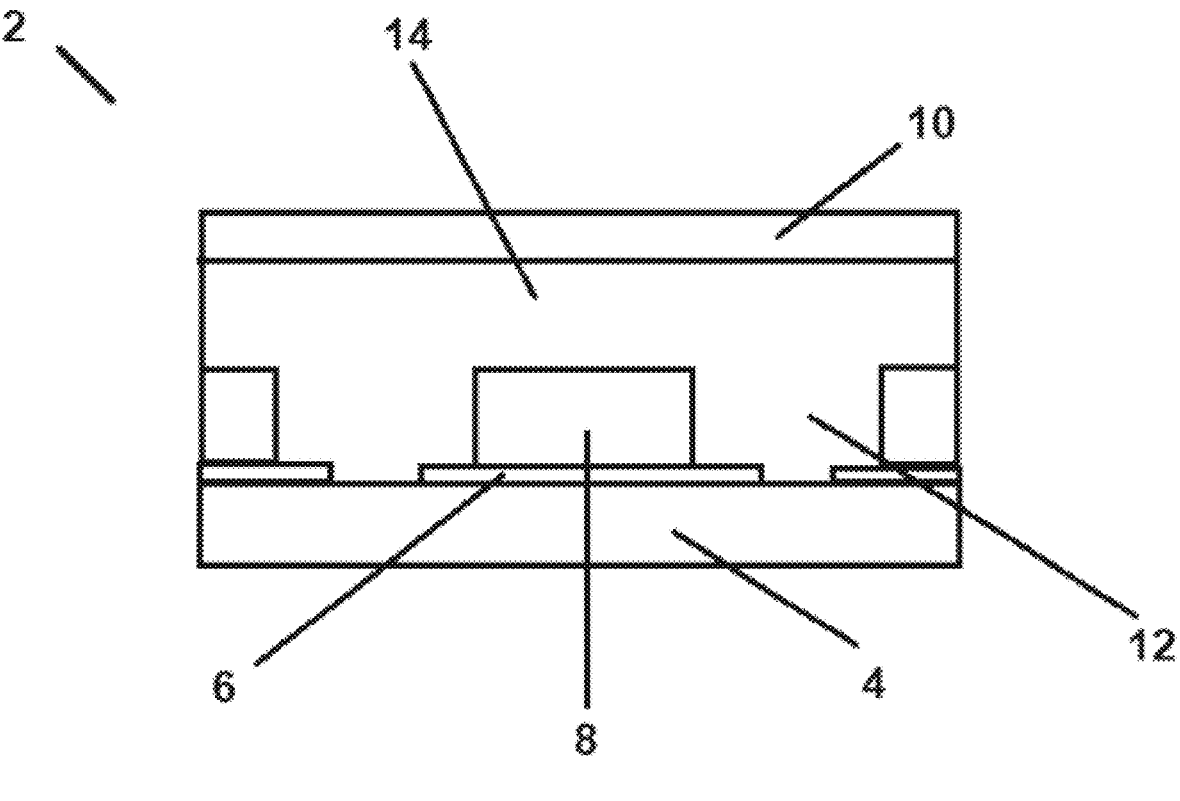
FIG. 1 shows a lateral cross-sectional view of a microfluidic chip.

While combining cell capture and cell counting platforms have provided reliable results, each device is designed to solely perform its respective task. Designing a platform that is not limited by its hardware to perform only one function could provide the flexibility to integrate further features into a single chip.

The microfluidic chip and the microfluidic system of the present invention provides a unique integration of a microfluidic platform and a label-free quantification process. The microfluidic chip uses well arrays and dielectrophoresis (DEP) to sort and capture polarizable agents in wells. Once the polarizable agents have been captured, non-faradaic electrochemical impedance spectroscopy (nF-EIS) measurements can be performed to quantify and identify the polarizable agent.

The microfluidic chip (also referred to as the microfluidic platform) includes a well array having wells which are formed on top of electrodes. The electrodes facilitate dielectrophoresis-driven capture of polarizable agents. Preferably the wells align with the gap between the electrodes. The electrodes may be pairs of interdigitated electrodes (IDEs) each having a plurality of digits. The electrodes are operated to capture polarizable agents having different properties in various sections of the chip.

Preferably the microfluidic chip has numerous sections, which may have differing well sizes or may simply use different voltages applied to the electrodes of different sections to drive dielectrophoresis-driven capture of polarizable agents. By use of a multisectorial design, formed by individually addressable electrodes, the chip can capture a large number of different types of polarizable agents. The sectorial approach allows for fast and straightforward modification to sort complex samples such as different cell types, as the different cell types are captured in different sectors which removes the need for individual output channels per cell type. The number of sectors, the size of each sector and the well size may be readily modified, facilitating easy adjustment of the platform to the desired target sample. Preferably the size of the well is chosen so that only one polarizable agent occupies a well.

The same individually addressable electrode may be used to measure the impedance between adjacent electrodes. By measuring the impedance between electrodes, it is possible to determine the number wells that are occupied by a polarizable agent. The total number of agents can then be determined by adding the number of occupied wells between each pair of electrodes together, to quantify the polarizable agents.

The polarizable agents are preferably a biological agent such as cells, bacteria, virus, spores, fungi, or other biological agents. The polarizable agent may also be pollens, dust, molecules, and proteins. Examples of dust include coal dust, cement dust, flour mill dust, and atmospheric dust. The microfluidic chip may be used to sort a sample that contains various biological agents, such as cancer cells from non-cancer cells. The properties of biological agents may be determined using routine experimentation. Alternatively, the properties of common biological agents are well-known, including properties such as the dielectric properties of various cell types, which can be used to determine the appropriate voltages necessary to drive dielectrophoresis-driven capture of biological agents.

Once the polarizable agents or biological agents have been captured in wells, impedance measurements may be taken to quantify and/or identify the agents, column by column. Preferably the impedance measurement uses a nF-EIS technique, which is a label-free detection technique that measures the electrical current of an electrode-electrolyte system in response to an applied AC potential with no redox species in solution. The microfluidic chip design is able to address each column of the well array individually. The number of agents in each column can be determined using nF-EIS.

FIG. 1 illustrates a lateral cross-sectional schematic view of a microfluidic chip, 2 for sorting agents and counting the agents. The chip includes a substrate, 4 such as glass. Electrodes, 6 are present on the substrate. On the electrodes, a patterned insulating layer forming a well array, 8 is formed on the electrodes with the wells, 12 defining the negative spaces of the well array. The wells align with the gaps between the electrodes. A microfluidic channel, 14 is formed by enclosing the top of the microfluidic device with a top layer, 10.

Figure 2:
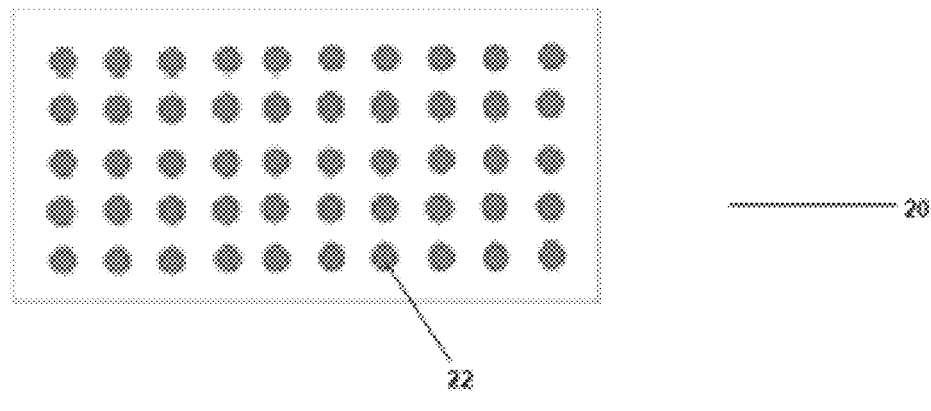
FIG. 2 shows a top view of a microfluidic chip.

FIG. 2 illustrates a top view of a microfluidic chip, 20, which shows a plurality of wells, 22. The arrangement of the wells may be any suitable configuration that allows for the capture of agents. FIG. 2 illustrates a grid arrangement of the wells, with the wells arranged in rows and columns. Preferably, the arrangement of the wells is a hexagonal arrangement or another arrangement that results in agents passing directly over the wells.

Figure 17:
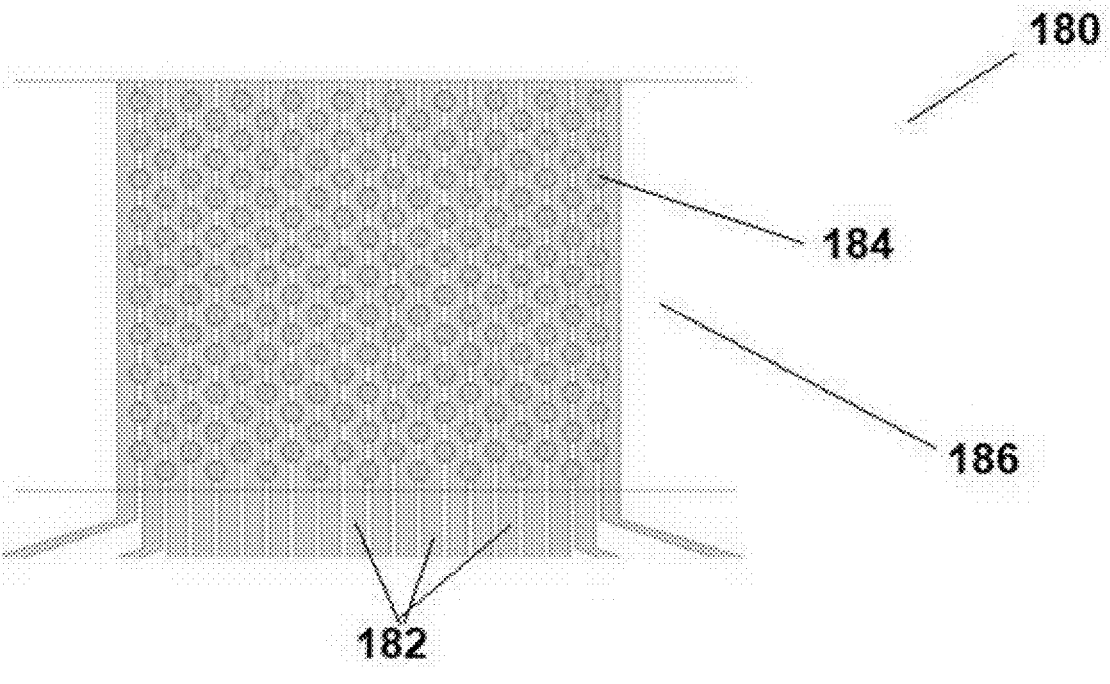
FIG. 17 is a schematic of a microfluidic chip with an individual electrode configuration.

FIG. 17 shows a microfluidic chip, 180, having a plurality of electrodes, 182, that are can be operated individually. Wells, 184 are formed on the electrodes to capture polarizable agents in a hexagonal arrangement. The microfluidic channel, 186, is shown, having a flow path along the top of the wells.

The substrate may be plastic, glass, aluminum oxide, quartz or a silicon dioxide layer on substrates (such as silicon dioxide on silicon wafers) or another suitable insulating substrate material. The electrodes may be made of a conductive material such as metals, for example, aluminum, gold, copper, carbon, titanium, silver, platinum, palladium, alloys or mixtures thereof. The electrodes may be formed using sputtering of the electrode material. The electrodes may be patterned using positive photoresists. The electrodes may be formed using etching of the electrode material.

Preferably the electrodes are coplanar. Preferably the electrodes comprise a plurality of electrodes that are formed independently from the other electrodes. Preferably the length of each electrode or electrode digit is the same or substantially the same as the width of the microfluidic channel. Examples include from a 1:5 to 5:1 digit width to gap ratio. The digit width and gaps of the electrodes are preferably as small as practical, limited only by standard photolithographic and etching techniques; wet etching can be used, but other techniques such as reactive ion etching, lift-off lithography, and electron-beam lithography is also possible. The electrodes may have a thickness of 10 to 1000 nm, preferably, 50 to 500 nm, most preferably 60, 70, 80, 90, 100, 110, 120, 130, 140, 150, 160, 170, 180, 190, 200, 225, 250, 275, 300, 325, 350, 375, 400, 425, 450 or 475 nm. The electrode width may be 1 to 1000 $\mu$m, preferably 5 to 500 $\mu$m, most preferably 6, 7, 8, 9, 10, 11, 12, 13, 14, 15, 20, 25, 30, 35, 40, 45, 50, 60, 70, 80, 90, 100, 150, 200, 250, 300, 350, 400, or 450 $\mu$m. The gap between adjacent electrodes may be 1 to 1000 $\mu$m, preferably 1 to 100 $\mu$m, most preferably 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 20.0, 25.0, 30.0, 35.0, 40.0, 45.0, 50.0, 60.0, 70.0, 80.0, or 90.0 $\mu$m. Example electrode widths are 14 and 20 $\mu$m, and gap spacing of 6 $\mu$m; 1-2 $\mu$m for the digit widths and/or gap spacing is also possible. The width and gap of the electrodes is selected based on the size of the wells, which is determined by the size of the polarizable agents of interest.

The number of electrodes may be 2 to 1000 electrodes, more preferably 2 to 500, most preferably 5, 10, 15, 20, 25, 30, 35, 40, 45, 50, 55, 60, 65, 70, 75, 80, 85, 90, 100, 120, 140, 160, 180, 200, 220, 240, 260, 280, 300, 320, 340, 360, 380, 400, 420, 440, 460, or 480 electrodes. Preferably the number of electrodes is an even number.

Preferably the wells are circular or oval. The depth of the wells and the diameter of the wells is selected based on the size of the polarizable agents of interest. The depth of the wells may be 1 to 100 μm, preferably 5 to 50 μm, most preferably 6, 7, 8, 9, 10, 11, 12, 13, 14, 15, 20, 30, 35, 40, or 45 μm. The width or diameter of the wells is preferably 5 to 100 μm, more preferably 5 to 50 μm, most preferably preferably 6, 7, 8, 9, 10, 11, 12, 13, 14, 15, 20, 30, 35, 40, or 45 μm. The wells may also be described by their volume. The wells do not need to be circular or oval. The wells may have a triangle, rectangular, or irregular shape.

The wells are preferably formed from a material that is biocompatible. Examples of well materials include epoxy, hydrogel, polydimethylsiloxane, polyurethane, and polyethylene glycol. The wells may be formed using photolithography, such as photoresist techniques, for example, SU-8 2015 (Kayaku Advanced Materials Inc.). The wells may also be formed from the photoresist material itself. Laser micromachining is another possible method for forming the wells.

Figure 9:
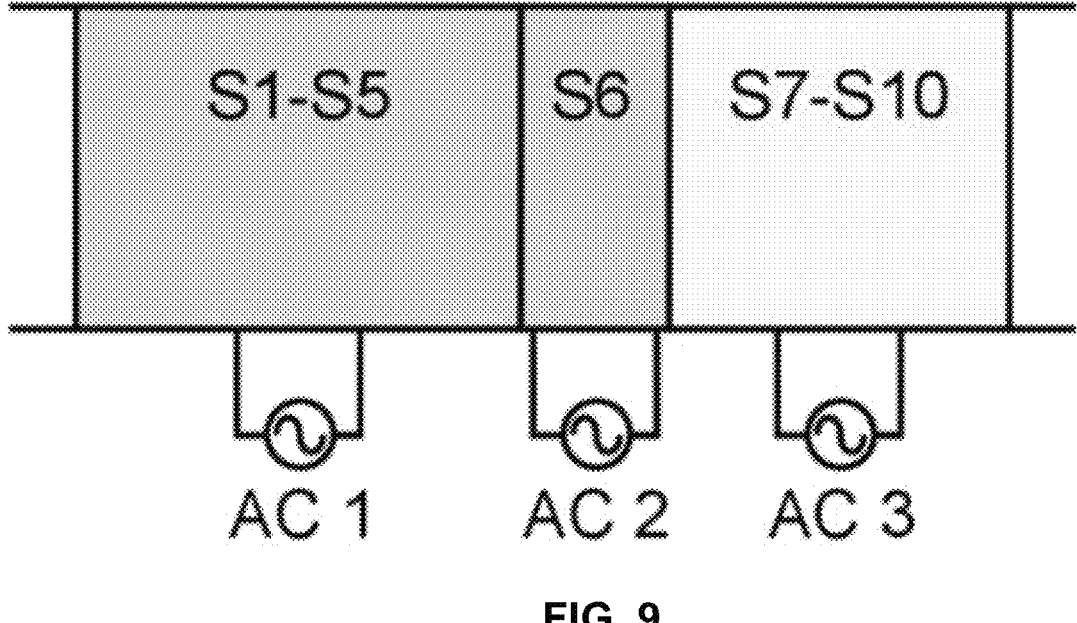
FIG. 9 is a schematic of a microfluidic platform showing that each sector can operate individually or combined with adjacent sectors to capture a specific cell type.

The number of wells may be 2 to 1,000,000, more preferably 100 to 10,000, most preferably 1000, 2000, 3000, 4000, 5000, 6000, 7000, 8000, 9000, or 10,000 wells. The wells may be divided into sectors, with each sector having different sized wells. The sectorial structure allows for straightforward multistage sorting designs when a large number of different polarizable agent types are required to be sorted and eliminates the need to increase the number of output channels for each additional agent. Due to the simplicity of the design, the number and size of each sector as well as the well size can be readily modified, facilitating easy adjustment of the platform to the desired target sample. The number of sectors may be 1 to 20 sectors, more preferably 2, 3, 4, 5, 6, 7, 8, 9, 10, 12, 14, 16, or 18 sectors. FIG. 9 illustrates a microfluidic chip, where different voltages are applied to different sectors in order to capture different agents. In FIG. 9, there are 10 sectors, with sectors 1-5 having a first voltage difference between the adjacent electrodes of these sectors, sector 6 having another voltage difference between the adjacent electrodes, and sectors 7-10 having a third voltage difference between adjacent electrodes.

The microfluidic channel may be formed by enclosing the upper section of the well array, defining the microfluidic channel. The top portion that encloses the well array may be formed separately from the well array, and bonded to the well array. Preferably the microfluidic channel or channels are formed as a passageway using a negative mold and a polymer such as polydimethylsiloxane (PDMS). The microfluidic channels may be formed using other suitable materials that will not interfere with the sorting process. The top layer may be formed from similar materials as the well array, including glass, epoxy, hydrogel, polydimethylsiloxane, polyurethane, and polyethylene glycol. The microfluidic channels may be formed by bonding a top portion to the chip (the substrate, electrodes and wells) to define the channels. The portions may be bound together using silanization, an adhesive or other suitable techniques. An input lumen and an output lumen are formed on the ends of the microfluidic channel, and may be connected to one or more input tubes and one or more output tubes.

Figure 3:
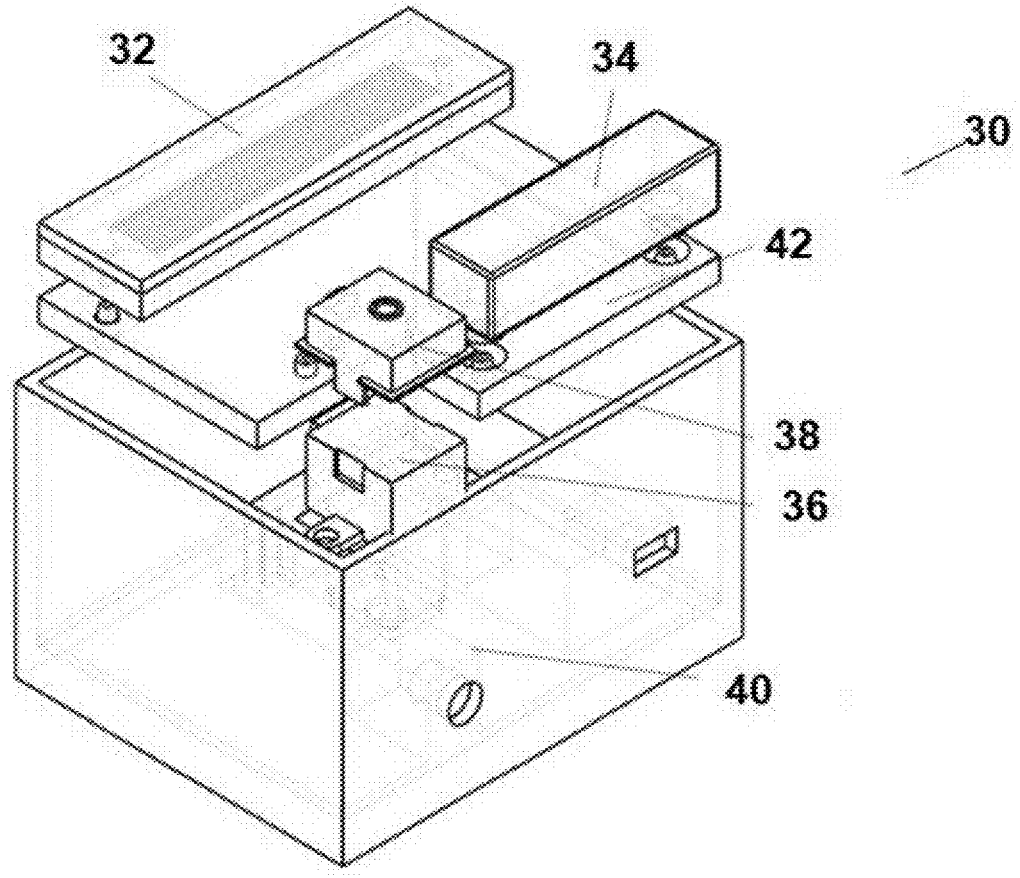
FIG. 3 illustrates the microfluidic chip and the fluid control system.

FIG. 3 illustrates a fluid control system, 30 with a microfluidic chip, 32. A sample bottle, 34, holds a liquid sample. The liquid sample flows into the microfluidic chip, which sorts and quantifies agents that are present in the liquid sample. The motor, 36 and motor head, 38, provide force to introduce the liquid sample into the microfluidic chip. The motor is controlled by the controller, 40. A platform, 42 supports the microfluidic chip. The motor may be a pump, such as a syringe pump.

The flow rate of the sample through the microfluidic chip may be adjusted to improve the cell capture efficiency of the microfluidic chip. The flow rate may also be selected based on the surface area of the chip or the DEP force that is applied by the electrodes. The flow rate is preferably 0.01 μL/minute to 100 μL/minute, more preferably 0.1 to 10 μL/minute, most preferably, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 3.0, 4.0, 5.0, 6.0, 7.0, 8.0 and 9.0 μL/minute. Preferably the flow rate and well configuration and size reduce the probability of more than one polarizable agent being captured by each well, while maintaining a high capture efficiency.

Figures 4, 5:
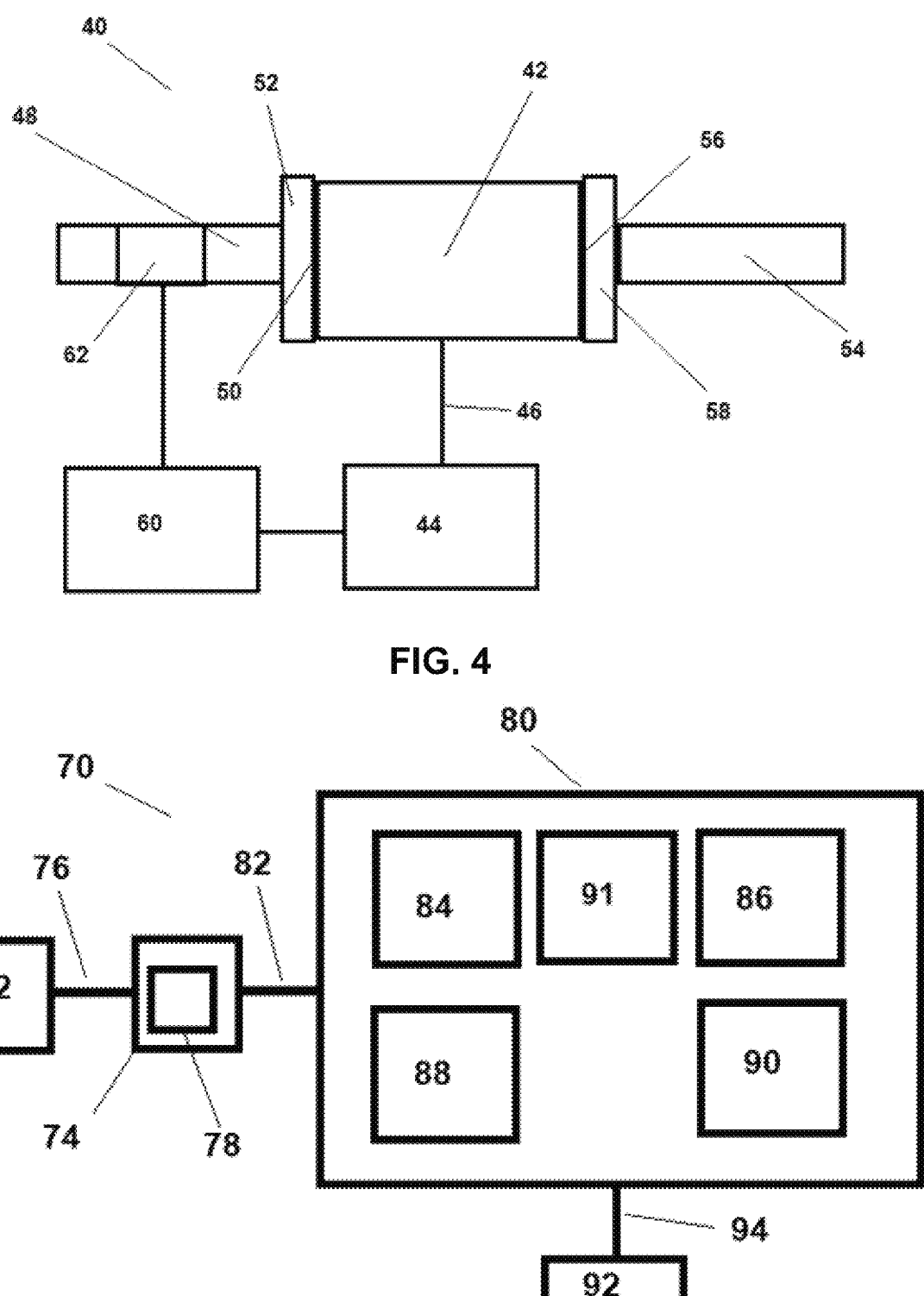
FIG. 4 illustrates the microfluidic system, including the microfluidic chip, the controller and the fluid control system.
FIG. 5 illustrates the microfluidic system.

FIG. 4 illustrates a microfluidic system, 40. The system includes the microfluidic chip, 42, which is connected to a controller, 44, via electrical connections, 46. A fluid sample is introduced into the microfluidic chip via an input tube, 48. The fluid sample enters the microfluidic chip through the input lumen, 50. The input tube is connected to the microfluidic chip with an input connector, 52. After agents in the sample are sorted and identified, the fluid flows from the microfluidic chip to an output tube, 54, via an output lumen, 56. The output lumen is connected to the microfluidic chip with an output connector, 58. The input and output connector may be made of plastic, metal or other suitable materials. The fluid control system, 60, which is illustrated in FIG. 3, controls the fluid flow rate. The fluid control system may operate a pump, 62 to move the liquid sample into and through the microfluidic chip. The fluid control system may also be electrically connected to, and controlled by the controller.

FIG. 5 illustrates the microfluidic system, 70. The system includes the microfluidic chip, 72, which is connected to the chip holder, 74, via electrical connections, 76. The chip holder has switches, 78, for controlling the electrodes of the microfluidic chip. The chip holder is connected to the controller, 80, via an electrical connection, 82. The controller includes a function generator, 84 to generate a DEP force between electrodes. The controller includes an oscilloscope, 86 to measure the applied signal. The controller also includes an impedance analyzer, 88, a CPU, 90, and a memory, 91. The various subparts of the controller may be implemented via software or a programmable chip or general-purpose computer storied in a memory. The computer processor can analyze the impedance measurements to determine the quantity of a polarizable agent captured in the wells. The controller is preferably connected to a display monitor, 92, which may be connected by wires, 94, or through a wireless connection.

The DEP signal amplitude may be varied based on the selected sample and the polarizable agent that is to be sorted in the sample. For example, the peak-to-peak voltage ($V_{PP}$) may be 1 to 100 $V_{PP}$, more preferably 5 to 50 $V_{PP}$, most preferably, 6, 7, 8, 9, 10, 11, 12, 13, 14, 15, 20, 25, 30, 35, 40, or 45 $V_{PP}$. The frequency of the DEP signal can also be varied to capture polarizable agents. The frequency may be 1 to 10,000 kHz, more preferably 100 kHz to 1,000 kHz, most preferably 125, 150, 175, 200, 225, 250, 275, 300, 325, 350, 375, 400, 425, 450, 475 or 500, 550, 600, 650, 700, 750, 800, 850, 900, or 950 kHz.

The controller may be used to control the electrode voltages. The controller may be programmed to operate each electrode individually, or to operate the electrodes in segments. The controller preferably includes a memory storing the DEP force that is appropriate to capture specific polarizable agents. The controller may also determine the number and/or identify the polarizable agents present in a sample by calculating difference in the impedance between two electrodes when a polarizable agent is present between the electrodes, compared to when there are no polarizable agents occupying the space between the electrodes. When the polarizable agent is described as being "between" the electrode, it is understood that the polarizable agent does not need to be directly between the electrode, but may be positioned above the electrodes as well.

The capture mechanism allowing the chip to trap cells in wells is based on the dielectrophoretic (DEP) force. When an electrically polarizable agent such as a cell enters a nonuniform electric field, it will become subject to a DEP force ($F_{DEP}$) arising from the interaction between the electric field and the induced dipole of the agent. $F_{DEP}$ acting on an agent with radius r is given by Formula 1, where $\varepsilon_p^*$ and $\varepsilon_m^*$ are the complex dielectric properties of the agent and surrounding medium, respectively, r is radius, and E is the applied electric field.

$$F_{DEP} = 2\pi\varepsilon_m r^3 \text{Re}\left\{\frac{\varepsilon_p^* - \varepsilon_m^*}{\varepsilon_p^* + 2\varepsilon_m^*}\right\}\nabla |E_{rms}|^2 \qquad \text{Formula 1}$$

The bracketed fractional term is the Clausius-Mossotti (CM) factor and determines whether the agent experiences a positive force (pDEP) toward regions of maximum electric field gradient or a negative force (nDEP) toward regions of minimum electric field gradient. Note that, unlike electrophoresis, $F_{DEP}$ does not directly depend on the charge of the agent and may act on uncharged agents.

Figure 13:
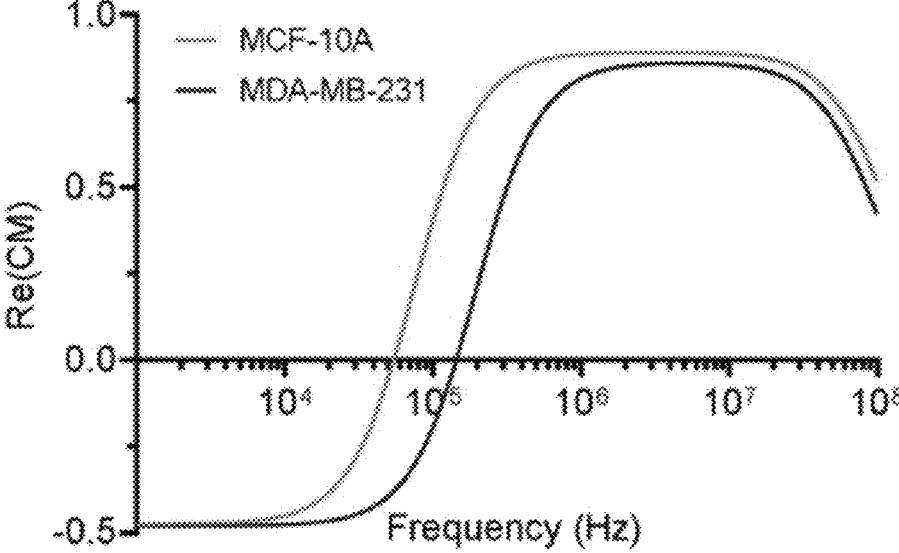
FIG. 13 is a graph of the real part of the CM factor for malignant breast cells (MDA-MB-231) and benign breast cells (MCF-10A) plotted against the frequency.

For biological samples, such as mammalian cells, the dielectric properties are closely tied to the physiological characteristics such as cytoplasm resistance or cell membrane capacitance. Since cancerous and healthy cells have significantly different properties, different cell types in a mixed sample will be affected differently by $F_{DEP}$. Therefore, DEP can be used as the primary means of cell sorting, allowing for selective and label-free cell sorting and capture by pulling the cell into a well, which is positioned between two electrodes. DEP capture neither damages the cell nor changes the cell phenotype, as was confirmed by a viability experiment. To generate the nonuniform electric field necessary for DEP capture, a sinusoidal voltage was applied to the IDEs through a chip holder or controlled by a controller. The chip holder allowed for the application of individual signals to each sector but could also be externally configured to apply the same signal to an arbitrary number of adjacent sectors via routing switches. The electrode configuration is externally controlled, and the appropriate amplitude necessary to capture various types of cells or biological agents may be easily determined without undue experimentation by conducting experiments using different amplitudes and frequencies and counting the number of biological agents captured to determine the capture efficiency of various amplitudes. For example, see FIG. 13, showing the real CM factor for benign breast cells and malignant breast cells. The difference in properties allows the malignant breast cells to be differentially sorted from the benign breast cells. The dielectric properties of common clinically relevant cell lines are typically well studied. In case that one or multiple of the cell types in a mixed sample have unknown properties, prior experiments may be used to determine each cell type's dielectric properties.

Figure 20A:
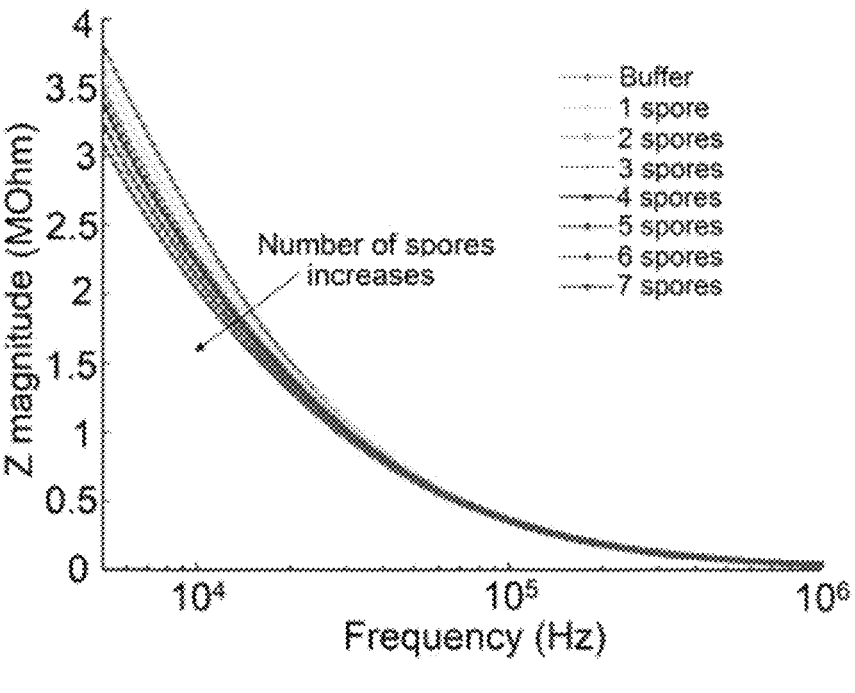
FIG. 20A is a graph showing the magnitude of impedance versus frequency as a function of the number of single spores captured in a column of the well array.
Figure 20B:
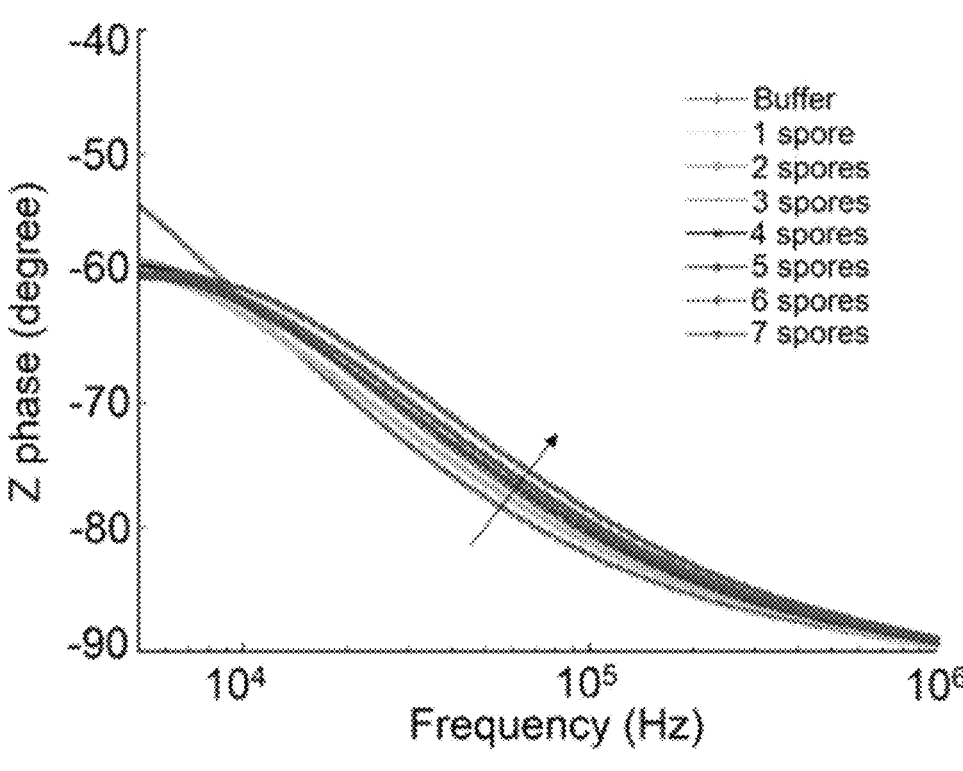
FIG. 20B is a graph showing phase of impedance versus frequency.
Figure 20C:
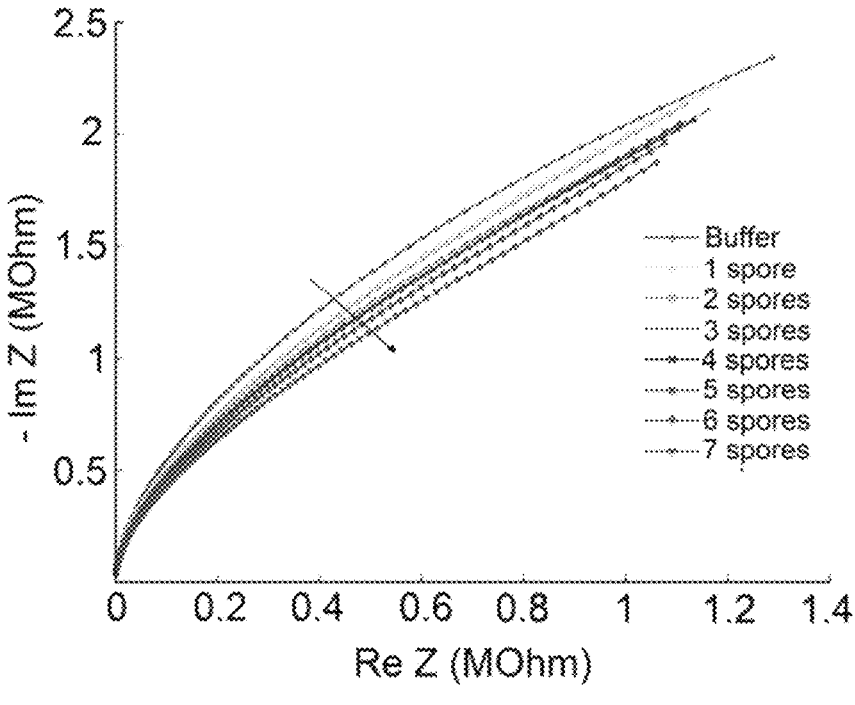
FIG. 20C is a Nyquist plot with equivalent circuit model.
Figure 20D:
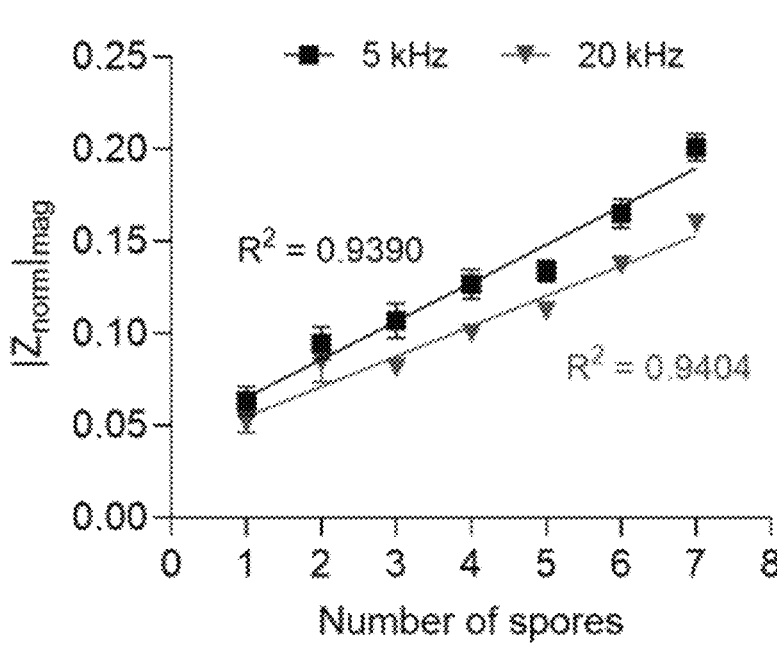
FIG. 20D is a calibration curve of the normalized impedance magnitude at 5 kHz and 20 kHz.
Figure 20E:
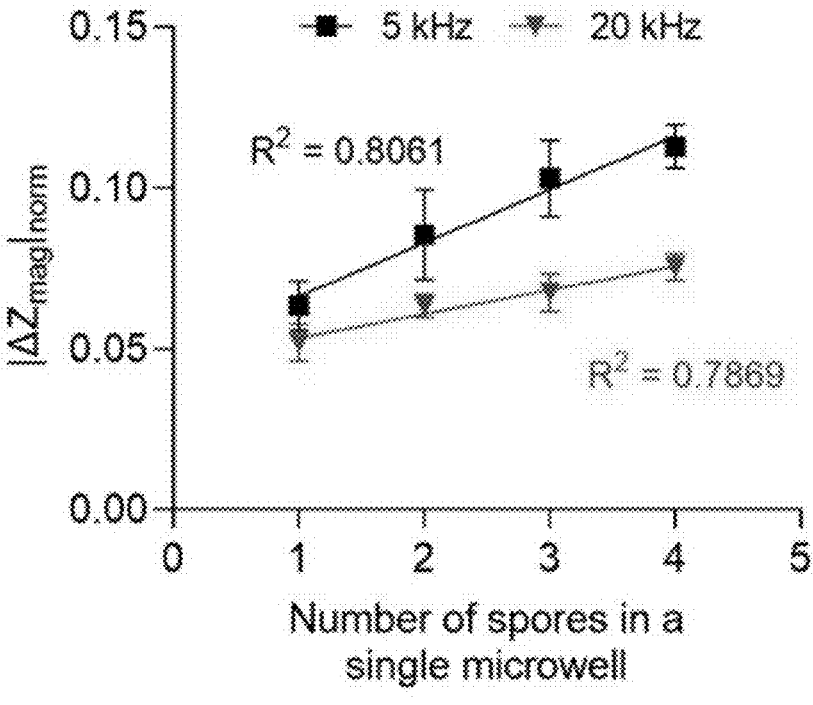
FIG. 20E is a calibration curve of the normalized impedance magnitude at 5 kHz and 20 kHz when spores are captured in a single well.
Figure 20F:
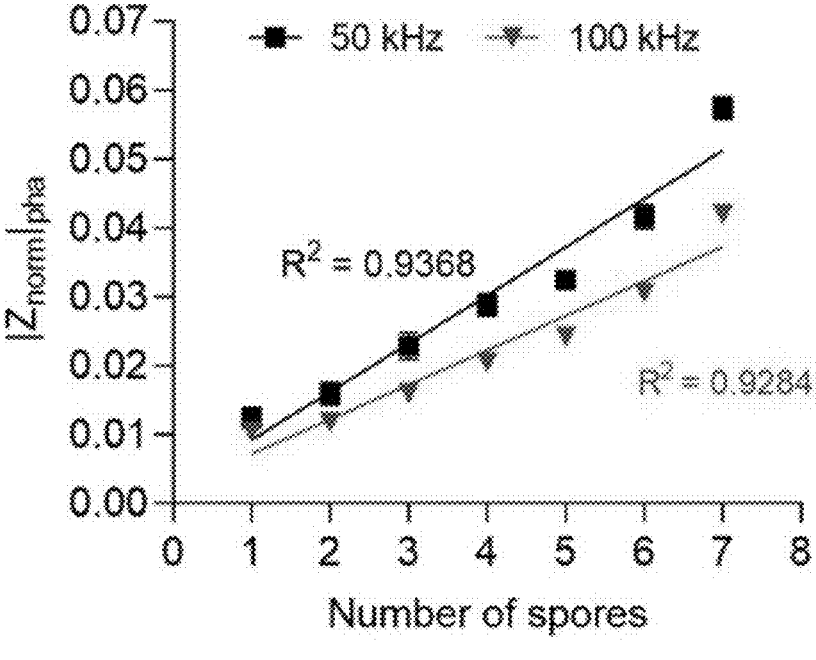
FIG. 20F is a calibration curve of the normalized impedance phase at 50 kHz and 20 kHz.
Figure 20G:
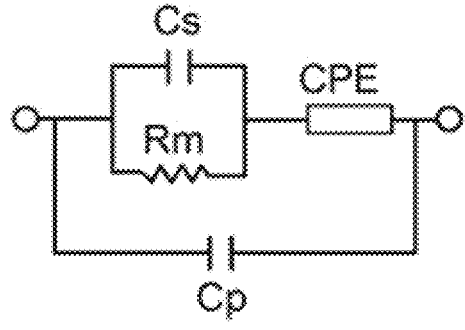
FIG. 20G is a diagram of the equivalent circuit model.

The impedance caused by the presence of a polarizable agent in the wells may be determined by determining the resistance of the device with a buffer solution, and comparing the impedance measurement to filled wells, and determining the impedance associated with the filled wells, for a given polarizable agent. FIG. 20G depicts the equivalent circuit model. $R_m$ models the solution resistance, which is in parallel with the solution capacitance ($C_s$). The constant phase element (CPE) models the electrical double-layer at the electrodes, all in parallel with a parasitic capacitance $C_p$, which accounts for parasitic effects introduced by the connection cables, chip holder, and substrate. The simplified equivalent circuit is well-studied and commonly used to describe the electrode-electrolyte interface in interdigitated electrode sensors. By fitting the experimental data to the equivalent circuit, it was verified that the captured agents will mainly induce changes in $R_m$, $C_s$, and CPE, contributing to the total impedance change of the system. Changes in the number of captured agents can effectively modulate the impedance response of the device, allowing for quantification of the polarizable agents. Preferably the impedance is measured over a range of frequencies, for example from 1 kHz to 1 MHz.

After the polarizable agent has been sorted into wells, the polarizable agents from one or more of the sectors of the microchip may be released from the wells of that sector. After the polarizable agents are released, additional analysis may be performed. For example, the polarizable agent may be single cells such as cancer cells. The cells may be sequenced using single cell sequencing techniques.[7A,8A] The cells may also be analyzed to measure protein concentrations, specific RNA concentrations or other cells properties. Mass spectroscopy may be used to analyze the polarizable agents and identify chemical compounds of interest.

EXAMPLES

Example 1: Selective Single-Cell Sorting Using a Multisectorial Electroactive Well Platform Example 1 describes an Electroactive Well Platform and experiments demonstrating the ability of the platform to sort cells. The platform consists of 10,000 nanoliter wells which were placed on top of interdigitated electrodes (IDEs) that facilitate dielectrophoresis-driven capture of cells. By use of a multisectorial design formed by 10 individually addressable IDE structures, the platform can capture a large number of different cell types. The sectorial approach allows for fast and straightforward modification to sort complex samples as different cell types are captured in different sectors and therefore removes the need for individual output channels per cell type. Experimental results obtained with a mixed sample of benign (MCF-10A) and malignant (MDA-MB-231) breast cells showed a target to nontarget sorting accuracy of over 95%.

Design and Operating Principle.

Figure 6:
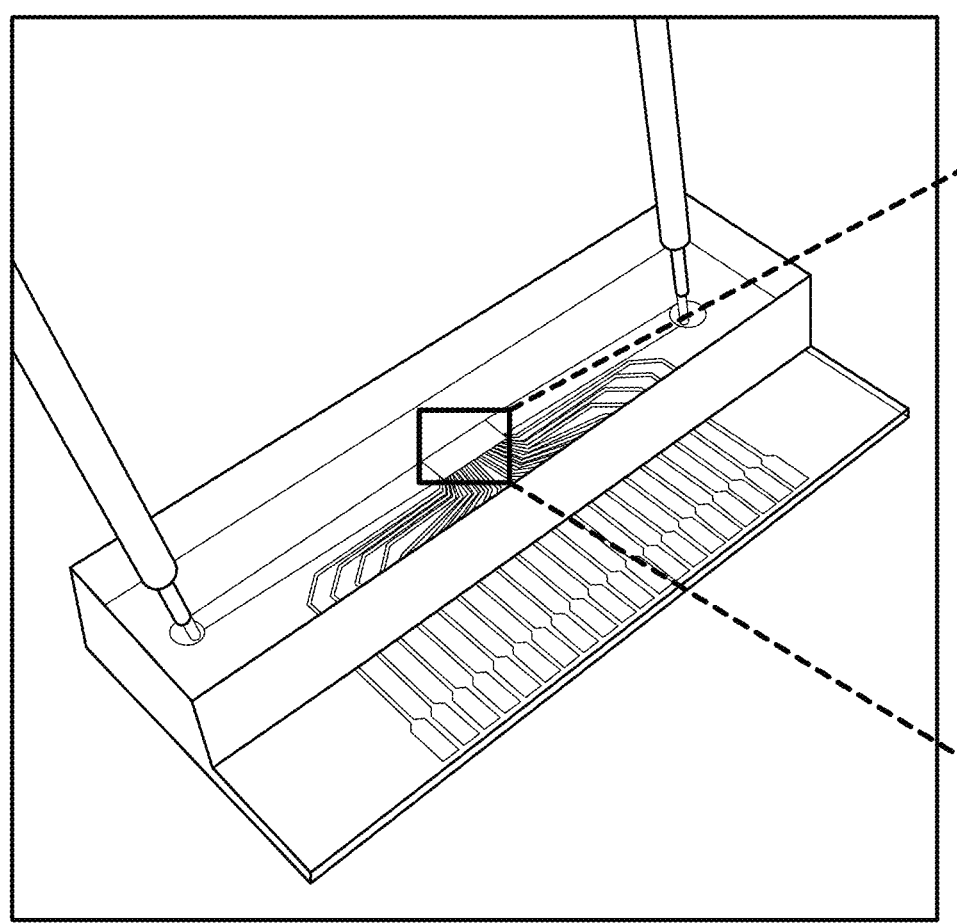
FIG. 6 is an assembled microfluidic chip.
Figure 7:
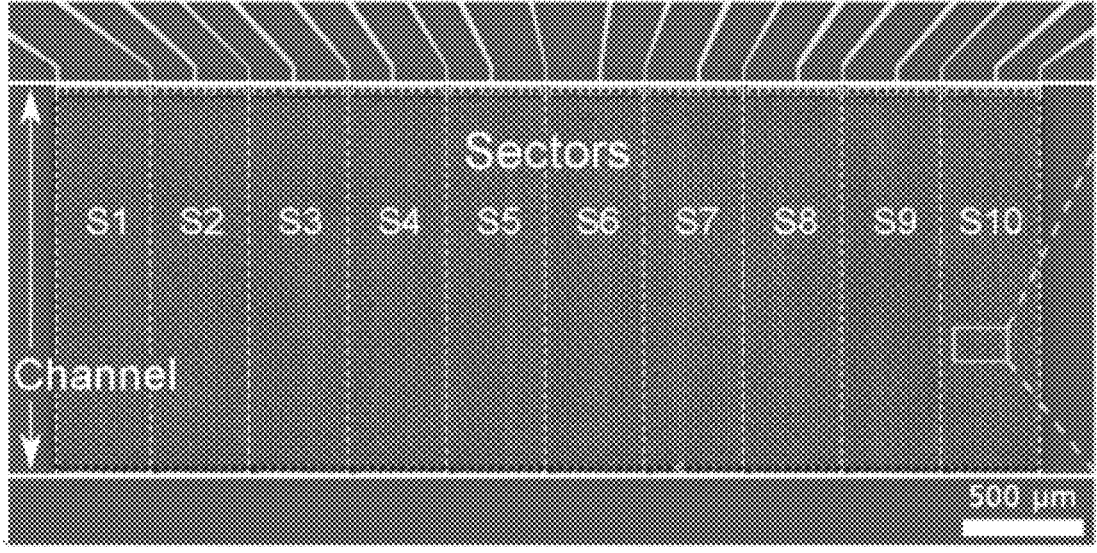
FIG. 7 is a microscopic image of a portion of FIG. 6, showing the wells and the interdigitated electrodes (IDEs), including 10 sectors, with each sector containing 1000 wells.
Figure 8:
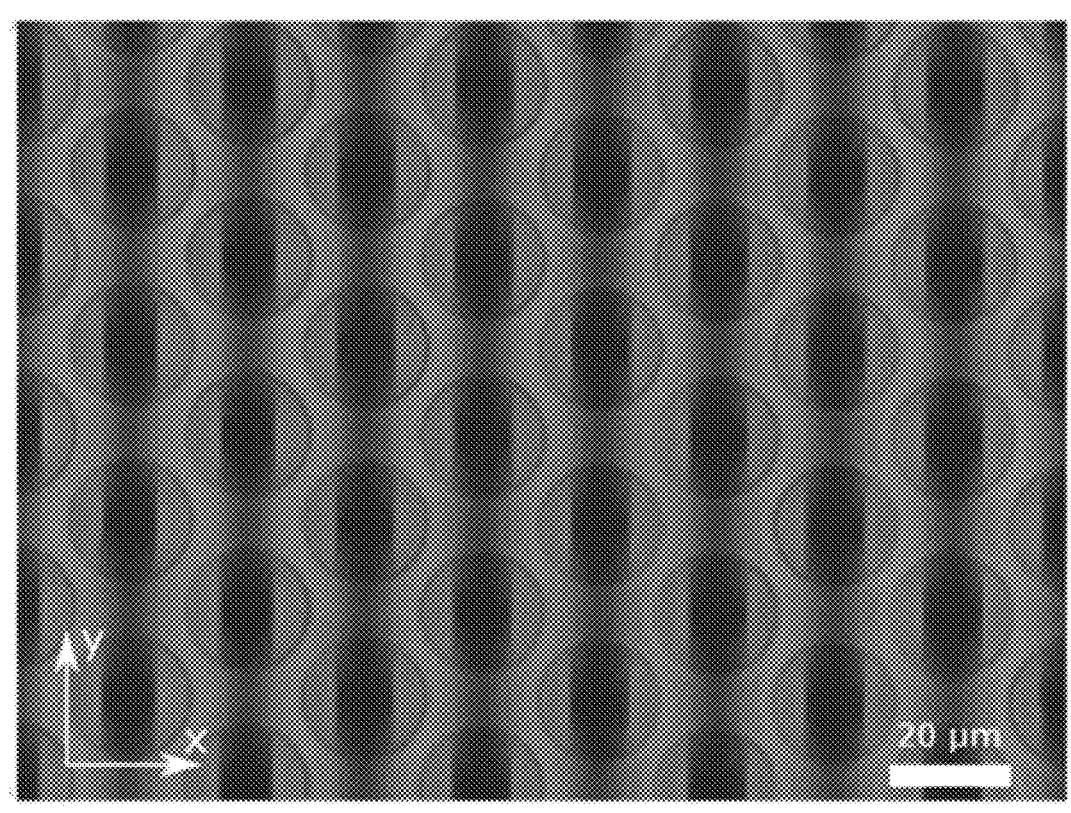
FIG. 8 is a microscopic image of a portion of FIG. 7 showing details of the wells and IDE structure.

The microfluidic platform (FIG. 6) was designed and fabricated with a total of 10 individually addressable sectors. Each sector contains an interdigitated electrode (IDE) structure formed by 20 coplanar gold interdigitated nanoelectrodes with a thickness of 100 nm (90 nm gold on 10 nm chromium). The nanoelectrodes are 14 μm wide and are separated from each other by a 6 μm gap, which is also the gap spacing between adjacent sectors. On top of each IDE sector, 1000 wells made of SU-8 photoresist were placed in a 50 by 20 well matrix, resulting in a total well count of 10 000 per chip (FIG. 7). The wells were placed in a pattern akin to hexagonal packing to ensure that cells flowing horizontally across the chip would always pass over a minimum number of wells. As shown in FIG. 8, this particular placement enabled cell capture independent from the initial y-position of the target cell. A microfluidic channel distributed fluid and cell flow evenly across the entire chip and connected inlet and outlet ports.

The well size was determined based on the cell size of cells present in the sample. The target cell lines for this study, MDA-MB-231 and MCF-10A, have been reported to generally have a diameter between 11 and 19 μm. The cultured cells showed an average diameter of 14 μm for MDA-MB-231 cells and 17 μm for MCF-10A cells. On the basis of these results, chips with a well diameter and depth of 20 μm were fabricated. While a larger well size or a greater ratio between cell size and well diameter may be used and still facilitate reliable cell capture, solely single-cell capture can only be achieved if the well is designed based on the dimensions of the target cell.

Experimental Setup of DEP-Assisted Cell Capture.

To evaluate the cell capture performance of the microfluidic platform, two sets of experiments examining the dependencies on flow rate and applied voltage were designed on chips with 20 μm well diameter. All experiments were repeated three times on three different chips. Before loading cells, the chips were primed by slowly injecting 250 μL of ethanol at a flow rate of 10 μL/min to remove air bubbles from within the wells. Subsequently, 250 μL of DEP buffer was flowed through the channel to remove the excess ethanol. Then, a homogeneous 5.5 μL sample of viable MDA-MB-231 cells resuspended in DEP buffer was introduced into the chip with varying flow rate and DEP capture voltage conditions. Cells were counted and prepared to be at a concentration of 200 cell/μL, resulting in a total number of 1100 cells per injected cell sample. This number is 10% higher than the number of wells per sector and was chosen to account for potential cell loss during sample transfer and sample introduction into the chip. To enhance visibility, cells were stained with the fluorescent dye acridine orange 10 minutes prior to loading. After the entire sample volume had passed through the chip, a washing step removing any cells not captured in wells was performed by injecting DEP buffer for 3 min at a flow rate of 75 μL/min. The DEP signal stayed turned on during the washing step to ensure that captured cells did not leave their respective well.

Influence of Flow Rate on Cell Capture Performance.

Figure 11A:
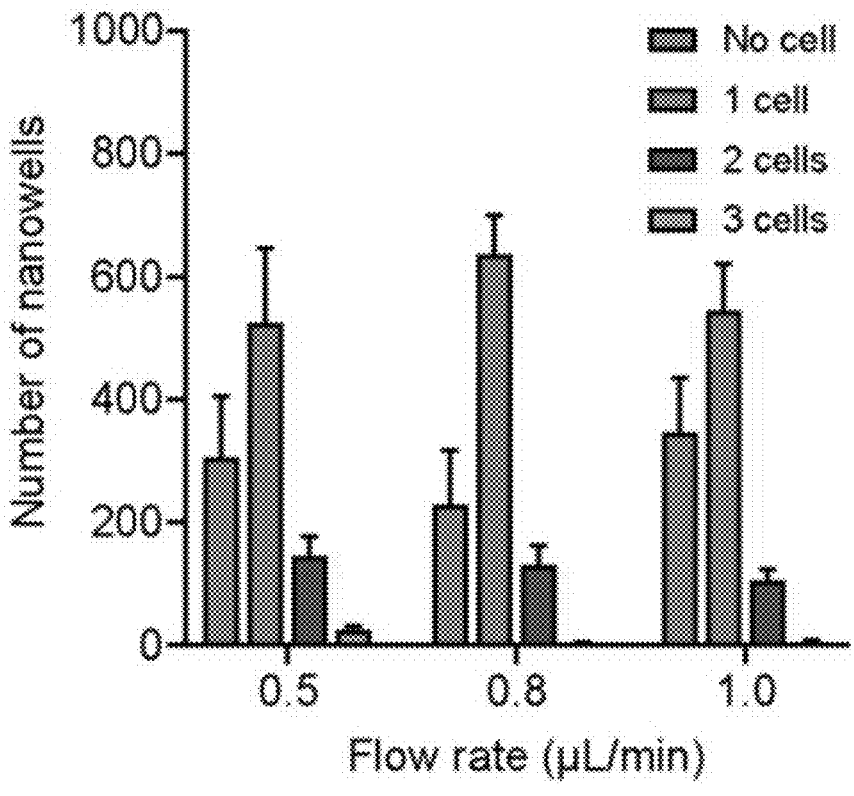
FIG. 11A is a graph showing sector occupancy states obtained for different flow rates and a fixed DEP of 15 $V_{PP}$.
Figure 11B:
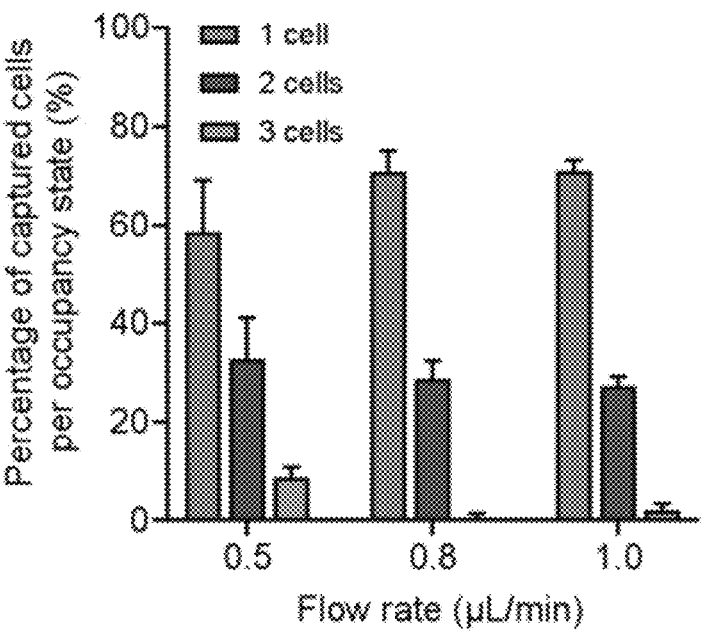
FIG. 11B is a graph showing the distribution of sector occupancy states obtained for different flow rates and a fixed DEP of 15 $V_{PP}$.
Figure 11C:
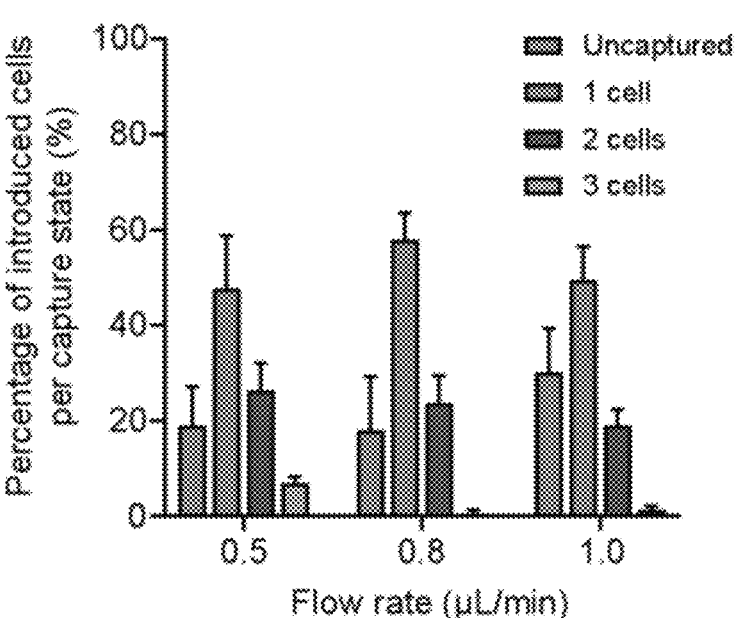
FIG. 11C is a graph showing the capture state distribution of all introduced cells obtained for different flow rates and a fixed DEP of 15 $V_{PP}$.

In the first set of experiments, cell samples were introduced at varying flow rates of 0.5 μL/min, 0.8 μL/min, and 1 μL/min while the amplitude of the applied sinusoidal capture signal was kept at a peak-to-peak voltage of 15 $V_{pp}$ and 1 MHz. Initial test runs showed that wells were predominantly found in one of the following states of occupancy: a 0-cell state (in which no cell was captured and the well is empty), a 1-cell state (in which a single cell was captured by a particular well), and the less likely 2-cell and 3-cell states (following the same nomenclature). As shown in FIG. 11A, the highest well occupancy was observed at a flow rate of 0.8 μL/min, with cells in the 1-cell state occupying 636 wells and cells in the 2-cell state occupying 130 wells. Additionally, the occurrence of the 2-cell and 3-cell states was highest at the lowest measured flow rate with 145 wells and 26 wells, respectively. The distribution of the occupancy states over all captured cells (FIG. 11B) was similar for flow rates of 0.8 μL/min and higher (less than 5% relative difference). At lower flow rates, the 3-cell state was found to occur at a significantly increased rate (p=0.0005, one-way ANOVA). The overall capture efficiency with respect to the total number of introduced cells is shown in FIG. 11C. At a flow rate of 0.8 μL/min, the percentage of uncaptured cells was minimized at 18.00% while the percentage of cells in the single-cell capture state was maximized at 57.85%. As those were the best possible observed conditions for single-cell capture, a flow rate of 0.8 μL/min was used during all subsequent experiments.

Influence of Signal Amplitude on Cell Capture Performance.

Figure 12A:
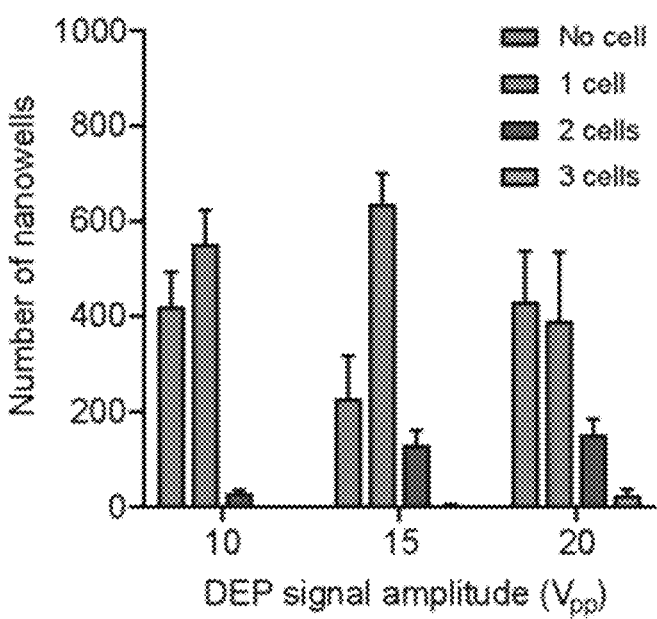
FIG. 12A is a graph showing sector occupancy states obtained for different DEP signal amplitudes rates and a fixed flow rate of 0.8 μL/minute.
Figure 12B:
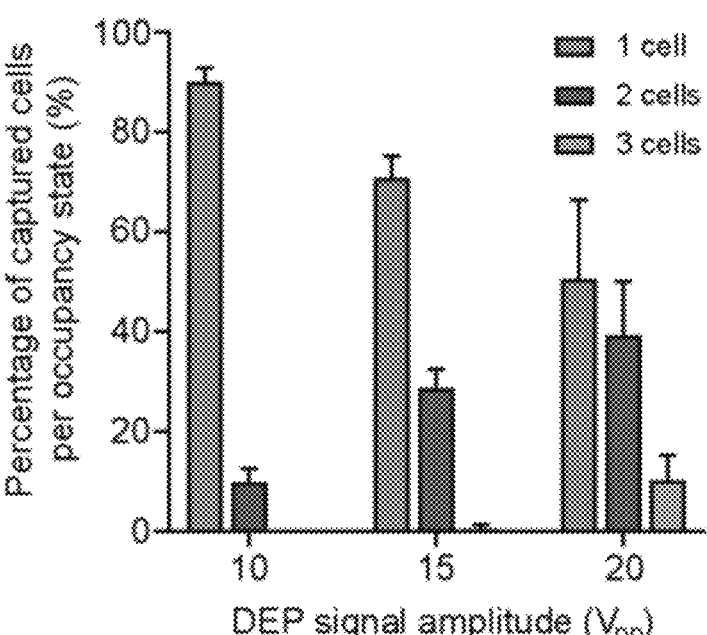
FIG. 12B is a graph showing the distribution of sector occupancy states obtained for different DEP signal amplitudes rates and a fixed flow rate of 0.8 μL/minute.
Figure 12C:
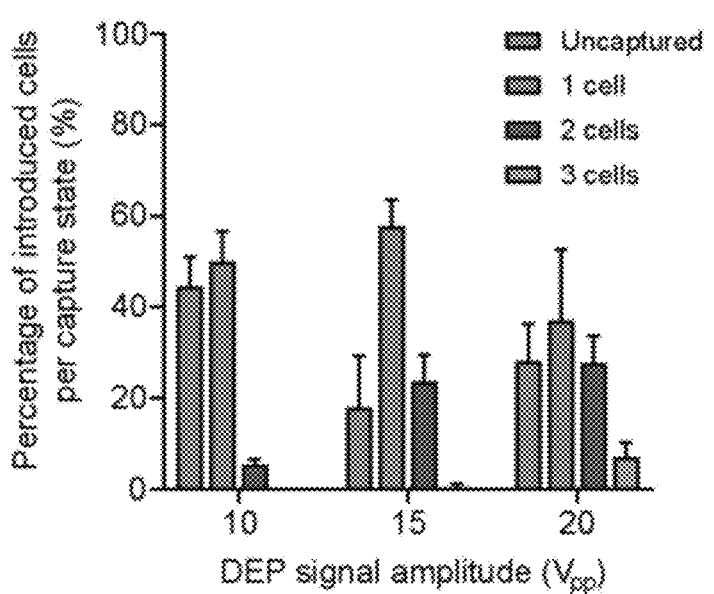
FIG. 12C is a graph showing the capture state distribution of all introduced cells obtained for different DEP signal amplitudes rates and a fixed flow rate of 0.8 μL/minute.

The second set of experiments examined the dependency between cell capture and applied DEP signal amplitude. Cell samples were loaded into the chip at a constant flow rate of 0.8 μL/min while the DEP signal amplitude was set to 10 $V_{pp}$, 15 $V_{pp}$, and 20 $V_{pp}$. As seen in FIG. 12A, experiments with a signal amplitude of 15 $V_{pp}$ showed a significantly lower number of empty wells than other voltages with 228 wells (p=0.027) as well as the overall highest number of wells in the 1-cell state with 636 wells. While the results shown in FIG. 12B suggest that the percentage of captured cells in the desirable 1-cell state increased with decreasing signal amplitude, this trend was counteracted by the overall decrease in the number of captured cells at lower voltages (FIG. 12C). From this it follows that it is more likely to observe the 2-cell and 3-cell states at higher voltages. While not relevant for the current aim of single-cell capture, this effect may be of interest for other experiments. For the tested signal amplitudes, 15 $V_{pp}$ provided the highest percentage of introduced cells in the 1-cell state with 57.85% and the lowest percentage of uncaptured introduced cells with 18.00%.

Experimental Setup of DEP-Assisted Cell Sorting.

Figure 10:
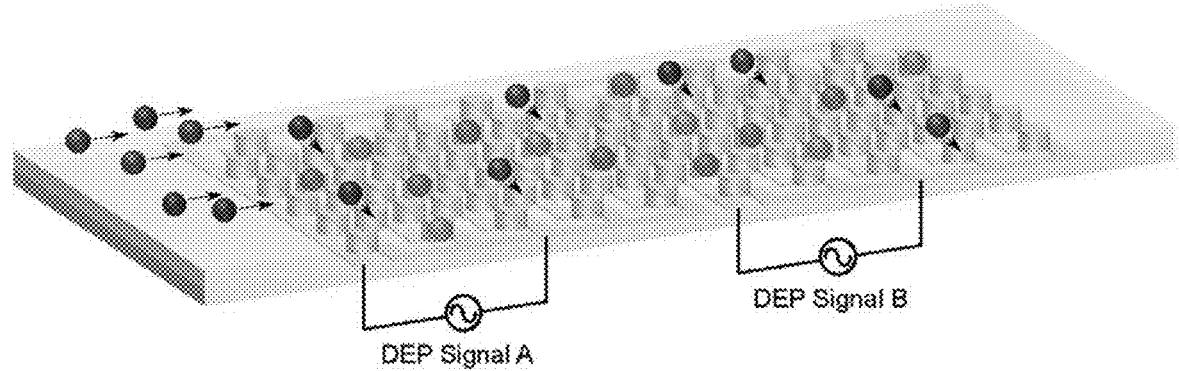
FIG. 10 is a schematic representation showing the capture of cells using DEP on a microfluidic chip.

To evaluate the cell sorting performance of the platform with a clinically relevant mixed sample, several experiments were designed. The direction of DEP force follows from the frequency dependence of the CM factor and hence varies for different cell types at a given frequency. Therefore, it is possible to facilitate DEP based cell sorting by tuning the frequency in such a way that only one cell type is attracted toward the wells. In the first experiment, the DEP signal settings were chosen to enable capture of all introduced cells in the sectors where the signal was applied (FIG. 10). Contrary to that, the second experiment was aimed at sorting the two cell types by adjusting the DEP signal frequency so that only one cell type would be captured in the wells. Lastly, a third control experiment that applied different DEP signals to two separate groups of sectors was conducted. Whereas the signal applied to the first group of sectors only enabled DEP capture of a single cell type, a signal facilitating capture of both cell types was applied to the subsequent group of sectors.

A mixed sample of MDA-MB-231 and MCF-10A cells, in the following paragraph referred to as 231-cells and 10A-cells, was prepared at a final concentration of 100 cells/μL. To allow for optical detection, 231-cells transduced with the mEmerald green fluorescent protein and 10A-cells stained with the red fluorescent cell linker PKH26 were combined at a 1:1 ratio. Cells were injected into the chip at a flow rate of 0.8 μL/min while a DEP signal with an amplitude of 15 $V_{pp}$ was applied. To determine the frequency range required for successful DEP sorting, the real part of the CM factor was calculated and plotted for both cell types (FIG. 13). Cells were modeled with a single-shell model and with dielectric parameters reported elsewhere. Note that the dielectric properties of common clinically relevant cell lines are typically well studied. In case that one or multiple of the cell types in a mixed sample have unknown properties, prior experiments may be required for their determination.

Figure 14:
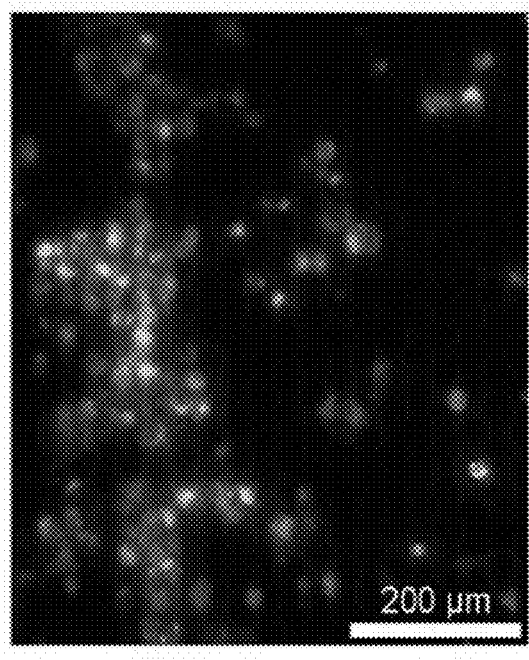
FIG. 14 is a fluorescent image taken with DEP settings for exclusive capture of 10A-cells.
Figure 15:
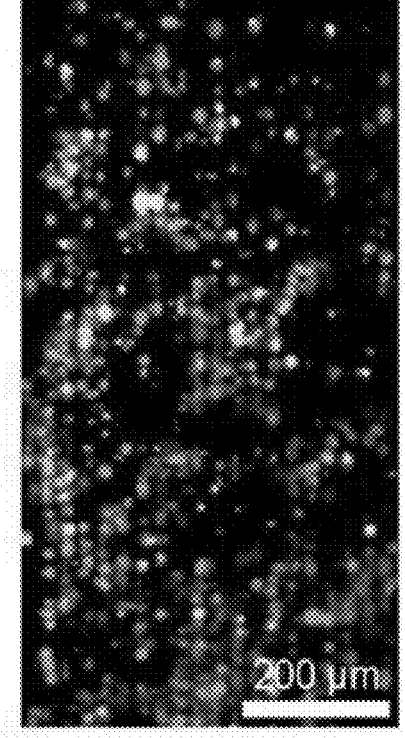
FIG. 15 is a fluorescent image taken with DEP settings for the capture of both 231-cells and 10A-cells.

The curve obtained for 10A-cells is strictly higher than the curve for 231-cells for positive values, indicating that it is very unlikely to capture 231-cells without also capturing 10A-cells. On the basis of the plot, a frequency of 250 kHz was chosen for exclusive capture of 10A-cells (FIG. 14). The 10A-cells appear as lighter gray. At this frequency, the CM value of 10A-cells slowly approaches its maximum value, whereas the CM value for 231-cells is still small and cell capture hence unlikely. Furthermore, a frequency of 1 MHz was chosen for control measurements as at this value both curves are close to their respective maxima, allowing for both cell types to be captured (FIG. 15). The 10A-cells appear as lighter gray, and the 231-cells appear as darker gray.

Accuracy of Selective Single-Cell Sorting.

The experiments described earlier were conducted three times on different chips with the chosen frequencies. Measurements were taken at different sector occupancies and injection times to provide for a time and occupancy-independent performance analysis.

Figure 16A:
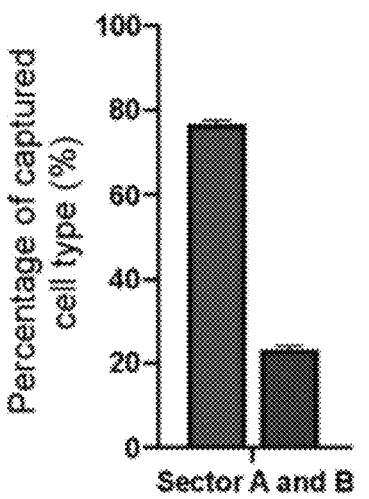
FIG. 16A is a graph showing the distribution for sorted cells with a frequency of 1 MHz in both sectors, and a schematic representation of the flow of agents through sector A and sector B along the microfluidic channel.
Figure 16A:
Figure 16B:
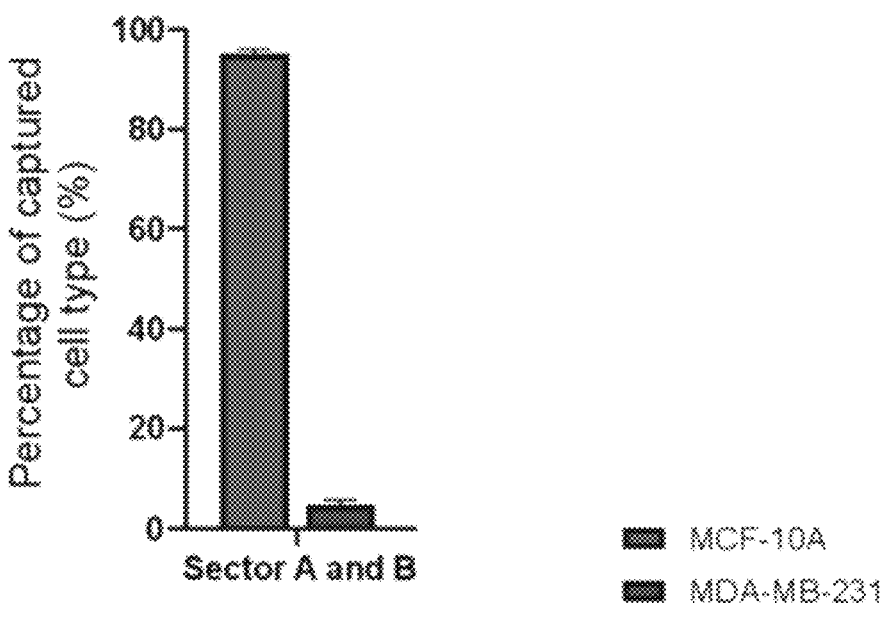
FIG. 16B is a graph showing the distribution for sorted cells with a frequency of 250 MHz in both sectors.

FIG. 16A and FIG. 16B show the percentages of captured cell types at frequencies ($f_{DEP}$) of 1 MHz and 250 kHz, respectively. At the control frequency of 1 MHz, 76.72% of the captured cells were 10A-cells. At a frequency of 250 kHz, which was predicted to maximize the 10A-cell capture rate, over 95% of all captured cells were 10A-cells. This demonstrates the viability of the platform as a reliable cell sorting device. Frequencies required for the cell capture of other cell types can be computed with the appropriate multishell model.

Figure 16C:
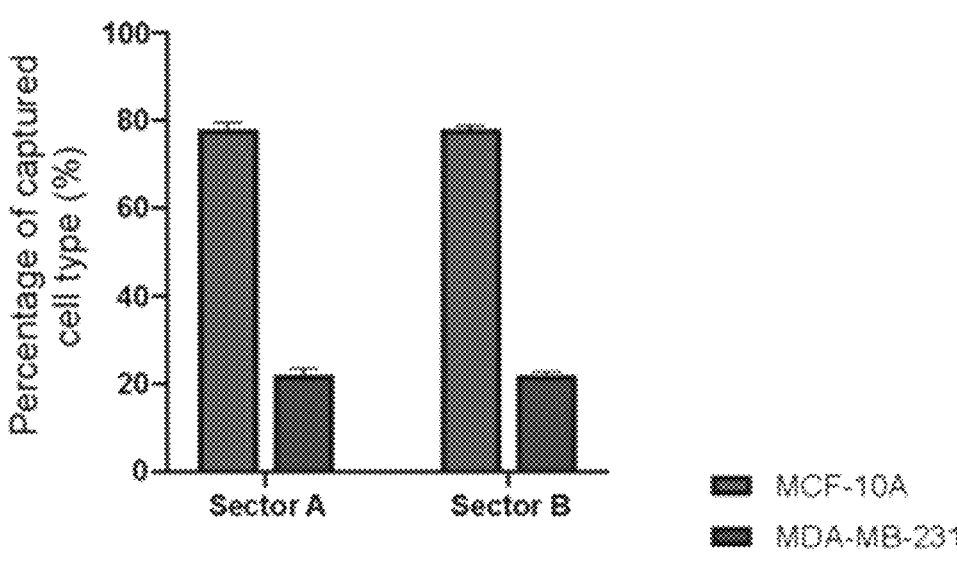
FIG. 16C is a graph showing the distribution for sorted cells with a frequency of 1 MHz in sector A and 3 MHz in sector B.
Figure 16D:
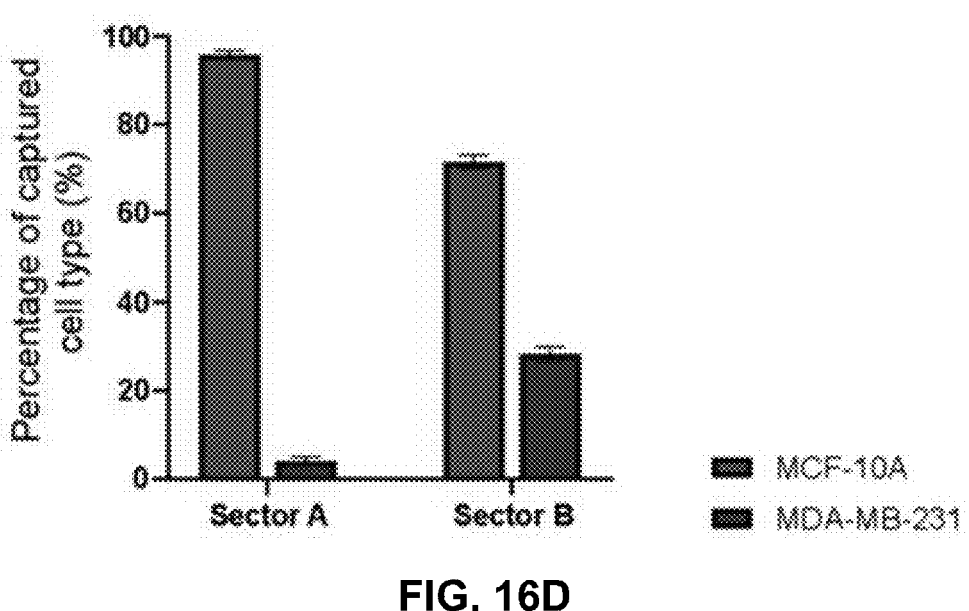
FIG. 16D is a graph showing the distribution for sorted cells with a frequency of 250 MHz in sector A and 1 MHz in sector B.

FIG. 16C and FIG. 16D showcase the multisectorial capabilities of the platform. Using two frequencies with similar CM responses such as 1 and 3 MHz showed that the capture percentages of both cell types were similar across both sectors (less than 1% relative difference), as was expected. However, applying a frequency of 1 MHz after first applying the previously calculated 10A-cell capture frequency of 250 kHz to a prior sector showed a relative increase of captured 231-cells of over 18% in the second sector. This was a consequence of prefiltering the 10A-cells before choosing a frequency that facilitated both 231-cell and 10A-cell capture. Combining different frequencies over multiple sectors allows for more advanced filter design and can be used to sort cell samples with otherwise hard to resolve DEP responses.

Device Fabrication.

The cell sorting chips were fabricated on 500 μm thick fused quartz substrates with 4-in. diameter employing standard photolithography techniques. Lift-off patterning was used to fabricate the gold nanoelectrodes. First, substrates were cleaned for 15 min in hot piranha solution (3:1 mixture of $H_2SO_4$ and $H_2O_2$). Then, LOR 5B photoresist (Micro-Chem Corp.) was spread on the substrates for 10 seconds at 500 rpm and 40 s at 3000 rpm before being baked for 5 min at 150° C. Subsequently, a second photoresist layer consisting of the positive photoresist AZ 1512 (EMD Performance Materials Corp.) was spread on top of the LOR 5B layer, starting at 500 rpm for 10 seconds, followed by 5000 rpm for 40 seconds, and then baked for 90 s at 100° C. Next, the substrates were exposed to UV light at 100 mJ/cm2 using an ABM mask aligner (ABM-USA, Inc.). The substrates were then developed in AZ developer 1:1 (EMD Performance Materials Corp.) and MF-319 (Kayaku Advanced Materials Inc.) to pattern the AZ 1512 and LOR 5B layers, respectively. Afterward, 10 nm chromium and 90 nm gold were sputtered on top of the substrates, followed by lift-off in Remover PG (Kayaku Advanced Materials Inc.). Then, the substrates were cleaned with deionized (DI) water and the wells fabricated on top of the electrodes using the negative photoresist SU-8 2015 (Kayaku Advanced Materials Inc.). To obtain a layer thickness of 20 μm, SU-8 was spread on the substrate at 500 rpm for 5 seconds with a following increase to 2100 rpm for 30 seconds. Then, the substrates were prebaked at 65 and 95° C. for 2 and 4 minutes, respectively, and patterned after aligning the well mask precisely with the substrates using an ABM mask aligner. After UV light exposure at 150 mJ/cm², the substrate was post-exposure baked at 65 and 95° C. for 2 and 5 minutes, respectively. Lastly, substrates were developed in SU-8 developer (Kayaku Advanced Materials Inc.) for 4 minutes. Each substrate yielded 6 chips overall, 4 chips with a well diameter of 20 μm, and 2 chips with a well diameter of 30 μm. The chips have 10 sectors each, and each sector includes 1000 wells, for a total of 10,000 wells per chip.

To fabricate the microfluidic channels, negative master molds were fabricated on prime silicon wafers with 4 inch diameter. The master mold was 20 μm thick and fabricated using the SU-8 2015 soft lithography steps described above. Subsequently, PDMS with a 10:1 mass ratio between base and curing agent (Sylgard 184 silicone elastomer kit, Dow Inc.) was poured onto the mold and cured for 30 minutes in an oven at 100° C. Afterward, the polymerized PDMS was carefully removed from the substrate, and inlet and outlet holes for the microfluidic channel were created with a disposable biopsy punch (Robbins Instruments Inc.). Lastly, the PDMS structure was cleaned with isopropyl alcohol (IPA) and milli-Q water.

Device Bonding and Assembly.

Silanization was employed to irreversibly bond the microfluidic channels formed by the PDMS structure to the diced chips containing the wells. To achieve this, the side of the PDMS showing the microchannel was first treated and activated with oxygen plasma in a reactive-ion etching machine (Trion Technology, Inc.). Subsequently, the same side was immersed in a liquid solution containing 99% (3-aminopropyl)triethoxysilane (APTES) for 45 seconds and then washed with milli-Q water and dried with nitrogen gas. Afterward, the PDMS microchannel and well chip were carefully aligned and slowly brought into contact with each other. To ensure sealing of the complete device, it was then placed on a hot plate while a standard calibration weight of 0.2 kg applied pressure from the top and baked at 150° C. for 1 hour. Finally, microfluidic inlet and outlet connectors were formed by inserting 21G stainless steel needles into the previously formed inlet and outlet holes in the PDMS and then connected to PTFE tubing (Elveflow Microfluidics).

Cell Culture and Preparation.

MDA-MB-231-Em cells were maintained in RPMI-1640 supplemented with 10% fetal bovine serum (FBS), 10 μg/mL puromycin, and 0.5 mg/mL Geneticin (Gibco) in a humidified incubator at 37° C. and a $CO_2$ atmosphere of 5%. MCF-10A cells were cultured in DMEM/F12 medium supplemented with 5% horse serum, 100 unit/mL penicillin and 100 mg/mL streptomycin (Gibco), 500 ng/mL hydrocortisone, 20 ng/mL human epidermal growth factor (hEGF), 0.01 mg/mL human insulin, and 100 ng/mL cholera toxin. All other chemicals used were of analytical grade and obtained from Millipore Sigma.

Cell Staining.

In preparation for experiments, MDA-MB-231-Em cells were induced with 2 ug/mL doxycycline for 24 hours, then detached from the bottom of the culture dish using 0.25% trypsin-EDTA. MCF-10A cells were detached using 0.25% trypsin-EDTA and stained using the PKH26 red fluorescent cell linker kit for general cell membrane labeling (Millipore Sigma) as per the manufacturer's protocol. Briefly, cells were washed once with 1 mL of DMEM/F12 and then resuspended in 1 mL of diluent C. A 2× PKH26 dye solution was added to the cell suspension and incubated for 5 minutes at room temperature with gentle pipetting. Cells were incubated in 2 mL of FBS for 1 minute, then centrifuged at 400 g for 10 minutes at room temperature. Stained cells were rinsed 3 times in 5 mL of complete media to remove excess dye prior to imaging.

DEP Buffer.

Generally, cell media and related buffers have a high conductivity, prohibiting a positive DEP response of mammalian cells. To facilitate capture and sorting, cells were resuspended in sterile filtered, low conductivity DEP buffer (10 mM HEPES, 3 mM NaOH, 285 mM sucrose, and 1.5 mM $MgCl_2$) previously used in electroporation studies. The conductivity of the buffer was verified with a conductivity meter (Oakton CON 6+) and showed an average read of 500 µS/cm. Cell viability in this buffer has previously been verified by others. All other chemicals used were of analytical grade and obtained from Sigma-Aldrich.

Instrumentation and Experimental Setup.

To electrically connect the microfluidic chip to external measurement equipment, a custom-made chip-holder featuring spring-loaded pogo-pins (Mill-Max Mfg. Corp.) that connect to the pads on the chip was used. The holder was equipped with a set of switches that allow to control to which sectors which signal was applied. Cell solutions and buffers were flowed into the microfluidic channel with a syringe pump (New Era Pump Systems Inc. NE-1000) connected to the inlet tubing. To facilitate DEP capture, a function generator (Rigol DG822) connected to a dual-channel 10× amplifier (Tabor Electronics 9250) applied sinusoidal signals to the electrodes via the chip-holder. The applied signals were monitored with a digital oscilloscope (Tektronix TDS 2012B). To enable imaging and video recording, the chip-holder was placed on the viewing stage of an upright fluorescence microscope (Amscope FM820TMF143) integrated with a CCD camera (Sony ICX825ALA).

Example 2: Highly Efficient Capture and Quantification of the Airborne Fungal Pathogen *Sclerotinia sclerotiorum* Employing a Nanoelectrode-Activated Well Array Example 2 describes a multifluidic device for the capture and quantification of *Sclerotinia sclerotiorum* spores, pathogenic agents of one of the most harmful infectious diseases of crops, *Sclerotinia* stem rot. The device based has a microfluidic design that contains a nano-thick aluminum electrode structure integrated with a picoliter well array for dielectrophoresis-driven capture of spores and on-chip quantitative detection employing impedimetric sensing. Example 2 demonstrates a highly efficient spore trapping rate of more than 90% with an effective impedimetric sensing method that allowed the spore quantification of each column in the array and achieved a sensitivity of 2%/spore at 5 kHz and 1.6%/spore at 20 kHz, enabling single spore detection.

Design and Operating Principle of the Device.

The microfluidic device was designed and fabricated with a total of 20 aluminum nanoelectrodes (100 nm thick, 20 µm wide, and 6 µm gap) and upon which an array of 190 wells made of SU-8 resist was fabricated. Each electrode can be addressed individually, and between each pair, 10 wells were placed. To focus the flow of spores toward the center of the device, in which the electrodes were placed, the microfluidic channel was designed with a constriction and each alternate column in the well array was shifted in the y-axis direction to ensure that a well is always under the path of a flowing spore. The nonuniform electric field for DEP capture is generated by applying a sinusoidal voltage to the electrodes, which can be configured as an interdigitated electrode (IDE) structure during the process of trapping spores into the wells.

The electrode configuration is externally controlled by switches in a custom-made chip holder. Once the spores are captured, non-faradaic electro-chemical impedance spectroscopy (nF-EIS) measurements can be performed to quantify the spores column by column; nF-EIS is a label-free detection technique that measures the electrical current of an electrode-electrolyte system in response to an applied AC potential with no redox species in solution. During nF-EIS measurements (FIG. 17), nanoelectrodes can be operated individually, allowing the measurement of each column in the well array and providing the ability to determine spore occupancy per column.

DEP-Assisted Capture of Spores.

To evaluate the performance of the device to capture *S. sclerotiorum* spores, two sets of experiments were designed. In the first set, the occupancy distribution of the captured spores was examined as a function of the applied flow rate. Devices with well diameters of 20 and 15 µm were tested. Prior to loading spores, ethanol was slowly injected into the device at a flow rate of 2 µL/min to remove air bubbles within the wells. Afterward, the DEP buffer was introduced into the channel at the same flow rate for 10 min. Subsequently, 10 µL of stained *S. sclerotiorum* spores at a low concentration of ~4.4×104 spores/mL was pumped into the device at a fixed flow rate of 0.2 µL/min.

Figure 18A:
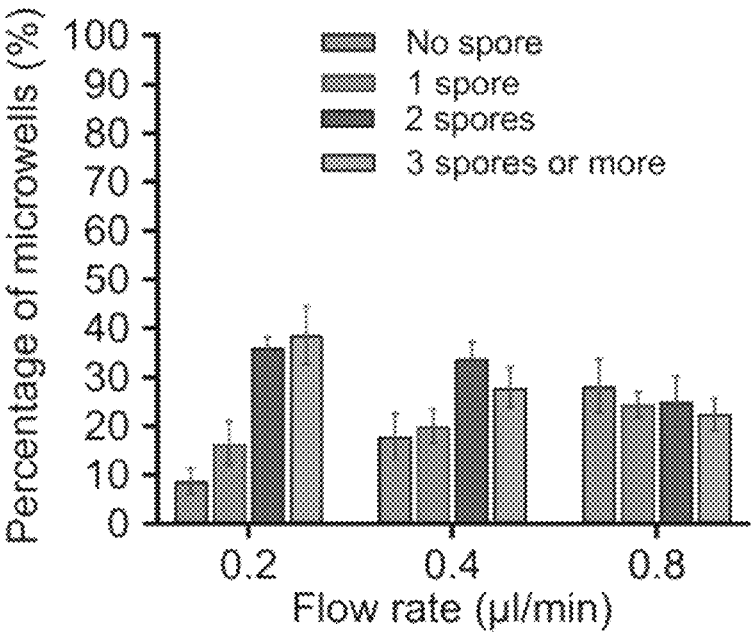
FIG. 18A is a graph showing spore occupancy as a function of the applied flow rate for devices in which wells have a 20 μm diameter and employing a sinusoidal DEP signal of 20 $V_{pp}$ at 300 kHz.
Figure 18B:
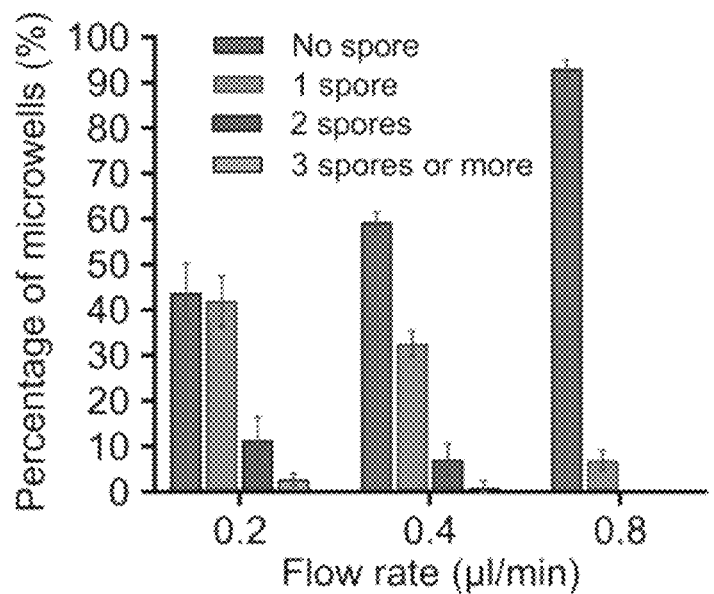
FIG. 18B is a graph showing spore occupancy as a function of the applied flow rate for devices in which wells have a 15 μm diameter and employing a sinusoidal DEP signal of 20 $V_{pp}$ at 300 kHz.

While the spore suspension was flowing, a sinusoidal signal of 20 $V_{pp}$ and 300 kHz was applied to the electrodes to enable a positive DEP capture. Once the entire spore volume (10 µL) was pumped, a washing step was implemented to remove the remaining spores on the SU-8 surface by increasing the flow rate to 15 µL/min for 2 min while keeping the DEP signal on. Flow rates of 0.4 and 0.8 µL/min were also examined, and three independent experiments were performed for each flow rate. A high spore occupancy of 91.23% was achieved in devices with well diameters of 20 µm, subjected to a flow rate of 0.2 µL/min (FIG. 18A), and with more than 70% of the wells occupied by at least two spores. As expected, spore occupancy decreases as the flow rate increases, with an average occupancy of 83.11% and 71.86% for flow rates of 0.4 and 0.8 µL/min, respectively. It was also verified that the percentage of single spores increased from 16.49% to 24.38% when the flow rate increased from 0.2 to 0.8 µL/min. The average velocity of spores increases as the flow rate increases and thus the drag force acting on them, decreasing the number of spores captured with the same DEP signal amplitude. The same trend was observed in devices with wells of a 15 µm diameter (FIG. 18B) and almost no triplets were present after the washing step.

The difference in occupancy levels between the two devices can be attributed to two main reasons: a reduction in the cross-sectional area of the channel due to a smaller constriction and a larger attenuation of the electric field due to smaller wells. The microfluidic channel constriction is 420 and 320 µm for devices with wells of 20 and 15 µm diameter, respectively. By the continuity equation, as the cross-sectional area of the microchannel is reduced, the mean velocity of spores increases for a constant flow rate.

Figure 18C:
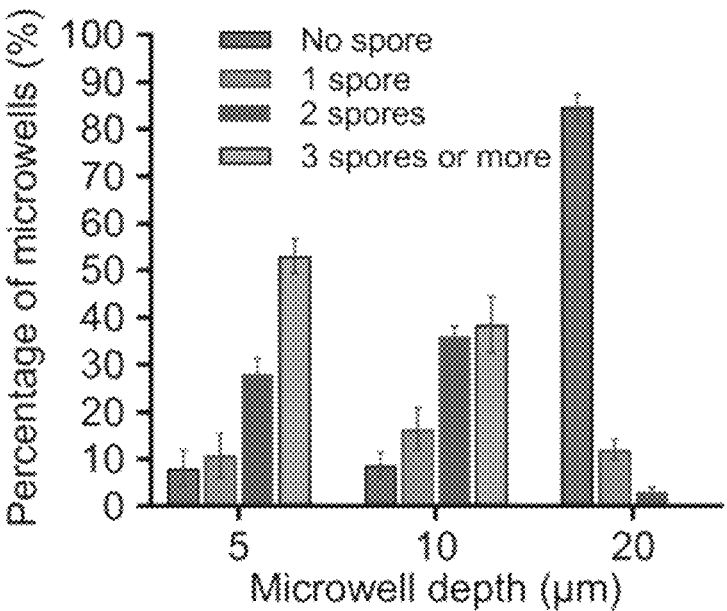
FIG. 18C is a graph showing spore occupancy as a function of well depth: the diameter of the wells is 20 μm and the applied DEP signal is 20 $V_{pp}$ at 300 kHz.
Figure 18D:
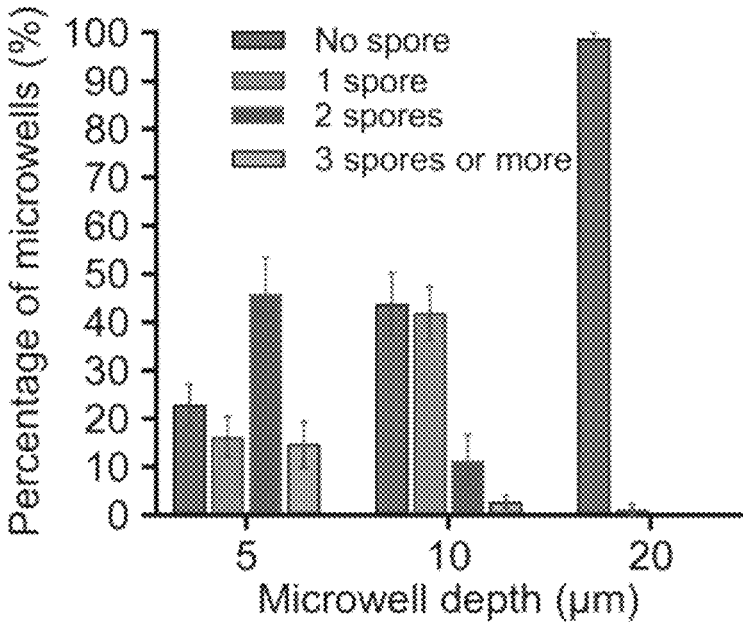
FIG. 18D is a graph showing spore occupancy as a function of well depth: the diameter of the wells is 15 μm and the applied DEP signal is 20 $V_{pp}$ at 300 kHz.

Therefore, for the same flow rate, spores are flowing around 32% faster in devices with wells of a 15 μm diameter. Furthermore, SU-8 is an insulator, and as the diameter of the wells is reduced, a larger attenuation of the electric field and thus the DEP effect is obtained. In the second set of experiments, the influence of well depth with regard to the occupancy distribution of the captured spores was evaluated at a constant flow rate of 0.2 μL/min. In addition to the previously described chips showcasing a well depth of 10 μm, devices with well depths of 5 and 20 μm were also fabricated. The DEP signal amplitude and frequency, the concentration of spores, and the injected volume were kept the same as in the previous experiment. As expected, a high spore occupancy (92.35%) was observed in devices with wells of a 20 μm diameter and 5 μm depth (FIG. 18C). On the other hand, the occupancy in devices with wells of a 15 μm diameter and 5 μm depth was on average 79% with more than 45% of the wells occupied by doublets (FIG. 18D).

Figure 22:
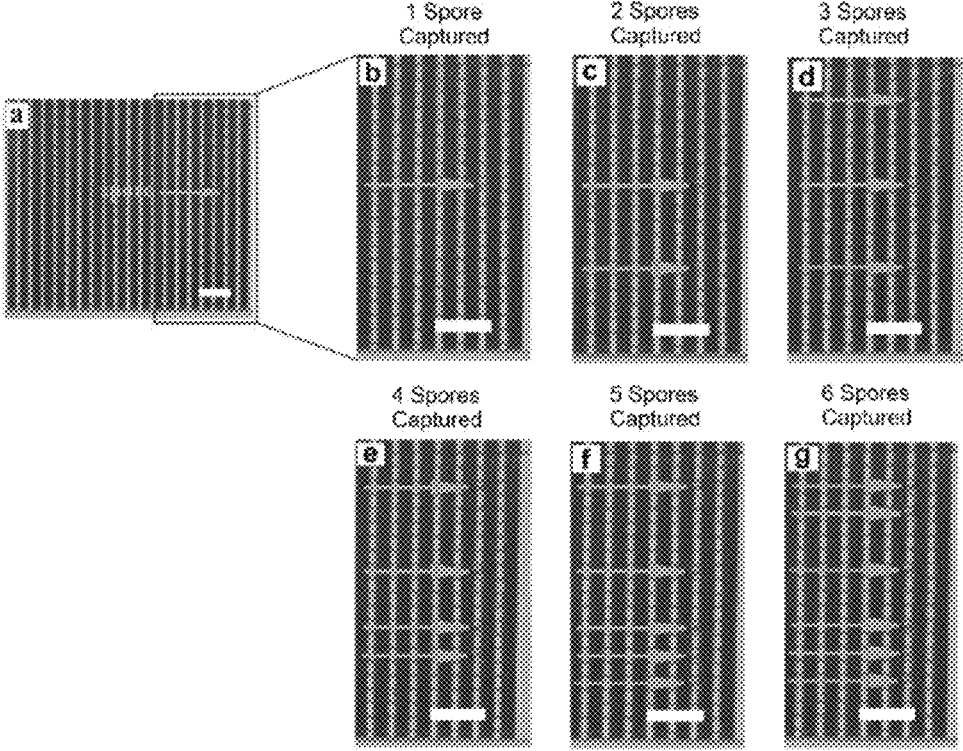
FIG. 22 is a well array showing a captured spores in a fixed column.

During the washing step of devices with 5 μm depth, a few spores were observed escaping the wells, particularly those in which there were two or more spores already. This issue was solved by increasing the voltage to 22 $V_{pp}$ during the washing step. Notably, the spore capture efficiency decreased drastically for both well diameters when the depth of wells was 20 μm. This can be attributed to the decrease in the intensity of the electric field gradient with the increasing distance from the electrode surface. Numerical simulations were carried out using commercially available software (COMSOL Multiphysics) to investigate this effect. The simulation domain and the electric field generated by the electrodes are shown in FIG. 22, where the electric field intensity |E| is represented with a color map. The gradient of the squared electric field $\nabla|E|^2$ is directly proportional to the DEP force acting on the spores; therefore, the effective gradient was defined as $\nabla|E|_{eff}^2 = \int \nabla|E|^2 dA$, which represents the magnitude of the electric field gradient ($\nabla|E|^2$) integrated over the white dashed rectangle of area A above the wells (FIG. 22), with a fixed depth of 10 μm and width given by the well diameter. The simulation of the effective gradient as a function of SU-8 thickness (FIG. 22) shows that as the thickness of the SU-8 layer increases, the effective gradient decreases exponentially, and therefore, the DEP force also decreases.

Figure 19A:
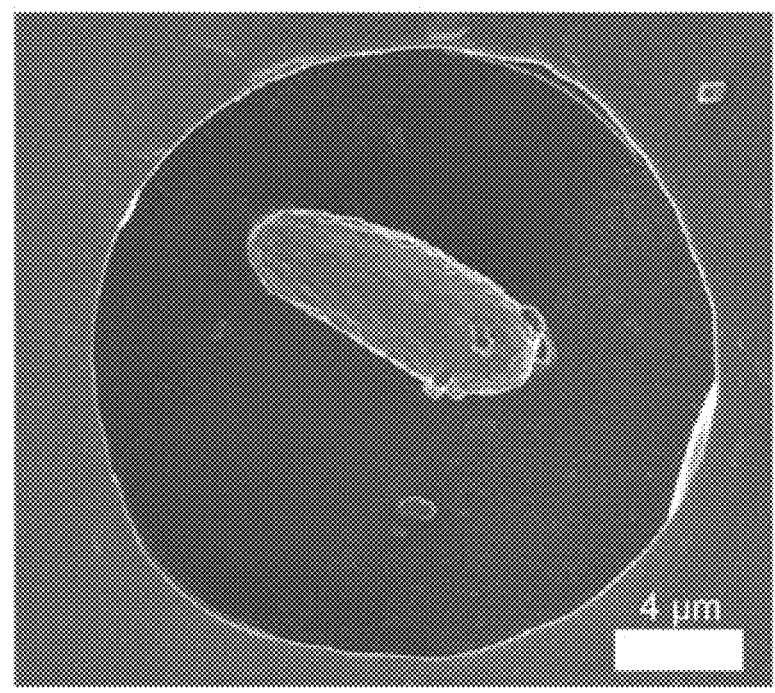
FIG. 19A is a Helium ion microscope (HIM) image of *S. sclerotiorum* spores inside wells captured by dielectrophoresis force.
Figure 19B:
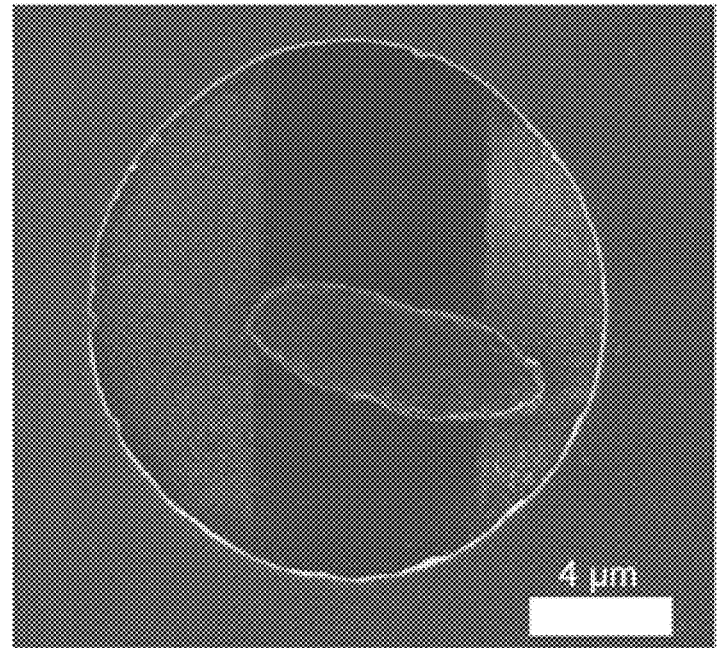
FIG. 19B is a HIM image of a single spore in a single well of 15 μm diameter.

This means that as the well depth increases, the DEP capture efficiency will decrease exponentially, which was clearly observed in the experiments. It is also important to point out that spore loading was also tested in all the devices using nothing but gravity. However, in all cases, all of the wells were empty, which indicates that the DEP force was the dominant force in capturing the spores into wells. FIGS. 19A and 19B show the spores captured inside wells using DEP. Based on these results, it is evident that the devices can effectively capture spores into the wells using DEP. Devices with a 20 μm diameter and 5 μm depth provided higher capture efficiency and flexibility to account for the spore size variability. Devices with a 15 μm diameter and 5 μm depth provided a lower number of spores per well when compared to devices with wells of a 20 μm diameter, and the overall capture efficiency could be increased by, for instance, reducing the flow rate, at the expense of an increase in capture time.

Impedimetric Quantification of *S. sclerotiorum* Spores.

After capturing the spores, nF-EIS was employed to quantify them. During this process, nanoelectrodes are operated individually, allowing for impedance measurements of each column in the well array by applying an AC potential from the impedance analyzer to the respective pair of electrodes located beneath each well. To test the performance of the quantification method, a solution was pumped with a low concentration of spores (~2×10⁴ spores/mL) at a flow rate of 0.2 μL/min into the device. Subsequently, DEP was used to capture single spores into a fixed column of the well array. Every time a single spore was captured in a well of the respective fixed column, the DEP signal was turned off and the impedance spectrum was recorded from 5 kHz to 1 MHz. Flowing spores were monitored using the microscope camera to ensure that no spore was captured in a well that was already occupied. Thus, the DEP signal was turned back on only when a spore was flowing in the direction of an empty well of the same column. During the impedance spectrum measurement, which takes ~20 seconds, none of the captured spores escaped from the wells, even when the DEP signal remained off for a longer time. The typical magnitude and phase response of a single column in the well array as a function of the number of captured spores and for devices with wells of a 20 μm diameter is shown in FIGS. 20A and 20B. As expected in a capacitive-based sensor, magnitude curves decrease (FIG. 20A) and phase curves tend to −90° (FIG. 20B) as the frequency increases. FIG. 20C depicts the experimental Nyquist plot, and FIG. 20G illustrates the equivalent circuit model with such responses. $R_m$ models the solution resistance, which is in parallel with the solution capacitance ($C_s$). The constant phase element (CPE) models the electrical double-layer at the electrodes, all in parallel with a parasitic capacitance $C_p$, which accounts for parasitic effects introduced by the connection cables, chip holder, and substrate. The simplified equivalent circuit is well-studied and commonly used to describe the electrode-electrolyte interface in interdigitated electrode sensors. By fitting the experimental data to the equivalent circuit, it was verified that the captured spores (FIGS. 19A and 19B) will mainly induce changes in $R_m$, $C_s$, and CPE, contributing to the total impedance change of the system. These curves clearly show that changes in the number of captured spores can effectively modulate the impedance response of the device. Seven spores per column were captured since, as the wells of a single column were filled, it became more difficult to prevent two spores from occupying the same well. To account for variations in the impedance response of each column in the well array, the normalized impedance was defined as $$|Z_{norm}| = \left| \frac{Z_{spore} - Z_{buffer}}{Z_{buffer}} \right| \qquad \text{Formula 2}$$

where $Z_{spore}$ is the impedance response due to the captured spores in wells and $Z_{buffer}$ is the impedance response given by the buffer. FIG. 20D shows the calibration curve for the normalized impedance magnitude at frequencies of 5 and 20 kHz, in which each point represents the average value of three independent experiments (N=3) performed in different columns of the well array. By fitting the experimental data with a linear regression, an $R^2$ value of 0.9390 with a slope of 0.02 was obtained for 5 kHz. However, for 20 kHz, the $R^2$ value was 0.940 with a slope of 0.016. The sensitivity as the percentage of impedance change per captured spore can be expressed by simply multiplying the slopes by 100, yielding a sensitivity of 2%/spore at 5 kHz and 1.6%/spore at 20 kHz. These curves clearly indicate that it is possible to quantify spores with the device and that the sensitivity decreases with frequency, which was expected by the spectra obtained in FIG. 20A. The linearity, on the other hand, was very similar for both frequencies. During the DEP experiments, it was observed that more than one spore could be captured in a single well, and thus, an experiment was carried out to determine the impedance change due to spores in a single well. The calibration curve (N=3) for the normalized imped- ance magnitude is shown in FIG. 20E. No more than four spores could be captured in the same well; the $R^2$ and slope values obtained for 5 kHz were 0.8061 and 0.017, respec- tively, while the values for 20 kHz were 0.7869 and 0.007, respectively. The well dimensions limit the number of spores that can be captured, and as the number of spores increases, the area of exposed electrodes is reduced. Furthermore, spores tend to stack on top of each other partially or completely as the number of spores increases, thus reducing the electric field perturbation caused by these spores, which leads to a reduction in the total impedance change. As such, these specific measurements deviate from a simple linear correlation and a more complicated model would have to be used to improve the coefficient of determination.

Figure 21A:
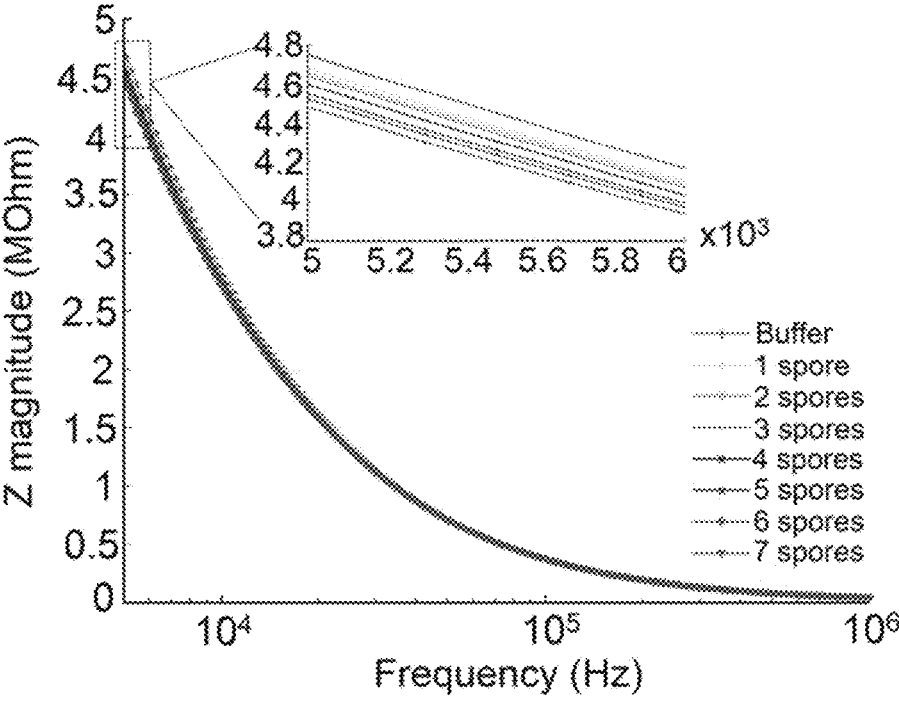
FIG. 21A is a graph showing the magnitude of impedance versus frequency as a function of the number of single spores captured in a column of the well array.
Figure 21B:
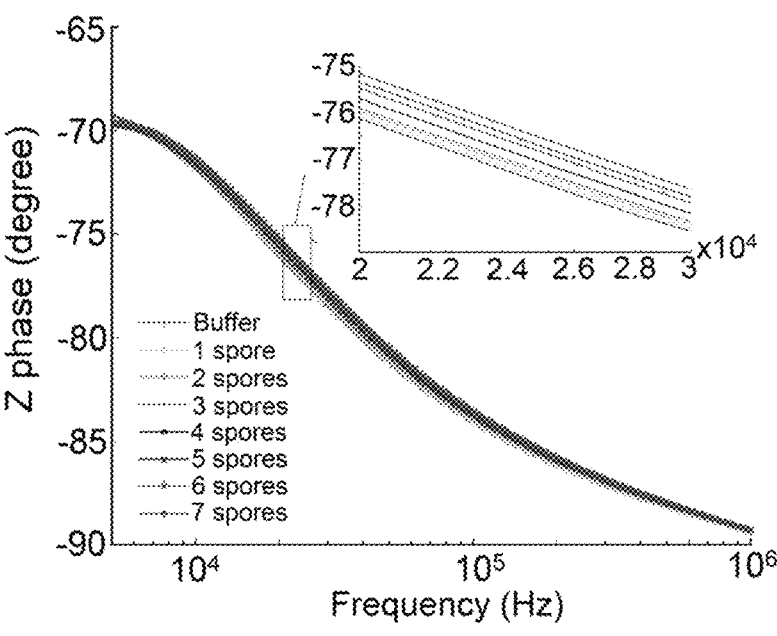
FIG. 21B is a graph showing phase of impedance versus frequency.
Figure 21C:
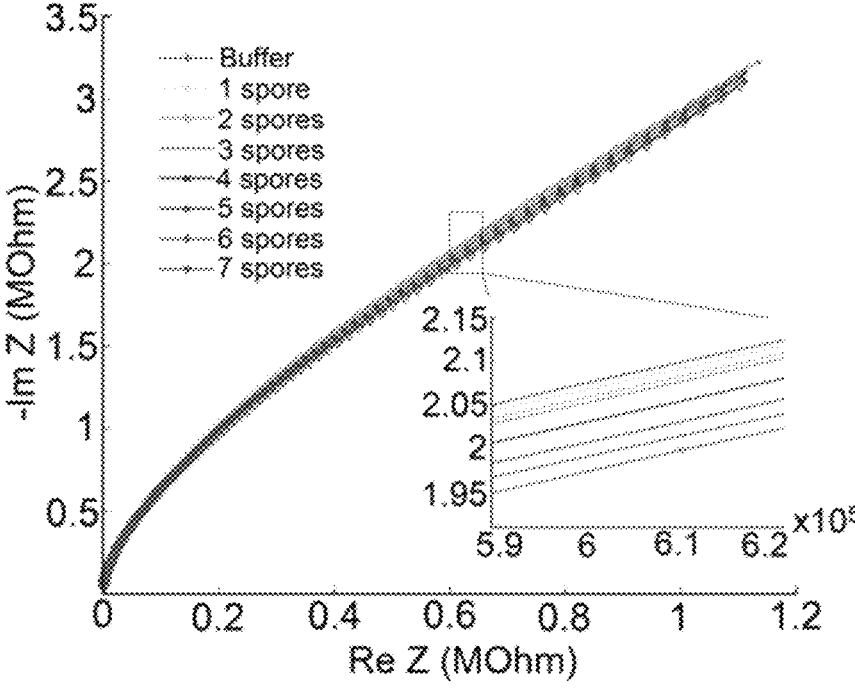
FIG. 21C is a Nyquist plot with equivalent circuit model.
Figure 21D:
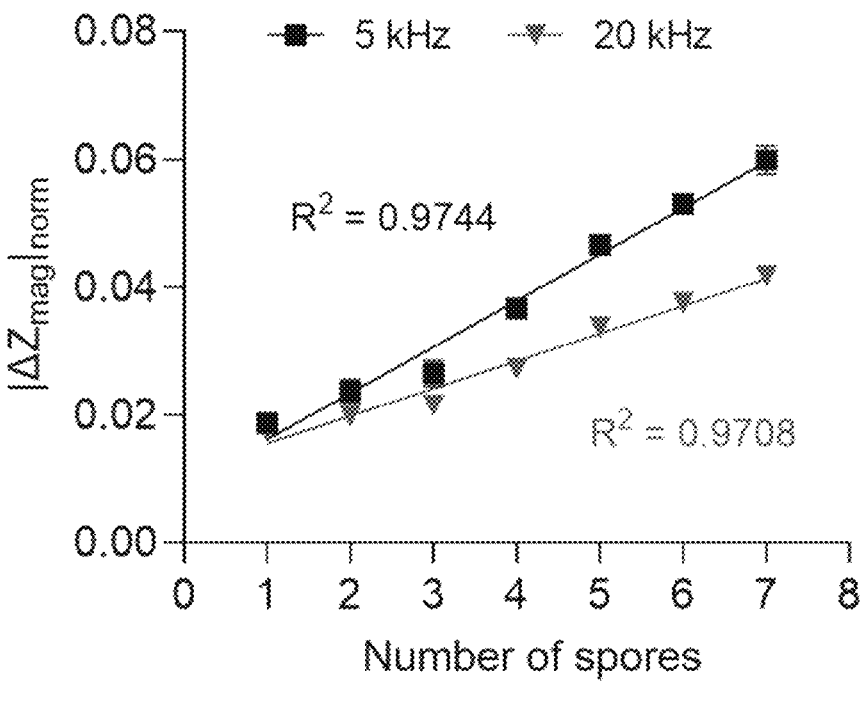
FIG. 21D is a calibration curve of the normalized impedance magnitude at 5 kHz and 20 kHz.
Figure 21E:
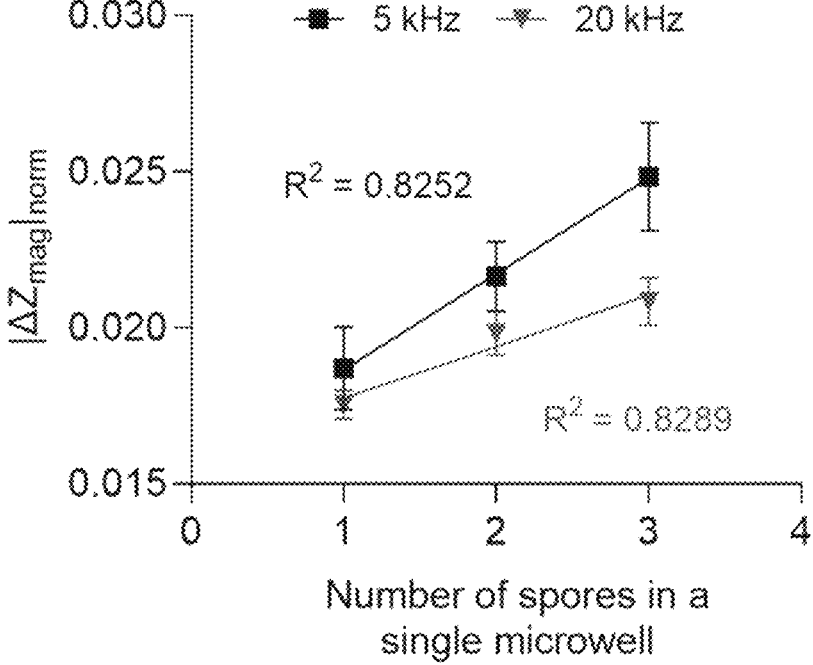
FIG. 21E is a calibration curve of the normalized impedance magnitude at 5 kHz and 20 kHz when spores are captured in a single well.
Figure 21F:
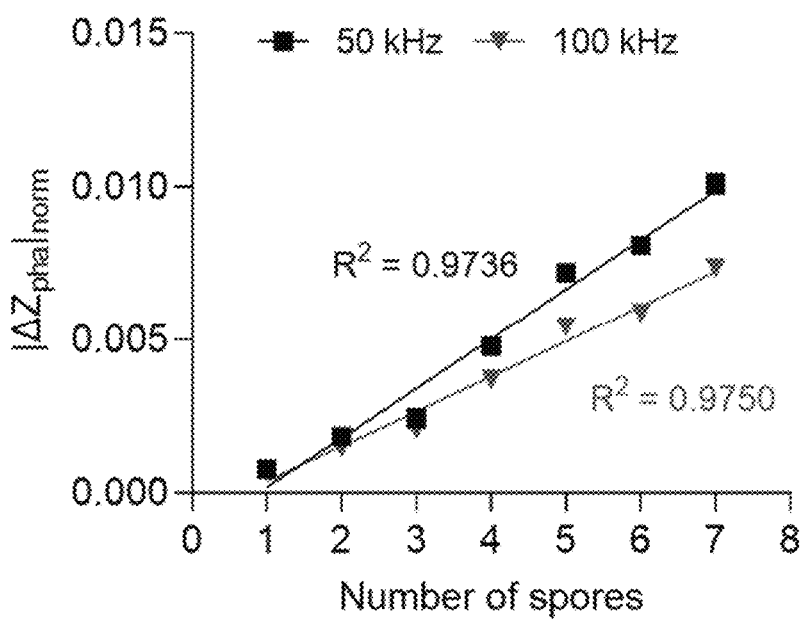
FIG. 21F is a calibration curve of the normalized impedance phase at 50 kHz and 20 kHz.

Lastly, it was also noticed that the impedance phase could also be employed to quantify spores, especially in the mid-frequency range. The calibration curve (N=3) for the normalized impedance phase is shown in FIG. 20F. At 50 kHz, an $R^2$ value of 0.9368 was obtained with a slope of 0.007, while for 100 kHz, the $R^2$ was 0.9284 with a slope of 0.005. Although the impedance phase is less sensitive than magnitude, it could still be employed as an alternative parameter to quantify spores. The same experiments were repeated for chips with wells of a 15 μm diameter (FIG. 21A-21F). With a smaller diameter, a smaller portion of the electrode surface area is in contact with the solution, yield- ing considerably larger magnitude values (FIGS. 21A and 21C) when compared to wells of a 20 μm diameter (FIGS. 20A and 20C). The calibration curve for the normalized impedance magnitude (N=3) at frequencies of 5 and 20 kHz is shown in FIG. 21D. A sensitivity of 0.7%/spore at 5 kHz and 0.4%/spore at 20 kHz was obtained. When capturing spores in a single well, no more than three spores could be captured, obtaining a calibration curve with a slope of 0.003 at 5 kHz and 0.001 at 20 kHz (FIG. 21E). Lastly, the calibration curve (N=3) for the normalized impedance phase is shown in FIG. 21F. At 50 kHz, an $R^2$ value of 0.9736 was obtained with a slope of 0.002, while for 100 kHz, the $R^2$ was 0.9750 with a slope of 0.001. The sensitivities achieved are larger than the basic accuracy of the measurement instrument (0.05%) for both well diameters, validating the reliability of the results. The lower sensitivity presented by devices with wells of a 15 μm diameter can be mainly attributed to the reduction of the exposed surface area of the measuring nanoelectrodes, which naturally increases the double-layer impedance or equivalently reduces the double- layer capacitance of the measuring system. This is a well- known effect for reducing the sensitivity in impedance measurements. According to these results, devices with 20 μm diameter wells are considerably more sensitive for spore quantification. Lastly, and to test the selectivity of the method, a mixed solution of *S. sclerotiorum* spores and *Fusarium graminearum* spores was prepared. The mixed sample was introduced into the device under the same settings as previous experiments. Only the target spores were selectively captured in the wells by DEP, while *F. graminearum* spores flowed to the outlet lumen of the device. This result agrees with the dielectrophoretic sepa- ration of spores previously reported.

Device Fabrication.

Microfluidic devices were fabricated using standard pho- tolithography processes on 500 μm thick glass substrates with 4 inch diameter. The substrates were first cleaned with piranha solution (3:1, $H_2SO_4/H_2O_2$) for 15 minutes. Imme- diately after this, 100 nm of aluminum was sputtered on top of the substrates. Electrodes were patterned using a positive photoresist AZ1512 (EMD Performance Materials Corp.), which was spread at 500 rpm for 10 seconds, then increased to 5000 rpm for 40 seconds, and finally baked at 100° C. for 60 seconds. Afterward, the photoresist was exposed under UV light at 100 mJ/cm$^2$ using a mask aligner (ABM-USA, Inc.) and developed using an AZ 400k 1:4 developer (EMD Performance Materials Corp.). The metal layer was subse- quently etched using aluminum etchant type A (Transene Company Inc.). The electrodes were fabricated with a width of 20 μm and a gap of 6 μm between them. Using a second photomask, wells were fabricated on top of the electrodes using the negative photoresist SU-8 (Kayaku Advanced Materials Inc.) with a thickness of 10 μm. Thicknesses of 5 and 20 μm were also fabricated. SU-8 2010 was spread on top of the substrates containing patterned electrodes at 500 rpm for 15 seconds and then increased to 3500 rpm for 30 seconds to form 10 μm thick layers. These substrates were soft baked at 65° C. for 2 minutes and then for 4 minutes at 95° C. UV light exposure was done at 100 mJ/cm$^2$, and subsequently, post exposure, the substrates were baked at 65° C. for 2 minutes and then for 5 minutes at 95° C. Finally, the substrates were developed for 1 minute using the SU-8 developer (Kayaku Advanced Materials Inc.). Additional substrates with SU-8 layers of 5 and 20 μm thickness were fabricated using SU-8 2005 and SU-8 2015, respectively. Each substrate provides six devices, three with wells of 20 μm in diameter and three with 15 μm in diameter.

To obtain the microfluidic channels, a master mold for poly(dimethylsiloxane) (PDMS) molding was fabricated on a prime silicon wafer of 4-inch diameter using SU-8 2015 with a thickness of 18 μm. A 10:1 mass ratio of PDMS base and curing agent (SYLGARD 184 silicone elastomer kit) was poured onto the master mold and cured in an oven at 100° C. for 1 hour. Afterward, the polymerized PDMS was peeled off and inlet/outlet holes were created on the channels using a disposable biopsy punch (Robbins Instruments Inc.) and subsequently cleaned with IPA and Milli-Q water. The microfluidic channels were formed of PDMS, in the same process as described in Example 1.

Spore Production and Reagents.

The process to obtain *S. sclerotiorum* spores has been described in the previous reports. In summary, compact masses of hyphae, called sclerotia, were buried in wet sand and incubated at 10° C. until they germinated carpogenically to form apothecia. The spores that were released by apoth- ecia were captured on filter paper disks using a vacuum pump. To prepare spores in solution, the filter paper disks were cut into small pieces (~2 mm×10 mm) and inserted in a 2 mL centrifuge tube containing 1.5 mL of ultrapure Milli-Q water with a resistivity of 18.2 MΩ/cm (Sigma- Aldrich). Subsequently, the tube was shaken for 45 seconds at 1500 rpm using a digital vortex mixer (Fisher Scientific). The piece of paper was then removed from the tube, and the solution was filtered using a cell strainer (PluriSelect) with a 20 μm mesh. During DEP experiments, the spores were resuspended in the DEP loading buffer, consisting of 1% w/v bovine serum albumin (BSA) in Milli-Q water to avoid nonspecific binding of spores. Furthermore, the DEP buffer was chosen due to its nontoxicity to spores and its low conductivity, which reduces Joule heating and facilitates DEP trapping. The spores were stained to facilitate identi- fication and imaging using acridine orange (Thermo Fisher Scientific).

*F. graminearum* culture was maintained on PDA plates, and further macroconidia spores were obtained by culturing the fungus in a synthetic nutrient-poor broth (SNB) medium with 1% sucrose to induce the formation of spores ($KH_2PO_4$ 1 g, $KNO_3$ 1 g, $MgSO_4$ 601·$7H_2O$ 0.5 g, KCl 0.5 g, glucose 0.2 g, sucrose 0.2 g) on a shaker (150 rpm) at room temperature for 7 days. The spores were separated by filtration of the liquid culture through 20 µm filter and further centrifugation. All other chemicals used were of analytical grade and obtained from Sigma-Aldrich.

Spore Fixation.

The spores were fixed for HIM imaging using 4% paraformaldehyde in phosphate-buffered saline (PBS) with 0.1% Triton X-100. First, the spores were introduced into the device and captured using DEP. After this, 1 mL of the paraformaldehyde solution was pumped into the device and left to rest for 15 min. Second, PBS 1× was introduced for 10 min to rinse the wells. Lastly, the captured spores were dehydrated by introducing ethanol of graded concentrations, which were 20% for 5 minutes, 40% for 5 minutes, 60% for 5 minutes, and 80% for 5 minutes.

Instrumentation and Experimental Setup.

A custom-made chip holder based on pogo-pins (Mill-Max Corp.) was employed to electrically connect the microfluidic device to all measurement equipment. A set of switches in the holder allowed us to control the signal applied to each electrode. The flow of spores in the solution within the microfluidic channel was generated and controlled using a syringe pump (New Era Pump Systems Inc. NE-4000). During DEP experiments, sinusoidal signals were applied to the electrodes via the chip holder using a function generator (Rigol DG822) through a bipolar 10× amplifier (Tabor Electronics 9250). An oscilloscope (Tektronix TDS 2012B) was also used to monitor the applied signal. During the process of DEP capture, the device was placed on the viewing stage of an upright fluorescence microscope (Amscope FM820TMF143) integrated with a CCD camera (Sony ICX825ALA) for imaging and video recording. The nF-EIS measurements were performed using a high-precision impedance analyzer (Zurich Instruments MFIA) controlled by the software LabOne.

Example 3: Dielectric Analysis of *Sclerotinia sclerotiorum* Airborne Inoculum by the Measurement of Dielectrophoretic Trapping Voltages Using a Microfluidic Platform The dielectric parameters of biological cells are intrinsic properties that are often employed as biomarkers for the label-free separation and differentiation of cells.[91,100,61] These dielectric properties are typically described in terms of the cell's relative permittivity and electrical conductivity, which when combined give a frequency-dependent dielectric spectrum known as complex permittivity.[101,102] As most cells have complex heterogeneous structures, the multi-shell theory is commonly used to model them as particles composed of concentric shells, typically in spherical or ellipsoidal format. The dielectric properties of each shell are assumed to be different from each other and homogeneous within each shell.[103]

When the dielectrics properties are unknown, tuning a dielectrophoretic filter becomes a cumbersome and time-consuming task, as the DEP response of each type of particle has to be determined for the effective separation of different species. This is commonly done by iteratively testing different combinations of voltage, amplitudes and frequencies of the AC signal used to generate the required non-uniform electric field. Moreover, since the DEP response changes with the conductivity of the medium the iterative tests would have to be repeated for each medium.

To remedy these limitations, a dielectrophoretic method was employed to experimentally determine the dielectric properties of *S. sclerotiorum* spores in media of different electric conductivities and using a microfluidic platform. Spores were modeled using a realistic ellipsoidal double-shell model, from which the dielectric properties were estimated by finding the minimum voltage that balances the DEP and Stoke drag force acting on spores flowing in the microchannel and over a wide range of frequencies (10 kHz to 20 MHz). Prior to performing experiments with spores, and in order to verify the validity of the methodology and analysis, the dielectric properties of human embryonic kidney (HEK) 293 cells were determined.

Results and Discussion

Operating Principle and Theory

The experimental determination of the dielectric properties of *S. sclerotiorum* spores is based on the measurement of the minimum trapping voltage that balances the DEP and Stoke drag force acting on spores flowing in a microfluidic channel.[123,62] These measurements are performed over a wide range of frequencies. The DEP force acting on a polarizable particle such as a cell or spore arises from the interaction between a non-uniform electric field and the particle's induced dipole, which depends on the dielectric properties of the particle and surrounding medium.[19,124] The DEP force can be either positive or negative, depending on whether the particle is attracted towards the region of maximum electric field gradient or repelled from it.[30,44] The time-averaged DEP force $F_{DEP}$ acting on a particle of radius r is given by, $$F_{DEP} = \pi \varepsilon_m r^3 \mathrm{Re}\left\{ \frac{\varepsilon_p^* - \varepsilon_m^*}{\varepsilon_p^* + 2\varepsilon_m^*} \right\} \nabla |E|^2 \qquad \text{Formula 3}$$

where $\varepsilon_m$ is the permittivity of the medium, E the amplitude of the electric field, and $$\varepsilon_p^*$$

and $$\varepsilon_m^*$$

are the complex permittivity of the particle and medium, respectively. The complex permittivity is given by $$\varepsilon^* = \varepsilon + \frac{\sigma}{j\omega}$$

where $\omega$ is the electric field frequency, $\varepsilon$ is the electric permittivity and $\sigma$ is the conductivity of the particle or medium and $j=\sqrt{-1}$ is the imaginary unit. The symbol Re denotes the real part of the bracketed fractional term, which is the Clausius-Mossotti (CM) factor and determines whether the particles experiences positive or negative DEP. The microfluidic device was fabricated with interdigitated microelectrodes (IME), which enables the generation of a non-uniform electric field for DEP by applying sinusoidal voltages to the IME. Particles flowing through the microfluidic channel can be trapped at the IME edges with positive DEP (pDEP) or at the top of the microchannel with negative DEP (nDEP). The sinusoidal voltages are applied to the IME through a custom-made chip-holder.

When a particle is trapped by pDEP, the $F_{DEP}$ in the x-direction can be expressed as:

$$F_{X\,pDEP} = \pi\varepsilon_m r^3 \mathrm{Re}\left\{\frac{\varepsilon_p^* - \varepsilon_m^*}{\varepsilon_p^* + 2\varepsilon_m^*}\right\}\frac{\partial|E|^2}{\partial x} \qquad \text{Formula 4}$$

which can be further simplified using Poisson's equation as, $$F_{X\,pDEP} = \pi\varepsilon_m r^3 \mathrm{Re}\left\{\frac{\varepsilon_p^* - \varepsilon_m^*}{\varepsilon_p^* + 2\varepsilon_m^*}\right\}\frac{\partial|E|^2}{\partial x}\bigg|_{V=1} V^2 \qquad \text{Formula 5}$$

where V is the amplitude of the sinusoidal voltage applied to the IME. Naturally, under nDEP, the $F_{DEP}$ in the x-direction has the same form as Formula 4. This component of the DEP force balances the Stoke drag force acting on the particle, which in turn stops the particle from moving in the x-direction. The horizontal Stoke drag force is given by,[125]

$$F_{DRAG} = 6\pi\eta rk(v_f - v_p) \qquad \text{Formula 6}$$

where $\eta$ is the fluid viscosity, $v_f$ is the local flow velocity at the center of the particle, $v_p$ is the velocity of the particle, which is zero when the particle is trapped, and k is a nondimensional factor accounting for the wall effect. Under pDEP, the $F_{DEP}$ in the y-direction pushes the particle to the IME edges and is balanced by the reaction force $F_R$, preventing the particle to move in this direction. Under nDEP, the $F_{DEP}$ in the y-direction pushes the particle away from the IME and towards the top of the microchannel. It is important to note that the forces of gravity and buoyancy (sedimentation) in the y-direction are also present, but they were omitted to simplify the force diagram since their difference is much smaller compared to the magnitude of the DEP force in this direction. Under the conditions of fixed flowrate and frequency of the electric field, the minimum DEP trapping voltage that balances the DEP and drag force can be measured to estimate the real part of the CM factor. Thus, equating Formula 5 and 6, the real part of the CM factor can be isolated:

$$\mathrm{Re}\left\{\frac{\varepsilon_p^* - \varepsilon_m^*}{\varepsilon_p^* + 2\varepsilon_m^*}\right\} = \frac{6k\eta v_f}{\varepsilon_m r^2 \frac{\partial|E|^2}{\partial x}\big|_{V=1} V^2} \qquad \text{Formula 7}$$

By measuring this minimum trapping voltage V at different frequencies, the spectrum of the real part of the CM factor can be obtained, from which the dielectric properties can be later estimated. To validate this method, experiments were first performed with HEK 293 cells, as the dielectric properties of this cell line are well known in the literature. Subsequently, experiments with *S. sclerotiorum* spores were performed. The values of the wall correction factor, the local flow velocity, and the spatial gradient of the electric field were obtained through numerical simulations using commercially available software (COMSOL Multiphysics 5.6).

Dielectric Properties of HEK-293 Cells

Prior to loading cells, and to remove air bubbles from the microchannel, the device was primed using ethanol, which was injected at a flowrate of 5 µL/min for 10 minutes. Subsequently, the buffer DEPB1 was slowly pumped into the microchannel at a flowrate of 0.3 µL/min for another 10 minutes. After this, HEK 293 cells resuspended in DEPB1 at a concentration of about $6.1\times10^4$ cells/mL were introduced into the microchannel at the same flowrate. To determine the minimum DEP trapping voltages, a high amplitude signal was initially applied to capture flowing cells. Once a cell was captured, the amplitude of the signal was slowly and carefully decreased in steps of 1 V until the cell was released. Thus, the minimum DEP trapping voltage was recorded as the voltage 1 V above the signal that released the cell. For the voltage levels used during trapping, no observable morphological changes were detected in cells.

Figure 23A:
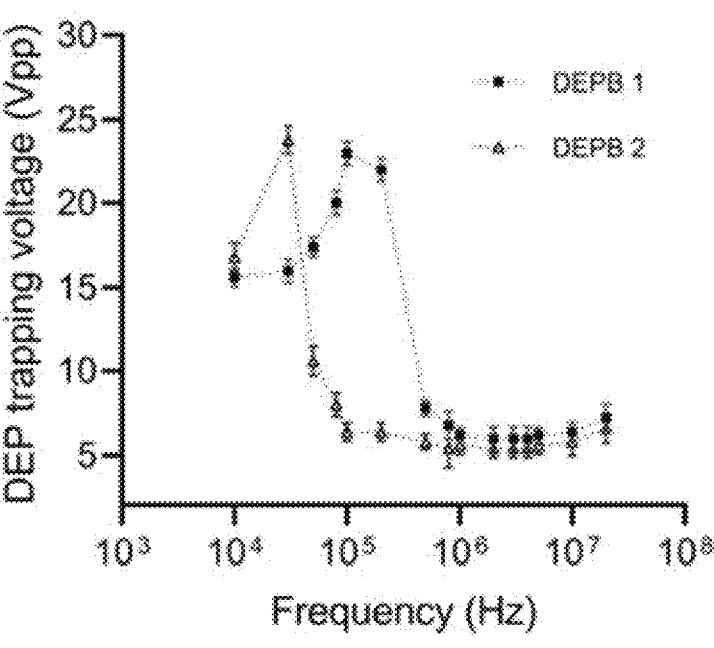
FIG. 23A is a graph of the minimum trapping voltages (peak-to-peak) over a frequency range of 10 kHz to 20 kHz for HEK 293 cells suspended in two different mediums, DEPB1 and DEPB2.
Figure 23B:
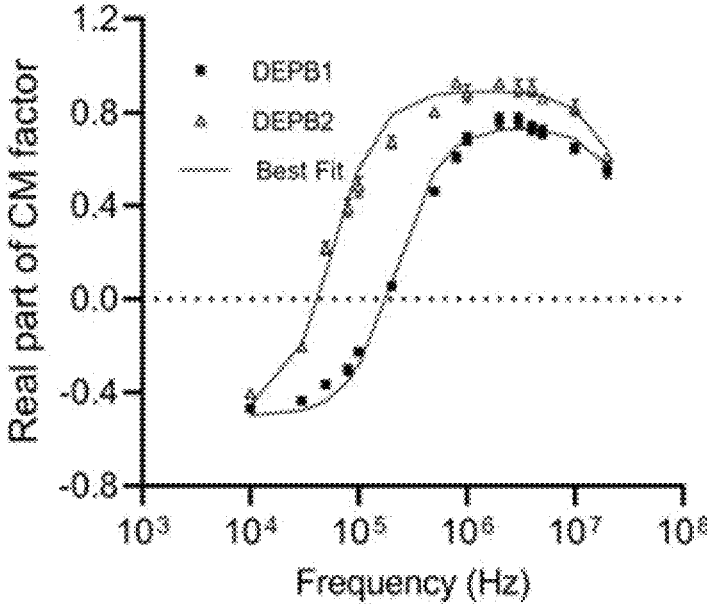
FIG. 23B is a graph of the experimental spectrum of the real part of the Clausius-Mossotti factor for HEK 293 cells.
Figure 23C:
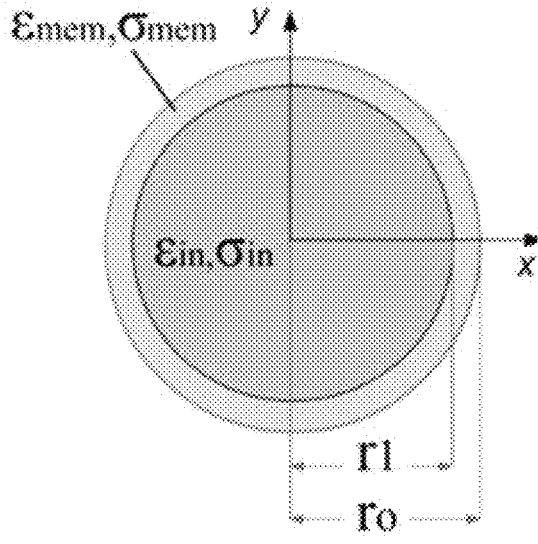
FIG. 23C is an illustration of the single-shell model used for HEK 293 cells.

The minimum DEP trapping voltages were recorded over a wide range of frequencies, from 10 kHz to 20 MHz, and five measurements per frequency were performed to account for cell size variability. The same process was also repeated for cells resuspended in the buffer DEPB2 with a measured concentration of around $6.2\times10^4$ cells/mL. Three independent experiments were performed, and FIG. 23A shows one of them. The lower boundary of the frequency range was chosen to avoid interference from electrode polarization effects while the upper boundary was limited by the signal generator. With the measured voltages, and using Formula 7, the spectrum of the real part of the CM factor for each buffer can be calculated (FIG. 23B). The parameters used in the calculations are shown in Table 1. In order to obtain the dielectric properties from the CM spectrum, cells were modeled using a spherical single-shell model (FIG. 23C), which has an effective complex permittivity given by,[61-101]

$$\varepsilon_{eff}^* = \varepsilon_{mem}^* \frac{\left[\left(\frac{r_o}{r_1}\right)^3 + 2\frac{\varepsilon_{cyt}^* - \varepsilon_{mem}^*}{\varepsilon_{cyt}^* + 2\varepsilon_{mem}^*}\right]}{\left[\left(\frac{r_o}{r_1}\right)^3 - \frac{\varepsilon_{cyt}^* - \varepsilon_{mem}^*}{\varepsilon_{cyt}^* + 2\varepsilon_{mem}^*}\right]} \qquad \text{Formula 8}$$

where $r_o$ is the radius of the cell, $r_1 = r_o - t$, where t is the thickness of the cell's membrane, and $$\varepsilon_{cyt}^*$$

and $$\varepsilon_{mem}^*$$

are the complex permittivities of the cell interior and membrane, respectively. The cell radius of the HEK 293 cell population was determined microscopically while the value of the membrane thickness, equal to 7 nm, was obtained from published reports.[91,126] By replacing $$\varepsilon_p^*$$

in Formula 7 with the effective permittivity $$\varepsilon_{eff}^*$$

from Formula 8, the dielectric properties of HEK 293 cells can be estimated by fitting the experimental CM factor spectrum (FIG. 23B). Data fitting was performed using the nonlinear least square method, implemented with Matlab 2015b (MathWorks). As the conductivity of the medium increases, the value of the first cross-over frequency (transition from nDEP to pDEP) is shifted to the right (FIG. 23B), from 39.1 kHz to 174.4 kHz, based on the best fit analysis. Cells normally present two cross-over frequencies, however the second one (transition from pDEP to nDEP) falls outside of the range of the signal generator. FIG. 23B also indicates that the values for the real part of the CM factor decrease as the conductivity of the buffer increases, requiring higher voltage amplitudes to trap cells (FIG. 23A).

The values of the four dielectric properties obtained experimentally with each buffer, DEPB1 and DEPB2, are shown in Table 2. These results agree well with those reported by other researchers.[126,127] As expected, the permittivity ($\varepsilon_{cyt}$) and conductivity ($\sigma_{cyt}$) of the cell's interior remain unchanged regardless of the conductivity of the buffer, since there is no ion exchange between the interior of the cell and the buffer. These parameters influence the CM spectrum at higher frequencies, whereas the lower frequency range of the CM spectrum is mainly affected by the dielectric properties of the plasma membrane, a lipid bilayer with low ionic permeability regarded as an insulator. As such, the conductivity values ($\sigma_{mem}$) obtained for both buffers were very low, as expected. Both the permittivity ($\varepsilon_{cyt}$) and conductivity ($\sigma_{mem}$) of the membrane increased slightly with the increase of buffer conductivity. A higher ionic strength induces an increase in the surface charge at the cell's membrane, which increases the surface capacitance and conductance. This effect can explain the variation in the permittivity and conductivity, which was also observed by other groups.[128,129] These results validate the analysis and method as the estimated dielectric properties lie within values previously reported in the literature.

TABLE 1

Parameters employed for calculations of the real part of the CM factor for HEK 293 cells.

| Parameter | Description | Value |
|---|---|---|
| k | Wall correction factor | 2.0 |
| $\eta$ | Fluid viscosity | $1 \times 10^{-3}$ Pa · s |
| $v_f$ | Local flow velocity | $3.79 \times 10^{-4}$ m/s |
| $\varepsilon_m$ | Medium permittivity | 78 |
| $\varepsilon_o$ | Vacuum permittivity | $8.85 \times 10^{-12}$ F/m |
| $r_o$ | Cell's radius | 7 μm |
| $\left. \dfrac{\partial \|E\|_{V=1}^2}{\partial x} \right\|_{y=7\mu m}$ | Gradient of electric field | $2.0 \times 10^{13}$ V²/m³ |
| $\left. \dfrac{\partial \|E\|_{V=1}^2}{\partial x} \right\|_{y=13\mu m}$ | Gradient of electric field | $4.8 \times 10^{12}$ V²/m³ |

TABLE 2

Dielectric properties of HEK 293 cells obtained experimentally. Values represent the average of three independent experiments.

| Reference | Buffer | $\varepsilon_{cyt}$ | $\sigma_{cyt}$ (S/m) | $\varepsilon_{mem}$ | $\sigma_{mem}$ (μS/m) |
|---|---|---|---|---|---|
| This work | DEPB1 | 89.98 ± 0.57 | 0.40 ± $1.95 \times 10^{-10}$ | 5.04 ± 0.03 | 0.99 ± $1.0 \times 10^{-5}$ |
| This work | DEPB2 | 88.38 ± 1.06 | 0.41 ± $3.74 \times 10^{-10}$ | 2.90 ± 0.11 | 0.58 ± $4.1 \times 10^{-2}$ |
| 42 | — | 85 ± 4 | 0.47 ± $19 \times 10^{-3}$ | 6.28 ± 0.3 | ~0 |
| 41 | — | 60 | 0.5 | 9.5 | ~0 |

Figure 24A:
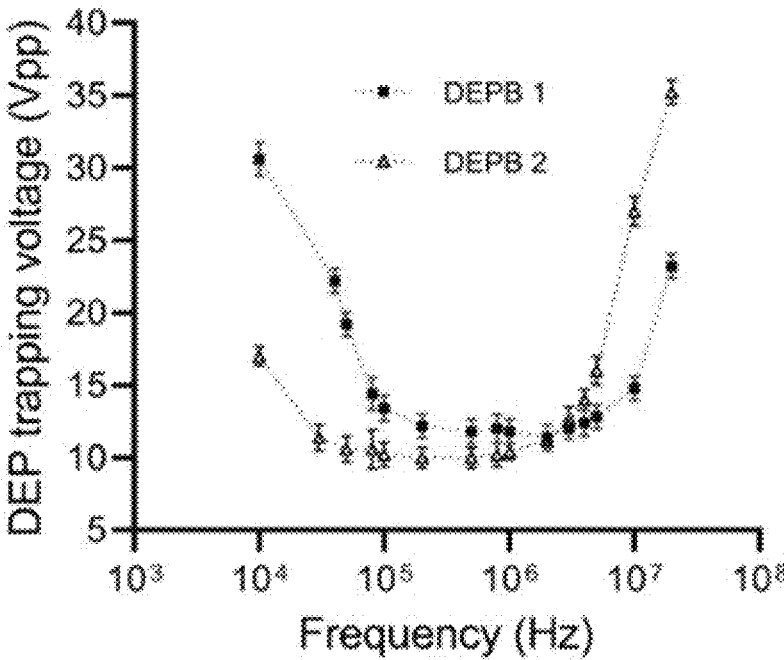
FIG. 24A is a graph of the minimum trapping voltages (peak-to-peak) over a frequency range of 10 kHz to 20 kHz for *Sclerotinia sclerotiorum* spores suspended in two different media, DEPB1 and DEPB2.

Dielectric properties of *S. sclerotiorum* spores. The process of spore loading into the microfluidic device was performed in the same manner as in the experiments with cells. The trapping voltages for both buffers, DEPB1 and DEPB32, are shown in FIG. 24A. The spore concentrations on both buffers were measured to be around $7.2 \times 10^4$ spores/mL. Different from the previous experiment, the flowrate for spores in DEPB1 was set to 0.2 μL/min and 0.5 μL/min for DEPB32. The flow rate was reduced to 0.2 μL/min with DEPB1 to limit the amplitude of the applied voltage, as higher voltages (40 $V_{pp}$) damaged the IME at low frequencies.

Figure 24B:
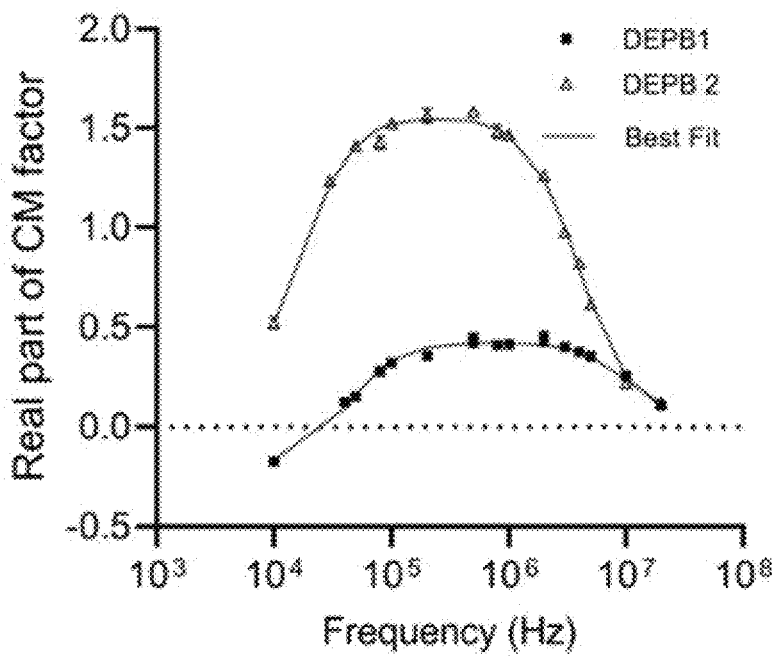
FIG. 24B is a graph of the experimental spectrum of the real part of the Clausius-Mossotti factor for *Sclerotinia sclerotiorum* spores.
Figure 24C:
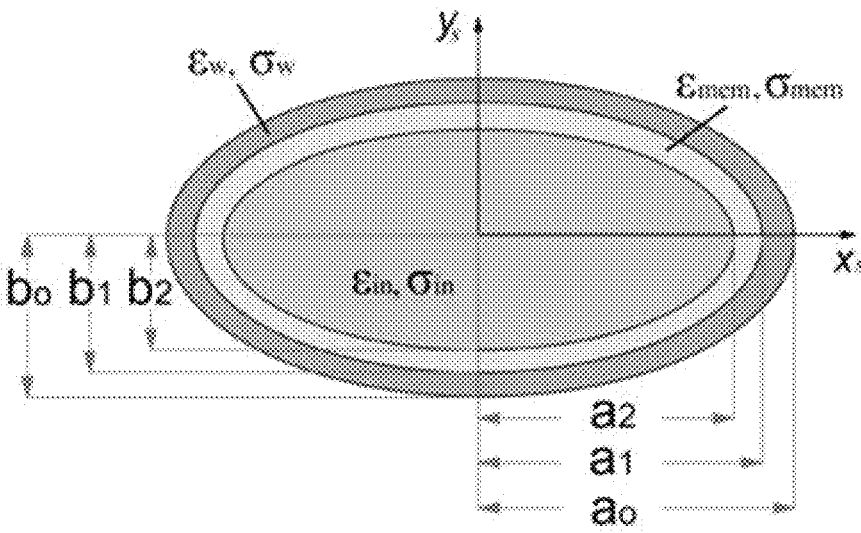
FIG. 24C is an illustration of the ellipsoidal double-shell model used for *Sclerotinia sclerotiorum* spores.

An ellipsoidal double-shell model,[104] as shown in FIG. 24C, was employed to analyze the dielectric properties of *S. sclerotiorum* spores, as this model more accurately represents their real shape.[130,87] The spore is assumed to be an ellipsoid, with two concentric shells corresponding to the membrane and the spore wall. Therefore, there are in total 6 dielectric parameters to be determined. The semi-axes, $a_o$ and $b_o$ are 7 μm and 3 μm, respectively. These are the average values obtained by observations under the microscope of the spore population. The third semi-axes, $c_o$ was set to be equal to $b_o$ (prolate spheroid). As there are no published reports with values for the membrane and the spore wall thickness, TEM images were performed to estimate these values. The average thickness for the spore wall was found to be 150 nm, while the membrane thickness was measured to be around 8 nm on average.

The CM factor equation for an ellipsoid is also different from that of spheres, and is given by,[104,128]

$$CM = \frac{1}{3} \frac{\varepsilon_p^* - \varepsilon_m^*}{\varepsilon_m^* + A_0(\varepsilon_p^* - \varepsilon_m^*)} \qquad \text{Formula 9}$$

and according to the concentric multi-shell theory,[104] the effective complex permittivity for the ellipsoidal double-shell model is, $$\varepsilon_{eff}^* = \varepsilon_w^* \left[ \frac{\varepsilon_w^* + (\varepsilon_2^* - \varepsilon_w^*)A_1 + \alpha(\varepsilon_2^* - \varepsilon_w^*)(1 - A_0)}{\varepsilon_w^* + (\varepsilon_2^* - \varepsilon_w^*)A_1 - \alpha(\varepsilon_2^* - \varepsilon_w^*)A_0} \right] \qquad \text{Formula 10}$$

27 with $\varepsilon_2{}^*$ given by, $$\varepsilon_2^* = \varepsilon_{mem}^* \left[ \frac{\varepsilon_{mem}^* + (\varepsilon_{in}^* - \varepsilon_{mem}^*)A_2 + \beta(\varepsilon_{in}^* - \varepsilon_{mem}^*)(1 - A_1)}{\varepsilon_{mem}^* + (\varepsilon_{in}^* - \varepsilon_{mem}^*)A_2 - \beta(\varepsilon_{in}^* - \varepsilon_{mem}^*)A_1} \right] \text{ with,} \qquad \text{Formula 11}$$

$$\alpha = \frac{a_1 b_1 c_1}{a_0 b_0 c_0}; \beta = \frac{a_2 b_2 c_2}{a_1 b_1 c_1} \qquad \text{Formula 12}$$

$$\varepsilon_w^*,$$

$$\varepsilon_{mem}^*,$$

and $$\varepsilon_{in}^*$$

are the complex permittivities of the spore wall, membrane, and spore interior, respectively. $A_{0,1,2}$ are the depolarization factors along the horizontal direction and are defined by, $$A_i = \frac{a_i b_i c_i}{2} \int_0^\infty \frac{ds}{(s+a_i)\sqrt{(s+a_i^2)(s+b_i^2)(s+c_i^2)}}; \qquad \text{Formula 13}$$

$$i = 0, 1, 2$$

where s is an arbitrary distance for integration. With the equations defined above, the same process of numerical calculations employed in the experiments with cells can be used with spores. Thus, with the measured voltages shown in FIG. 24A, and using Formula 7, the spectrum of the real part of the CM factor for each buffer can be calculated (FIG. 24B).

The parameters used in the calculations are shown in Table 3. For the sake of simplification, the value of the radius r, used in Formula 7 is the radius of a sphere with an equivalent volume to that of an ellipsoidal spore. The height of the channel was also reduced to 15 µm for experiments with spores. With the applied frequencies of the electric field, spores are polarized and oriented horizontally, along the x-direction of the channel, in other words, the $x_s$ and $y_s$ axes (FIG. 24C) of the spores are parallel to the x and y axes of the system. Therefore, the channel height was reduced to limit the voltage required for trapping spores under n-DEP (top of the channel).

As expected, the spectrum of the real part of the CM factor indicates an observable conductivity dependence on the DEP response of spores. When employing DEPB2, no nDEP response within the applied frequency range was observed, although the trend of the best fit curve seems to indicate a cross-over frequency way below 10 kHz. Trapping at frequencies lower than 10 kHz was found to be unstable, so this region was not considered in the calculations. At a higher buffer conductivity (DEPB1), nDEP response of spores was observed and the cross-over frequency was found to be at 28.4 kHz based on the best fit curve. The DEP response of spores agrees well with published reports.[83,122] To estimate the dielectric properties, the experimental CM factor was fit to Formula 9, in which $\varepsilon_p{}^*$ was replaced by the effective permittivity $\varepsilon_{eff}{}^*$ from Formula 10. The dielectric properties are summarized in Table 3. The conductivity and permittivity of the spore interior was found to be insensitive to the conductivity of the external buffer, similar to cells. The same was obtained for the membrane, as this is surrounded by the spore wall. On the other hand, the conductivity of the spore wall increased slightly with the increase in medium conductivity, which can be attributed to the increase in the surface charge at the spore wall.

The primary goal is to determine the dielectric properties of spores so that their dielectrophoretic response for a medium of known conductivity can be estimated a priori, without having to run long iterative experiments. This can considerably accelerate the design of dielectrophoretic filters, especially when multiple species are to be filtered. In the experiments low conductivity media was chosen, as this is the standard in DEP filters. This is mainly due to the fact that media of low conductivity improves the dielectric contrast of the cells, spores, or any polarizable microparticles, with respect to the manipulation media.[132] As the conductivity of the medium increases, the CM spectrum decreases and it becomes harder to capture particles.

TABLE 3

Parameters employed for calculations of the real part of the CM factor for S. sclerotiorum spores.

| Parameter | Description | Value |
|---|---|---|
| k | Wall correction factor | 1.9 |
| η | Fluid viscosity | $1 \times 10^{-3}$ Pa · s |
| $v_{f1}$ | Local flow velocity DEPB1 | $2.80 \times 10^{-4}$ m/s |
| $v_{f2}$ | Local flow velocity DEPB2 | $7.02 \times 10^{-4}$ m/s |
| $\varepsilon_m$ | Medium permittivity | 78 |
| $\varepsilon_o$ | Vacuum permittivity | $8.85 \times 10^{-12}$ F/m |
| r | Equivalent radius | 3.9 µm |
| $\left. \frac{\partial \lvert E \rvert_{V=1}^2}{\partial x} \right\rvert_{y=3\mu m}$ | Gradient of electric field | $2.7 \times 10^{13}$ V²/m³ |
| $\left. \frac{\partial \lvert E \rvert_{V=1}^2}{\partial x} \right\rvert_{y=12\mu m}$ | Gradient of electric field | $9.0 \times 10^{12}$ V²/m³ |

TABLE 4

Dielectric properties of S. sclerotiorum spores obtained experimentally. Values represent the average of three independent experiments.

| Buffer | $\varepsilon_{cvt}$ | $\sigma_{cvt}$ (S/m) | $\varepsilon_{mem}$ | $\sigma_{mem}$(µS/m) | $\varepsilon_w$ | $\sigma_w$ (S/m) |
|---|---|---|---|---|---|---|
| DEPB 1 | 85.96 ± 0.64 | 0.099 ± 0.0022 | 31.86 ± 1.10 | 7.13 ± 1.60 | 99.99 ± 1.38 | 0.08 ± 0.019 |
| DEPB 2 | 86.19 ± 0.52 | 0.097 ± 0.0003 | 31.79 ± 1.0 | 7.5 ± 2.30 | 99.99 ± 8.66 | 0.01 ± 0.003 |

By measuring the minimum trapping voltages over a wide frequency range, the DEP response, and dielectric properties of S. sclerotiorum spores were determined. In addition, spores were modeled using a realistic double-shell model based on the multi-shell theory. The results can accelerate the design of DEP filters for SSR forecasting applications.

Device fabrication. Microfluidic devices were fabricated using standard photolithography processes on 500 µm thick fused silica substrates with 4-inch diameter. Substrates were first immersed in piranha solution (3:1, $H_2SO_4$:$H_2O_2$) for 15 minutes. Subsequently, 100 nm of aluminum was sputtered on top of the substrates. Microelectrodes were patterned using a positive photoresist (PR) AZ1512 (EMD Performance Materials Corp.), which was spread at 500 rpm for 10 seconds, then increased to 5000 rpm for 40 seconds, and baked at 100° C. for 60 seconds. The PR was exposed under 405 nm light at 120 mJ/cm$^2$ using a high-speed direct-write photolithography tool (MLA150 Heidelberg Instruments) and developed using AZ 400k 1:4 developer (EMD Performance Materials Corp.). The aluminum layer was subsequently etched by wet etching using aluminum etchant type A (Transene Company Inc.). Microelectrodes with different widths and gaps were fabricated. In the experiments described in Example 3, microelectrodes with 80 μm width and 40 μm gap were employed. The fabrication of the microfluidic channel was carried out in same manner as Example 1.

Cell and Spore Production. The production protocol of *S. sclerotiorum* spores has been detailed in previous reports.[83,] [122,87] HEK 293 cells were cultured from frozen stock at 37° C. in high glucose Dulbecco's Modified Eagle Medium with L-glutamine and Phenol indicator (DMEM, high glucose; Gibco) supplemented with 10% (v/v) fetal bovine serum (FBS; SIGMA). The cell line was split once its confluency on a 10 cm culture dish reached ~90%, routinely twice a week. Before each experiment, cells were detached from the culture dish by incubation in 0.05% trypsin-EDTA at 37° C. for 5 minutes and then resuspended in 5 mL culture media. Subsequently, 1 mL of cell suspension was transferred to a centrifuge flask and centrifugated at 1000 rpm for 5 minutes, followed by the replacement of culture media with the low conductivity DEP buffers.

DEP Buffer. Cells and spores were resuspended in a DEP buffer, with two different conductivities. DEPB1 (10 mM HEPES, 3 mM NaOH, 285 mM sucrose, and 1.5 mM MgCl$_2$) with a measured conductivity of 370 μS/cm. DEPB2 was obtained by diluting DEPB1 (1:8) with DI water and with a measured conductivity of 50 uS/cm. The conductivity of the buffers was measured with a conductivity meter (Oakton CON 6+) before each experiment. Low conductivity buffers reduce Joule heating and facilitates DEP trapping of spores and cells.

TEM Sample Preparation. Spores were first chemically fixated with 2.5% glutaraldehyde and 2% paraformaldehyde in 0.1 M phosphate buffer (pH 7.2-7.4) and left overnight. Subsequently, spores were dehydrated with graded concentrations of ethanol (50%, 70%, 90%, 100%) in 15-minute intervals for each concentration. After this, spores were washed with propylene oxide for 20 minutes and then infiltrated and embedded in pure spur resin overnight and cured at 70° C. Sections of 70 nm to 90 nm thickness were obtained using a ultramicrotome Reichert-Jung Ultracut E. Sections were then stained with uranyl acetate and lead citrate stain. Images were acquired with a transmission electron microscope Morgagni 268 (Philips/FEI).

REFERENCES (1) Tomlinson, M. J.; Tomlinson, S.; Yang, X. B.; Kirkham, J. Cell Separation: Terminology and Practical Considerations. J. Tissue Eng. 2013, 4, 204173141247269.

(2) Chen, Y.; Li, P.; Huang, P. H.; Xie, Y.; Mai, J. D.; Wang, L.; Nguyen, N. T.; Huang, T. J. Rare Cell Isolation and Analysis in Microfluidics. Lab Chip 2014, 14, 626-645.

(3) Wognum, A. W.; Eaves, A. C.; Thomas, T. E. Identification and Isolation of Hematopoietic Stem Cells. Arch. Med. Res. 2003, 34, 461-475.

(4) Shields, C. W., IV; Reyes, C. D.; López, G. P. Microfluidic Cell Sorting: A Review of the Advances in the Separation of Cells from Debulking to Rare Cell Isolation. Lab Chip 2015, 15, 1230-1249.

(5) Hinshaw, D. C.; Shevde, L. A. The Tumor Microenvironment Innately Modulates Cancer Progression. Cancer Res. 2019, 79, 4557-4567.

(6) Malone, E. R.; Oliva, M.; Sabatini, P. J. B.; Stockley, T. L.; Siu, L. L. Molecular Profiling for Precision Cancer Therapies. Genome Med. 2020, 12, 8.

(7) Goodwin, S.; McPherson, J. D.; McCombie, W. R. Coming of Age: Ten Years of Next-Generation Sequencing Technologies. Nat. Rev. Genet. 2016, 17, 333-351.

(8) Slatko, B. E.; Gardner, A. F.; Ausubel, F. M. Overview of Next Generation Sequencing Technologies. Curr. Protoc. Mol. Biol. 2018, 122, e59.

(9) Allard, W. J.; Matera, J.; Miller, M. C.; Repollet, M.; Connelly, M. C.; Rao, C.; Tibbe, A. G. J.; Uhr, J. W.; Terstappen, L. W. M. M. Tumor Cells Circulate in the Peripheral Blood of All Major Carcinomas but Not in Healthy Subjects or Patients with Nonmalignant Diseases. Clin. Cancer Res. 2004, 10, 6897-6904.

(10) Andree, K. C.; van Dalum, G.; Terstappen, L. W. M. M. Challenges in Circulating Tumor Cell Detection by the CellSearch System. Mol. Oncol. 2016, 10, 395-407.

(11) Hazra, R. S.; Kale, N.; Aland, G.; Qayyumi, B.; Mitra, D.; Jiang, L.; Bajwa, D.; Khandare, J.; Chaturvedi, P.; Quadir, M. Cellulose Mediated Transferrin Nanocages for Enumeration of Circulating Tumor Cells for Head and Neck Cancer. Sci. Rep. 2020, 10, 1-14.

(12) Gupta, P.; Gulzar, Z.; Hsieh, B.; Lim, A.; Watson, D.; Mei, R. Analytical Validation of the CellMax Platform for Early Detection of Cancer by Enumeration of Rare Circulating Tumor Cells. J. Circ. Biomarkers 2019, 8, 1-13.

(13) Atkins, A.; Gupta, P.; Zhang, B. M.; Tsai, W. S.; Lucas, J.; Javey, M.; Vora, A.; Mei, R. Detection of Circulating Tumor DNA with a Single-Molecule Sequencing Analysis Validated for Targeted and Immunotherapy Selection. Mol. Diagn. Ther. 2019, 23, 521-535.

(14) Montoro, D. T.; Haber, A. L.; Biton, M.; Vinarsky, V.; Lin, B.; Birket, S. E.; Yuan, F.; Chen, S.; Leung, H. M.; Villoria, J.; Rogel, N.; Burgin, G.; Tsankov, A. M.; Waghray, A.; Slyper, M.; Waldman, J.; Nguyen, L.; Dionne, D.; Rozenblatt-Rosen, O.; Tata, P. R.; et al. A Revised Airway Epithelial Hierarchy Includes CFTR-Expressing Ionocytes. Nature 2018, 560, 319-324.

(15) Zheng, G. X. Y.; Terry, J. M.; Belgrader, P.; Ryvkin, P.; Bent, Z. W.; Wilson, R.; Ziraldo, S. B.; Wheeler, T. D.; McDermott, G. P.; Zhu, J.; Gregory, M. T.; Shuga, J.; Montesclaros, L.; Underwood, J. G.; Masquelier, D. A.; Nishimura, S. Y.; Schnall-Levin, M.; Wyatt, P. W.; Hindson, C. M.; Bharadwaj, R.; et al. Massively Parallel Digital Transcriptional Profiling of Single Cells. Nat. Commun. 2017, 8, 14049.

(16) Dura, B.; Choi, J. Y.; Zhang, K.; Damsky, W.; Thakral, D.; Bosenberg, M.; Craft, J.; Fan, R. ScFTD-Seq: Freeze-Thaw Lysis Based, Portable Approach toward Highly Distributed Single-Cell 3' MRNA Profiling. Nucleic Acids Res. 2019, 47, e16.

(17) Bai, Z.; Deng, Y.; Kim, D.; Chen, Z.; Xiao, Y.; Fan, R. An Integrated Dielectrophoresis-Trapping and Nanowell Transfer Approach to Enable Double-Sub-Poisson Single-Cell RNA Sequencing. ACS Nano 2020, 14, 7412-7424.

(18) Morimoto, A.; Mogami, T.; Watanabe, M.; Iijima, K.; Akiyama, Y.; Katayama, K.; Futami, T.; Yamamoto, N.; Sawada, T.; Koizumi, F.; Koh, Y. High-Density Dielectrophoretic Microwell Array for Detection, Capture, and Single-Cell Analysis of Rare Tumor Cells in Peripheral Blood. PLoS One 2015, 10, e0130418.

(19) Pohl, H. A.; Hawk, I. Separation of Living and Dead Cells by Dielectrophoresis. Science (Washington, DC, U. S.) 1966, 152, 647-649.

(20) Hu, X.; Bessette, P. H.; Qian, J.; Meinhart, C. D.; Daugherty, P. S.; Soh, H. T. Marker-Specific Sorting of Rare Cells Using Dielectrophoresis. Proc. Natl. Acad. Sci. U.S.A 2005, 102, 15757-15761.

(21) Thomas, R. S. W.; Mitchell, P. D.; Oreffo, R. O. C.; Morgan, H.; Green, N. G. Image-Based Sorting and Negative Dielectrophoresis for High Purity Cell and Particle Separation. Electrophoresis 2019, 40, 2718-2727.

(22) Fiedler, S.; Shirley, S. G.; Schnelle, T.; Fuhr, G. Dielectrophoretic Sorting of Particles and Cells in a Microsystem. Anal. Chem. 1998, 70, 1909-1915.

(23) Isozaki, A.; Nakagawa, Y.; Loo, M. H.; Shibata, Y.; Tanaka, N.; Setyaningrum, D. L.; Park, J. W.; Shirasaki, Y.; Mikami, H.; Huang, D.; Tsoi, H.; Riche, C. T.; Ota, T.; Miwa, H.; Kanda, Y.; Ito, T.; Ito, T.; Yamada, K.; Iwata, O.; Suzuki, K.; et al. Sequentially Addressable Dielectrophoretic Array for High-Throughput Sorting of Large-Volume Biological Compartments. Sci. Adv. 2020, 6, eaba6712.

(24) Song, H.; Rosano, J. M.; Wang, Y.; Garson, C. J.; Prabhakarpandian, B.; Pant, K.; Klarmann, G. J.; Perantoni, A.; Alvarez, L. M.; Lai, E. Continuous-Flow Sorting of Stem Cells and Differentiation Products Based on Dielectrophoresis. Lab Chip 2015, 15, 1320-1328.

(25) Lee, D.; Hwang, B.; Kim, B. The Potential of a Dielectrophoresis Activated Cell Sorter (DACS) As a Next Generation Cell Sorter. Micro Nano Syst. Lett. 2016, 4, 2.

(26) Wang, X. B.; Yang, J.; Huang, Y.; Vykoukal, J.; Becker, F. F.; Gascoyne, P. R. C. Cell Separation by Dielectrophoretic Field-Flow-Fractionation. Anal. Chem. 2000, 72, 832-839.

(27) Yang, J.; Huang, Y.; Wang, X.-B.; Becker, F. F.; Gascoyne, P. R. C. Cell Separation on Microfabricated Electrodes Using Dielectrophoretic/Gravitational Field-Flow Fractionation. Anal. Chem. 1999, 71, 911-918.

(28) Duarte, P. A.; Menze, L.; Abdelrasoul, G. N.; Yosinski, S.; Kobos, Z.; Stuermer, R.; Reed, M.; Yang, J.; Li, X. S.; Chen, J. Single Ascospore Detection for the Forecasting of Sclerotinia Stem Rot of Canola. Lab Chip 2020, 20, 3644-3652.

(29) Bacheschi, D. T.; Polsky, W.; Kobos, Z.; Yosinski, S.; Menze, L.; Chen, J.; Reed, M. A. Overcoming the Sensitivity vs. Throughput Tradeoff in Coulter Counters: A Novel Side Counter Design. Biosens. Bioelectron. 2020, 168, 112507.

(30) Han, P.; Yosinski, S.; Kobos, Z. A.; Chaudhury, R.; Lee, J. S.; Fahmy, T. M.; Reed, M. A. Continuous Label-Free Electronic Discrimination of T Cells by Activation State. ACS Nano 2020, 14, 8646-8657.

(31) Kobayashi, M.; Kim, S. H.; Nakamura, H.; Kaneda, S.; Fujii, T. Cancer Cell Analyses at the Single Cell-Level Using Electroactive Microwell Array Device. PLoS One 2015, 10, e0139980.

(32) Kim, S. H.; Fujii, T. Efficient Analysis of a Small Number of Cancer Cells at the Single-Cell Level Using an Electroactive Double-Well Array. Lab Chip 2016, 16, 2440-2449.

(33) Yang, Y.; Rho, H. S.; Stevens, M.; Tibbe, A. G. J.; Gardeniers, H.; Terstappen, L. W. M. M. Microfluidic Device for DNA Amplification of Single Cancer Cells Isolated from Whole Blood by Self-Seeding Microwells. Lab Chip 2015, 15, 4331-4337.

(34) Yoshimura, Y.; Tomita, M.; Mizutani, F.; Yasukawa, T. Cell Pairing Using Microwell Array Electrodes Based on Dielectrophoresis. Anal. Chem. 2014, 86, 6818-6822.

(35) Wu, C.; Chen, R.; Liu, Y.; Yu, Z.; Jiang, Y.; Cheng, X. A Planar Dielectrophoresis-Based Chip for High-Throughput Cell Pairing. Lab Chip 2017, 17, 4008-4014.

(36) Wittenberg, N. J.; Im, H.; Johnson, T. W.; Xu, X.; Warrington, A. E.; Rodriguez, M.; Oh, S. H. Facile Assembly of Micro- and Nanoarrays for Sensing with Natural Cell Membranes. ACS Nano 2011, 5, 7555-7564.

(37) Man, T.; Zhu, X.; Chow, Y. T.; Dawson, E. R.; Wen, X.; Patananan, A. N.; Liu, T. L.; Zhao, C.; Wu, C.; Hong, J. S.; Chung, P. S.; Clemens, D. L.; Lee, B. Y.; Weiss, P. S.; Teitell, M. A.; Chiou, P. Y. Intracellular Photothermal Delivery for Suspension Cells Using Sharp Nanoscale Tips in Microwells. ACS Nano 2019, 13, 10835-10844.

(38) Bose, S.; Wan, Z.; Carr, A.; Rizvi, A. H.; Vieira, G.; Pe'er, D.; Sims, P. A. Scalable Microfluidics for Single-Cell RNA Printing and Sequencing. Genome Biol. 2015, 16, 1-16.

(39) Yuan, J.; Sims, P. A. An Automated Microwell Platform for Large-Scale Single Cell RNA-Seq. Sci. Rep. 2016, 6, 1-10.

(40) Moeller, H. C.; Mian, M. K.; Shrivastava, S.; Chung, B. G.; Khademhosseini, A. A Microwell Array System for Stem Cell Culture. Biomaterials 2008, 29, 752-763.

(41) Wood, D. K.; Weingeist, D. M.; Bhatia, S. N.; Engelward, B. P. Single Cell Trapping and DNA Damage Analysis Using Microwell Arrays. Proc. Natl. Acad. Sci. U.S.A 2010, 107, 10008-10013.

(42) Cordovez, B.; Psaltis, D.; Erickson, D. Trapping and Storage of Particles in Electroactive Microwells. Appl. Phys. Lett. 2007, 90, 024102.

(43) Kim, S. H.; Yamamoto, T.; Fourmy, D.; Fujii, T. Electroactive Microwell Arrays for Highly Efficient Single-Cell Trapping and Analysis. Small 2011, 7, 3239-3247.

(44) Mansoorifar, A.; Koklu, A.; Sabuncu, A. C.; Beskok, A. Dielectrophoresis Assisted Loading and Unloading of Microwells for Impedance Spectroscopy. Electrophoresis 2017, 38, 1466-1474.

(45) Soule, H. D.; Maloney, T. M.; Wolman, S. R.; Peterson, W. D., Jr.; Brenz, R.; McGrath, C. M.; Russo, J.; Pauley, R. J.; Jones, R. F.; Brooks, S. C. Isolation and Characterization of a Spontaneously Immortalized Human Breast Epithelial Cell Line, MCF-10. Cancer Res. 1990, 50, 6075-6086.

(46) Poczobutt, J. M.; Tentler, J.; Lu, X.; Schedin, P. J.; Gutierrez-Hartmann, A. Benign Mammary Epithelial Cells Enhance the Transformed Phenotype of Human Breast Cancer Cells. BMC Cancer 2010, 10, 373.

(47) Truongvo, T. N.; Kennedy, R. M.; Chen, H.; Chen, A.; Berndt, A.; Agarwal, M.; Zhu, L.; Nakshatri, H.; Wallace, J.; Na, S.; Yokota, H.; Ryu, J. E. Microfluidic Channel for Characterizing Normal and Breast Cancer Cells. J. Micromech. Microeng. 2017, 27, 035017.

(48) Ren, X.; Ghassemi, P.; Babahosseini, H.; Strobl, J. S.; Agah, M. Single-Cell Mechanical Characteristics Analyzed by Multiconstriction Microfluidic Channels. ACS Sensors 2017, 2, 290-299.

(49) Fricke, H. The Electric Capacity of Suspensions with Special Reference to Blood. J. Gen. Physiol. 1925, 9, 137-152.

(50) Pethig, R.; Kell, D. B. The Passive Electrical Properties of Biological Systems: Their Significance in Physiology, Biophysics and Biotechnology. Phys. Med. Biol. 1987, 32, 933-970.

(51) Holmes, D.; Pettigrew, D.; Reccius, C. H.; Gwyer, J. D.; Van Berkel, C.; Holloway, J.; Davies, D. E.; Morgan, H. Leukocyte Analysis and Differentiation Using High Speed Microfluidic Single Cell Impedance Cytometry. Lab Chip 2009, 9, 2881-2889.

(52) Han, A.; Yang, L.; Frazier, A. B. Quantification of the Heterogeneity in Breast Cancer Cell Lines Using Whole-Cell Impedance Spectroscopy. Clin. Cancer Res. 2007, 13, 139-143.

(53) Qiao, G.; Wang, W.; Duan, W.; Zheng, F.; Sinclair, A. J.; Chatwin, C. R. Bioimpedance Analysis for the Characterization of Breast Cancer Cells in Suspension. IEEE Trans. Biomed. Eng. 2012, 59, 2321-2329.

(54) Gascoyne, P. R. C.; Shim, S.; Noshari, J.; Becker, F. F.; Stemke-Hale, K. Correlations between the Dielectric Properties and Exterior Morphology of Cells Revealed by Dielectrophoretic Field-Flow Fractionation. Electrophoresis 2013, 34, 1042-1050.

(55) Huang, Y.; Joo, S.; Duhon, M.; Heller, M.; Wallace, B.; Xu, X. Dielectrophoretic Cell Separation and Gene Expression Profiling on Microelectronic Chip Arrays. Anal. Chem. 2002, 74, 3362-3371.

(56) Yang, L.; Banada, P. P.; Bhunia, A. K.; Bashir, R. Effects of Dielectrophoresis on Growth, Viability and Immuno-Reactivity of Listeria monocytogenes. J. Biol. Eng. 2008, 2, 6.

(57) Markx, G. H.; Talary, M. S.; Pethig, R. Separation of Viable and Non-Viable Yeast Using Dielectrophoresis. J. Biotechnol. 1994, 32, 29-37.

(58) Raicu, V.; Raicu, G.; Turcu, G. Dielectric Properties of Yeast Cells As Simulated by the Two-Shell Model. Biochim. Biophys. Acta, Bioenerg. 1996, 1274, 143-148.

(59) Asami, K. Characterization of Heterogeneous Systems by Dielectric Spectroscopy. Prog. Polym. Sci. 2002, 27, 1617-1659.

(60) Turcan, I.; Olariu, M. A. Dielectrophoretic Manipulation of Cancer Cells and Their Electrical Characterization. ACS Comb. Sci. 2020, 22, 554-578.

(61) Liang, W.; Yang, X.; Wang, J.; Wang, Y.; Yang, W.; Liu, L. Determination of Dielectric Properties of Cells Using AC Electrokinetic-Based Microfluidic Platform: A Review of Recent Advances. Micromachines 2020, 11, 513.

(62) Wu, L.; Lanry Yung, L. Y.; Lim, K. M. Dielectrophoretic Capture Voltage Spectrum for Measurement of Dielectric Properties and Separation of Cancer Cells. Biomicrofluidics 2012, 6, 014113.

(63) Sherba, J. J.; Hogquist, S.; Lin, H.; Shan, J. W.; Shreiber, D. I.; Zahn, J. D. The Effects of Electroporation Buffer Composition on Cell Viability and Electro-Transfection Efficiency. Sci. Rep. 2020, 10, 1-9.

(64) Khater, M.; de la Escosura-Muhiz, A.; Merkogi, A. Biosensors for Plant Pathogen Detection. Biosens. Bioelectron. 2017, 93 (June 2016), 72-86. https://doi.org/10.1016/j.bios.2016.09.091.

(65) Nezhad, A. S. Future of Portable Devices for Plant Pathogen Diagnosis. Lab Chip 2014, 14 (16), 2887-2904. https://doi.org/10.1039/c41c00487f.

(66) Oerke, E. C. Crop Losses to Pests. J. Agric. Sci. 2006, 144 (1), 31-43. https://doi.org/10.1017/S021859605005708.

(67) Purdy, L. H. Sclerotinia sclerotiorum: History, Diseases and Symptomatology, Host Range, Geographic Distribution, and Impact. Phytopathology 1979, 69 (8), 875-880.

(68) Jamaux, I.; Gelie, B.; Lamarque, C. Early Stages of Infection of Rapeseed Petals and Leaves by Sclerotinia sclerotiorum Revealed by Scanning Electron Microscopy.

Plant Pathol. 1995, 44 (1), 22-30. https://doi.org/10.1111/j.1365-3059.1995.tb02712.x.

(69) Xia, S.; Xu, Y.; Hoy, R.; Zhang, J.; Qin, L.; Li, X. The Notorious Soilborne Pathogenic Fungus Sclerotinia sclerotiorum: An Update on Genes Studied with Mutant Analysis. Pathogens 2020, 9 (1). https://doi.org/10.3390/pathogens9010027.

(70) Boland, G. J.; Hall, R. Index of Plant Hosts of Sclerotinia sclerotiorum. Can. J. plant Pathol. 1994, 16 (2), 93-100.

(71) Maheshwari, P.; Selvaraj, G.; Kovalchuk, I. Optimization of Brassica napus (Canola) Explant Regeneration for Genetic Transformation. N. Biotechnol. 2011, 29 (1), 144-155. https://doi.org/10.1016/j.nbt.2011.06.014.

(72) del Rio, L. E.; Bradley, C. A.; Henson, R. A.; Endres, G. J.; Hanson, B. K.; McKay, K.; Halvorson, M.; Porter, P. M.; Le Gare, D. G.; Lamey, H. A. Impact of Sclerotinia Stem Rot on Yield of Canola. Plant Dis. 2007, 91 (2), 191-194.

(73) Adams, P. B.; Ayers, W. A. Ecology of Sclerotinia Species. Phytopathology 1979, 69, 896-899. https://doi.org/10.1094/phyto-69-896.

(74) Brooks, K. D.; Bennett, S. J.; Hodgson, L. M.; Ashworth, M. B. Narrow Windrow Burning Canola (Brassica napus L.) Residue for Sclerotinia sclerotiorum (Lib.) de Bary Sclerotia Destruction. Pest Manag. Sci. 2018, 74 (11), 2594-2600. https://doi.org/10.1002/ps.5049.

(75) McLaren, D. L.; Conner, R. L.; Kutcher, H. R.; Platford, R. G.; Lamb, J. L.; Lamey, H. A. Predicting Diseases Caused by Sclerotinia sclerotiorum on Canola and Bean—a Western Canadian Perspective. Can. J. Plant Pathol. 2004, 26 (4), 489-497. https://doi.org/10.1080/07060660409507169.

(76) Twengström, E.; Sigvald, R.; Svensson, C.; Yuen, J. Forecasting Sclerotinia Stem Rot in Spring Sown Oilseed Rape. Crop Prot. 1998, 17 (5), 405-411. https://doi.org/10.1016/S0261-2194(98)00035-0.

(77) Thomas, P. Sclerotinia Stem Rot Checklist. In Canola growers manual. Winnipeg: Canola Council of Canada; 1984; pp 1053-1055.

(78) Clarkson, J. P.; Fawcett, L.; Anthony, S. G.; Young, C. A Model for Sclerotinia sclerotiorum Infection and Disease Development in Lettuce, Based on the Effects of Temperature, Relative Humidity and Ascospore Density. 2014, 9 (4), 15-25. https://doi.org/10.1371/journal.pone.0094049.

(79) Sharma, P.; Meena, P. D.; Kumar, A.; Kumar, V.; Singh, D. Forewarning Models for Sclerotinia Rot (Sclerotinia sclerotiorum) in Indian Mustard (Brassica juncea L.). Phytoparasitica 2015, 43 (4), 509-516. https://doi.org/10.1007/s12600-015-0463-4.

(80) North Dakota State University. Estimated risk of Sclerotinia stem rot development www.ag.ndsu.edu/sclerotinia/riskmap.html.

(81) Bečka, D.; Prokinová, E.; Šimka, J.; Cihlář, P.; Bečková, L.; Bokor, P.; Vašák, J. Use of Petal Test in Early-Flowering Varieties of Oilseed Rape (Brassica napus L.) for Predicting the Infection Pressure of Sclerotinia sclerotiorum (Lib.) de Bary. Crop Prot. 2016, 80, 127-131. https://doi.org/10.1016/j.cropro.2015.11.006.

(82) Turkington, T. K.; Morrall, R. A. A.; Rude, S. V. Use of Petal Infestation to Forecast Sclerotinia Stem Rot of Canola: The Impact of Diurnal and Weather-Related Inoculum Fluctuations. Can. J. Plant Pathol. 1991, 13 (4), 347-355. https://doi.org/10.1080/07060669109500920.

(83) Duarte, P. A.; Menze, L.; Abdelrasoul, G. N.; Yosinski, S.; Kobos, Z.; Stuermer, R.; Reed, M.; Yang, J.; Li, X. S.;

Chen, J. Single Ascospore Detection for the Forecasting of: *Sclerotinia* Stem Rot of Canola. *Lab Chip* 2020, 20 (19), 3644-3652. https://doi.org/10.1039/d01c00426j.

(84) Almquist, C.; Wallenhammar, A. C. Monitoring of Plant and Airborne Inoculum of *Sclerotinia sclerotiorum* in Spring Oilseed Rape Using Real-Time PCR. *Plant Pathol.* 2015, 64 (1), 109-118. https://doi.org/10.1111/ppa.12230.

(85) Ziesman, B. R.; Turkington, T. K.; Strelkov, S. E. A Quantitative PCR System for Measuring *Sclerotinia sclerotiorum* in Canola (*Brassica napus*). *Plant Dis.* 2016, 100 (5), 984-990.

(86) Yanni, Y.; Laisong, D.; Xin, L.; Jinghui, Y.; Zhonghua, M. Detection of *Sclerotinia sclerotiorum* in Planta by a Real-Time PCR Assay. *J. Phytopathol.* 2009, 469, 465-469. https://doi.org/10.1111/j.1439-0434.2009.01543.x.

(87) Shoute, L. C. T.; Anwar, A.; MacKay, S.; Abdelrasoul, G. N.; Lin, D.; Yan, Z.; Nguyen, A. H.; McDermott, M. T.; Shah, M. A.; Yang, J.; Chen, J.; Li, X. S. Immuno-Impedimetric Biosensor for Onsite Monitoring of Ascospores and Forecasting of *Sclerotinia* Stem Rot of Canola. *Sci. Rep.* 2018, 8 (1), 1-9. https://doi.org/10.1038/s41598-018-30167-5.

(88) Dura, B.; Choi, J. Y.; Zhang, K.; Damsky, W.; Thakral, D.; Bosenberg, M.; Craft, J.; Fan, R. ScFTD-Seq: Freeze-Thaw Lysis Based, Portable Approach toward Highly Distributed Single-Cell 3' MRNA Profiling. *Nucleic Acids Res.* 2019, 47 (3), e16. https://doi.org/10.1093/nar/gky1173.

(89) Patel, K.; Kim, H.; Bartsch, M. S.; Renzi, R. F.; He, J.; Vreugde, J. L. Van De; Claudnic, M. R.; Patel, K. D. Automated Digital Microfluidic Sample Preparation for Next Generation DNA Sequencing. *J. Lab. Autom.* 2011, 16 (6), 405-414. https://doi.org/10.1016/j.jala.2011.07.001.

(90) Sun, M.; Durkin, P.; Li, J.; Toth, T. L.; He, X. Label-Free On-Chip Selective Extraction of Cell-Aggregate-Laden Microcapsules from Oil into Aqueous Solution with Optical Sensor and Dielectrophoresis. *ACS Sensors* 2018, 3 (2), 410-417. https://doi.org/10.1021/acssensors.7b00834.

(91) Menze, L.; Duarte, P. A.; Haddon, L.; Chu, M.; Chen, J. Selective Single-Cell Sorting Using a Multisectorial Electroactive Nanowell Platform. *ACS Nano* 2021. https://doi.org/10.1021/acsnano.1c05668.

(92) Parker, M. L.; McDonald, M. R.; Boland, G. J. Evaluation of Air Sampling and Detection Methods to Quantify Airborne Ascospores of *Sclerotinia sclerotiorum*. *Plant Dis.* 2014, 98 (1), 32-42. https://doi.org/10.1094/PDIS-02-13-0163-RE.

(93) Bolton, M. D.; THOMMA, B. P. H. J.; NELSON, B. D. *Sclerotinia sclerotiorum* (Lib.) de Bary: Biology and Molecular Traits. *Mol. Plant Pathol.* 2006, 7 (1), 1-16. https://doi.org/10.1111/J.1364-3703.2005.00316.X.

(94) Kohn, L. M. A Monographic Revision of the Genus *Sclerotinia. Mycotaxo* 1979, 9, 365-444.

(95) Abdelrasoul, G. N.; Anwar, A.; MacKay, S.; Tamura, M.; Shah, M. A.; Khasa, D. P.; Montgomery, R. R.; Ko, A. I.; Chen, J. DNA Aptamer-Based Non-Faradaic Impedance Biosensor for Detecting *E. Coli. Anal. Chim. Acta* 2020, 1107, 135-144. https://doi.org/10.1016/j.aca.2020.02.004.

(96) Polonschii, C.; David, S.; Gbspdr, S.; Gheorghiu, M.; Rosu-Hamzescu, M.; Gheorghiu, E. Complementarity of EIS and SPR to Reveal Specific and Nonspecific Binding When Interrogating a Model Bioaffinity Sensor; Perspective Offered by Plasmonic Based EIS. *Anal. Chem.* 2014, 86 (17), 8553-8562. https://doi.org/10.1021/ac501348n.

(97) Abdelrasoul, G. N.; Mackay, S.; Salim, S. Y.; Ismond, K. P.; Tamura, M.; Khalifa, C.; Mannan, E.; Lin, D.; Mandal, T.; Montgomery, R. R.; Wishart, D. S.; Chen, J.; Khadaroo, R. G. Non-Invasive Point-of-Care Device to Diagnose Acute Mesenteric Ischemia. *ACS Sensors* 2018, 3 (11), 2293-2302. https://doi.org/10.1021/acssensors.8b00558.

(98) Bruus, H. Acoustofluidics 1: Governing Equations in Microfluidics. *Lab Chip* 2011, 11 (22), 3742-3751. https://doi.org/10.1039/c1lc20658c.

(99) Couniot, N.; Flandre, D.; Francis, L. A.; Afzalian, A. Signal-to-Noise Ratio Optimization for Detecting Bacteria with Interdigitated Microelectrodes. *Sensors Actuators, B Chem.* 2013, 189, 43-51. https://doi.org/10.1016/j.snb.2012.12.008.

(100) Bagnaninchi, P. O.; Drummond, N. Real-Time Label-Free Monitoring of Adipose-Derived Stem Cell Differentiation with Electric Cell-Substrate Impedance Sensing. Proc. Natl. Acad. Sci. U.S.A 2011, 108 (16), 6462-6467. https://doi.org/10.1073/pnas.1018260108.

(101) Asami, K. Characterization of Biological Cells by Dielectric Spectroscopy. J. Non. Cryst. Solids 2002, 305 (1-3), 268-277. https://doi.org/10.1016/S0022-3093(02)01110-9.

(102) Heileman, K.; Daoud, J.; Tabrizian, M. Dielectric Spectroscopy as a Viable Biosensing Tool for Cell and Tissue Characterization and Analysis. Biosens. Bioelectron. 2013, 49, 348-359. https://doi.org/10.1016/j.bios.2013.04.017.

(103) Asami, K.; Takahashi, Y.; Takashima, S. Dielectric Properties of Mouse Lymphocytes and Erythrocytes. BBA—Mol. Cell Res. 1989, 1010 (1), 49-55. https://doi.org/10.1016/0167-4889(89)90183-3.

(104) Kakutani, T.; Shibatani, S.; Sugai, M. Electrorotation of Non-Spherical Cells: Theory for Ellipsoidal Cells with an Arbitrary Number of Shells. Bioelectrochemistry Bioenerg. 1993, 31 (2), 131-145. https://doi.org/10.1016/0302-4598(93)80002-C.

(105) Asami, K.; Hanai, T.; Koizumi, N. Dielectric Analysis of *Escherichia Coli* Suspensions in the Light of the Theory of Interfacial Polarization. Biophys. J. 1980, 31 (2), 215-228. https://doi.org/10.1016/S0006-3495(80)85052-1.

(106) Asami, K.; Yonezawa, T. Dielectric Behavior of Wild-Type Yeast and Vacuole-Deficient Mutant over a Frequency Range of 10 KHz to 10 GHz. Biophys. J. 1996, 71 (4), 2192-2200. https://doi.org/10.1016/S0006-3495(96)79420-1.

(107) Polevaya, Y.; Ermolina, I.; Schlesinger, M.; Ginzburg, B. Z.; Feldman, Y. Time Domain Dielectric Spectroscopy Study of Human Cells II. Normal and Malignant White Blood Cells. Biochim. Biophys. Acta—Biomembr. 1999, 1419 (2), 257-271. https://doi.org/10.1016/S0005-2736(99)00072-3.

(108) Mansoorifar, A.; Koklu, A.; Beskok, A. Quantification of Cell Death Using an Impedance-Based Microfluidic Device. Anal. Chem. 2019, 91 (6), 4140-4148. https://doi.org/10.1021/acs.analchem.8b05890.

(109) Bordi, F.; Cametti, C.; Di Biasio, A. Determination of Cell Membrane Passive Electrical Properties Using Frequency Domain Dielectric Spectroscopy Technique. A New Approach. BBA—Biomembr. 1990, 1028 (2), 201-204. https://doi.org/10.1016/0005-2736(90)90154-G.

(110) Yang, J.; Huang, Y.; Wang, X.; Wang, X. B.; Becker, F. F.; Gascoyne, P. R. C. Dielectric Properties of Human Leukocyte Subpopulations Determined by Electrorotation as a Cell Separation Criterion. Biophys. J. 1999, 76 (6), 3307-3314. https://doi.org/10.1016/S0006-3495(99)77483-7.

(111) Sano, M. B.; Henslee, E. A.; Schmelz, E.; Davalos, R. V. Contactless Dielectrophoretic Spectroscopy: Examination of the Dielectric Properties of Cells Found in Blood. Electrophoresis 2011, 32 (22), 3164-3171. https://doi.org/10.1002/elps.201100351.

(112) Vaillier, C.; Honegger, T.; Kermarrec, F.; Gidrol, X.; Peyrade, D. Label-Free Electric Monitoring of Human Cancer Cells as a Potential Diagnostic Tool. Anal. Chem. 2016, 88 (18), 9022-9028. https://doi.org/10.1021/acs.analchem.6b01648.

(113) Kaler, K. V.; Jones, T. B. Dielectrophoretic Spectra of Single Cells Determined by Feedback-Controlled Levitation. Biophys. J. 1990, 57 (2), 173-182. https://doi.org/10.1016/S0006-3495(90)82520-0.

(114) Huang, Y.; Holzel, R.; Pethig, R.; Xiao-B. Wang. Differences in the AC Electrodynamics of Viable and Non-Viable Yeast Cells Determined through Combined Dielectrophoresis and Electrorotation Studies. Phys. Med. Biol. 1992, 37 (7), 1499-1517. https://doi.org/0.1088/0031-9155/37/7/003.

(115) Arnold, W. M.; Zimmermann, U. Rotating-Field-Induced Rotation and Measurement of the Membrane Capacitance of Single Mesophyll Cells of *Avena Sativa*. Zeitschrift fur Naturforsch.—Sect. C J. Biosci. 1982, 37 (10), 908-915. https://doi.org/10.1515/znc-1982-1010.

(116) Marszalek, P.; Zielinsky, J. J.; Fikus, M.; Tsong, T. Y. Determination of Electric Parameters of Cell Membranes by a Dielectrophoresis Method. Biophys. J. 1991, 59 (5), 982-987. https://doi.org/10.1016/S0006-3495(91)82312-8.

(117) Rosenthal, A.; Voldman, J. Dielectrophoretic Traps for Single-Particle Patterning. Biophys. J. 2005, 88 (3), 2193-2205. https://doi.org/10.1529/biophysj.104.049684.

(118) Viefhues, M.; Eichhorn, R. DNA Dielectrophoresis: Theory and Applications a Review. Electrophoresis 2017, 38 (11), 1483-1506. https://doi.org/10.1002/elps.201600482.

(119) Saharan, G. S.; Mehta, N. *Sclerotinia* Diseases of Crop Plants: Biology, Ecology and Disease Management; Dordrecht: Springer, 2008.

(120) Koch, S.; Dunker, S.; Kleinhenz, B.; Rohrig, M.; Von Tiedemann, A. A Crop Loss-Related Forecasting Model for *Sclerotinia* Stem Rot in Winter Oilseed Rape. Phytopathology 2007, 97 (9), 1186-1194. https://doi.org/10.1094/PHYTO-97-9-1186.

(121) Clarkson, J. P.; Phelps, K.; Whipps, J. M.; Young, C. S.; Smith, J. A.; Watling, M. Forecasting *Sclerotinia* Disease on Lettuce: A Predictive Model for Carpogenic Germination of *Sclerotinia sclerotiorum* Sclerotia. Phytopathology 2007, 97 (5), 621-631. https://doi.org/10.1094/PHYTO-97-5-0621.

(122) Duarte, P. A.; Menze, L.; Shoute, L.; Zeng, J.; Savchenko, O.; Lyu, J.; Chen, J. Highly Efficient Capture and Quantification of the Airborne Fungal Pathogen *Sclerotinia sclerotiorum* Employing a Nanoelectrode Activated Microwell Array. ACS Omega 2021. https://doi.org/10.1021/acsomega.1c04878.

(123) Lo, Y. J.; Lin, Y. Y.; Lei, U.; Wu, M. S.; Yang, P. C. Measurement of the Clausius-Mossotti Factor of Generalized Dielectrophoresis. Appl. Phys. Lett. 2014, 104 (8), 1-6. https://doi.org/10.1063/1.4866344.

(124) Pethig, R. Dielectrophoresis: Status of the Theory, Technology, and Applications. Biomicrofluidics 2010, 4 (2), 1-35. https://doi.org/10.1063/1.3456626.

(125) Goldman, A. J.; Cox, R. G.; Brenner, H. Slow Viscous Motion of a Sphere Parallel to a Plane Wall-II Couette Flow. Chem. Eng. Sci. 1967, 22 (4), 653-660. https://doi.org/10.1016/0009-2509(67)800484.

(126) Soffe, R.; Baratchi, S.; Tang, S. Y.; Mcintyre, P.; Mitchell, A.; Khoshmanesh, K. Discontinuous Dielectrophoresis a Technique for Investigating the Response of Loosely Adherent Cells to High Shear Stress. BIODEVICES 2016-9th Int. Conf. Biomed. Electron. Devices, Proceedings; Part 9th Int. Jt. Conf. Biomed. Eng. Syst. Technol. BIOSTEC 2016 2016, 1 (Biostec), 23-33. https://doi.org/10.5220/0005654700230033.

(127) El-Gaddar, A.; Frénéa-Robin, M.; Voyer, D.; Aka, H.; Haddour, N.; Krahenbohl, L. Assessment of 0.5 T Static Field Exposure Effect on Yeast and HEK Cells Using Electrorotation. Biophys. J. 2013, 104 (8), 1805-1811. https://doi.org/10.1016/j.bpj.2013.01.063.

(128) Le Brun, G.; Hauwaert, M.; Leprince, A.; Glinel, K.; Mahillon, J.; Raskin, J. P. Electrical Characterization of Cellulose-Based Membranes towards Pathogen Detection in Water. Biosensors 2021, 11 (2). https://doi.org/10.3390/bios11020057.

(129) Adams, T. N. G.; Turner, P. A.; Janorkar, A. V.; Zhao, F.; Minerick, A. R. Characterizing the Dielectric Properties of Human Mesenchymal Stem Cells and the Effects of Charged Elastin-like Polypeptide Copolymer Treatment. Biomicrofluidics 2014, 8 (5), 1-14. https://doi.org/10.1063/1.4895756.

(130) Yang, C. Y.; Lei, U. Quasistatic Force and Torque on Ellipsoidal Particles under Generalized Dielectrophoresis. J. Appl. Phys. 2007, 102 (9).

(131) The, O. F. Passive Electrical Properties of Microorganisms Iv. Studies of the Protoplasts. Biophys. J. 1967, 634-643.

(132) Hyler, A. R.; Hong, D.; Davalos, R. V.; Swami, N. S.; Schmelz, E. M. A Novel Ultralow Conductivity Electromanipulation Buffer Improves Cell Viability and Enhances Dielectrophoretic Consistency. Electrophoresis 2021, 42 (12-13), 1366-1377. https://doi.org/10.1002/elps.202000324.

What is claimed is:

1. A microfluidic chip for selecting and detecting a polarizable agent in a sample containing a mixture of such agents, comprising:

a substrate, at least three individually addressable electrodes on the substrate with a gap between adjacent electrodes, forming a plurality of gaps, a well array on the substrate having a plurality of wells positioned on the plurality of gaps, each well located on a single gap, a top layer on the well array, and a microfluidic channel, between the top layer and the well array, wherein the microfluidic chip comprises at least 2 sectors, the at least three individually addressable electrodes include two electrodes in each sector, with different sectors optionally sharing one of the two electrodes, and each sector comprises different multiple wells of the plurality of wells.

2. The microfluidic chip of claim 1, wherein the at least three individually addressable electrodes comprise a metal selected from the group consisting of: aluminum, gold, copper, carbon, titanium, silver, platinum, palladium and mixtures thereof.

3. The microfluidic chip of claim 1, wherein the well array is formed in a material selected from the group consisting of: epoxy, hydrogel, polydimethylsiloxane, polyurethane and polyethylene glycol.

4. The microfluidic chip of claim 1, wherein the plurality of wells are circular and each has a diameter of at most 30 μm.

5. The microfluidic chip of claim 1, wherein the well array comprises 1,000 to 10,000 wells.

6. The microfluidic chip of claim 1, wherein the depth of each of the plurality of wells is 5 to 20 μm, and the width or diameter of each of the plurality of wells is 5 to 50 μm.

7. A microfluidic system for analyzing a liquid sample containing a mixture of polarizable agents, comprising:

the microfluidic chip of claim 1, further comprising an input lumen and an output lumen fluidly connected to the microfluidic channel, an input fluid tube, fluidly connected to the input lumen of the microfluidic chip, an output fluid tube, fluidly connected to the output lumen of the microfluidic chip, a controller, and connectors, electrically connecting the at least three individually addressable electrodes of the microfluidic chip to the controller, wherein the controller is configured to, with the two electrodes in each sector:

(i) generate a different dielectrophoresis (DEP) force in each sector, and (ii) measure an impedance in each sector.

8. The microfluidic system of claim 7, wherein the microfluidic system is configured to measure the impedance using non-faradaic electrochemical impedance spectroscopy (nF-EIS).

9. The microfluidic system of claim 7, further comprising a pump to introduce the liquid sample into the input fluid tube.

10. The microfluidic system of claim 7, wherein the controller comprises:

a CPU, a memory, a function generator, an oscilloscope, and an impedance analyzer.

11. The microfluidic system of claim 7, wherein the connectors comprise a chip holder.

12. The microfluidic system of claim 7, wherein the controller further comprises a computer program stored in a memory to operate the microfluidic system.

13. A method of making the microfluidic system of claim 7, comprising:

forming the microfluidic chip, forming the at least three individually addressable electrodes on the substrate, forming the well array on the substrate, connecting the at least three individually addressable electrodes to the controller, wherein the controller comprises a function generator and an impedance analyzer.

14. The microfluidic system of claim 7, wherein the controller determines the concentration of each of the polarizable agents present in the liquid sample.

15. The microfluidic chip of claim 1, wherein:

the well array comprises 100 to 10,000 wells, and the at least 2 sectors comprises 2 to 20 sectors.

16. A microfluidic system for analyzing a liquid sample containing a mixture of polarizable agents, comprising:

(a) a microfluidic chip, including:

(i) a substrate, (ii) at least three individually addressable electrodes on the substrate with a gap between adjacent electrodes, forming a plurality of gaps, (iii) a well array on the substrate having a plurality of wells positioned on the plurality of gaps, each well located on a single gap, (iv) a top layer on the well array, (v) a microfluidic channel, between the top layer and the well array, (vi) an input lumen and (vii) an output lumen fluidly connected to the microfluidic channel, wherein the microfluidic chip comprises 2 to 20 sectors, each sector comprising different multiple wells of the plurality of the wells, and the at least three individually addressable electrodes include two electrodes in each sector, with different sectors optionally sharing one of the two electrodes, (b) an input fluid tube, fluidly connected to the input lumen of the microfluidic chip, (c) an output fluid tube, fluidly connected to the output lumen of the microfluidic chip, (d) a controller, and (e) connectors, electrically connecting the at least three individually addressable electrodes of the microfluidic chip to the controller, wherein the controller is configured to, with the two electrodes in each sector:

(i) generate a different dielectrophoresis (DEP) force in each sector, and (ii) measure an impedance in each sector.

17. The microfluidic system of claim 16, wherein the depth of each of the plurality of wells is 5 to 20 μm, and the width or diameter of each of the plurality of wells is 5 to 50 μm.

18. The microfluidic system of claim 16, wherein the well array comprises 100 to 10,000 wells.

* * * * *